US007551226B2

(12) United States Patent  (10) Patent No.: US 7,551,226 B2
Kondo et al.  (45) Date of Patent:  Jun. 23, 2009

(54) IMAGE SIGNAL CONVERSION APPARATUS, METHOD AND, DISPLAY FOR IMAGE SIGNAL CONVERSION BASED ON SELECTED PIXEL DATA

(75) Inventors: Tetsujiro Kondo, Tokyo (JP); Kenji Takahashi, Kanagawa (JP); Kazushi Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 11/239,868

(22) Filed: Sep. 30, 2005

(65) Prior Publication Data

US 2006/0028581 A1  Feb. 9, 2006

Related U.S. Application Data

(63) Continuation of application No. 10/019,977, filed on Feb. 15, 2002, now Pat. No. 6,987,539.

(30) Foreign Application Priority Data

Feb. 24, 2000  (JP)  ............................... 2000-047947
Apr. 25, 2000  (JP)  ............................... 2000-124794
Apr. 25, 2000  (JP)  ............................... 2000-124796
Feb. 19, 2001  (WO)  ........................ PCT/JP01/01160

(51) Int. Cl.
  *H04N 11/00*  (2006.01)
(52) U.S. Cl. ......................... 348/441; 348/458; 348/555
(58) Field of Classification Search ................ 348/441, 348/448, 449, 458, 554–556, 452; 382/299, 382/300; 345/698, 699
See application file for complete search history.

(56) References Cited

U.S. PATENT DOCUMENTS 5,285,192 A  2/1994  Johary et al.
5,384,600 A  1/1995  Kaizaki et al.
5,666,164 A  9/1997  Kondo et al.
5,903,481 A  5/1999  Kondo et al.

(Continued)

FOREIGN PATENT DOCUMENTS

JP  7 88802  4/1995

(Continued)

*Primary Examiner*—Victor R Kostak
(74) *Attorney, Agent, or Firm*—Frommer Lawrence & Haug LLP; William S. Frommer; Thomas F. Presson

(57) ABSTRACT

An image signal conversion apparatus for converting a SD signal ($525i$) into a HD signal ($525p$ or the like). In the image signal conversion section, the SD signal is converted into the HD signal, and the image is displayed on the display section. A class code CL indicating a class of a subject pixel of the HD signal is obtained by detecting a space class and a motion class from tap pixel data corresponding to the subject pixel of HD signal which is selectively fetched from a SD signal. The controller loads coefficient data of each class according to the selected resolution into the coefficient memory from the information memory bank when the user selects the resolution. In the calculation circuit pixel data of the subject pixel of the HD signal is calculated using an estimating equation based on the tap data $xi$ corresponding to the subject pixel of the HD signal selectively fetched from the SD signal in the tap selection circuit and the coefficient data read in class code CL from the coefficient memory.

27 Claims, 24 Drawing Sheets

U.S. PATENT DOCUMENTS

| | | |
|---|---|---|
| 5,914,753 A | 6/1999 | Donovan |
| 5,940,117 A * | 8/1999 | Hassan et al. ............... 725/115 |
| 5,973,746 A | 10/1999 | Nakamoto et al. |
| 6,119,048 A | 9/2000 | Kondo et al. |
| 6,333,762 B1 * | 12/2001 | Yoo et al. ................... 348/441 |
| 6,342,923 B1 * | 1/2002 | Kim ........................... 348/458 |
| 6,346,970 B1 * | 2/2002 | Boehlke ..................... 348/447 |
| 6,411,333 B1 * | 6/2002 | Auld et al. .................. 348/441 |
| 6,433,828 B1 | 8/2002 | Kondo et al. |
| 6,441,857 B1 * | 8/2002 | Wicker et al. ............... 348/441 |
| 6,483,545 B1 | 11/2002 | Kondo et al. |
| 6,532,077 B1 * | 3/2003 | Arakawa ................... 358/1.13 |
| 6,862,043 B1 * | 3/2005 | Song .......................... 348/441 |
| 2002/0180884 A1 | 12/2002 | Kondo et al. |

FOREIGN PATENT DOCUMENTS

| | | |
|---|---|---|
| JP | 8 140956 | 6/1996 |
| JP | 9 74543 | 3/1997 |
| JP | 10 313445 | 11/1998 |

\* cited by examiner

F I G. 6
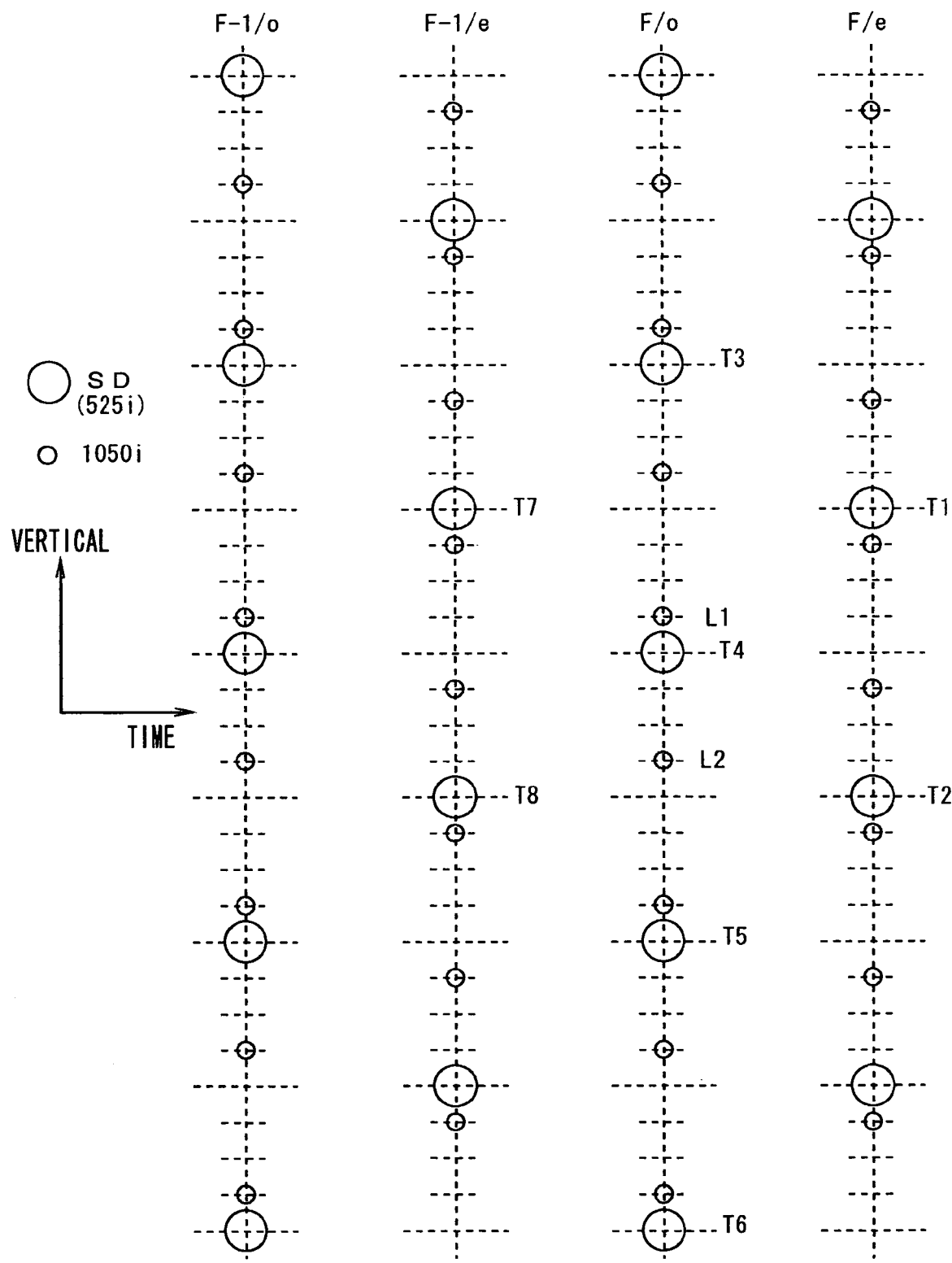

F I G. 7
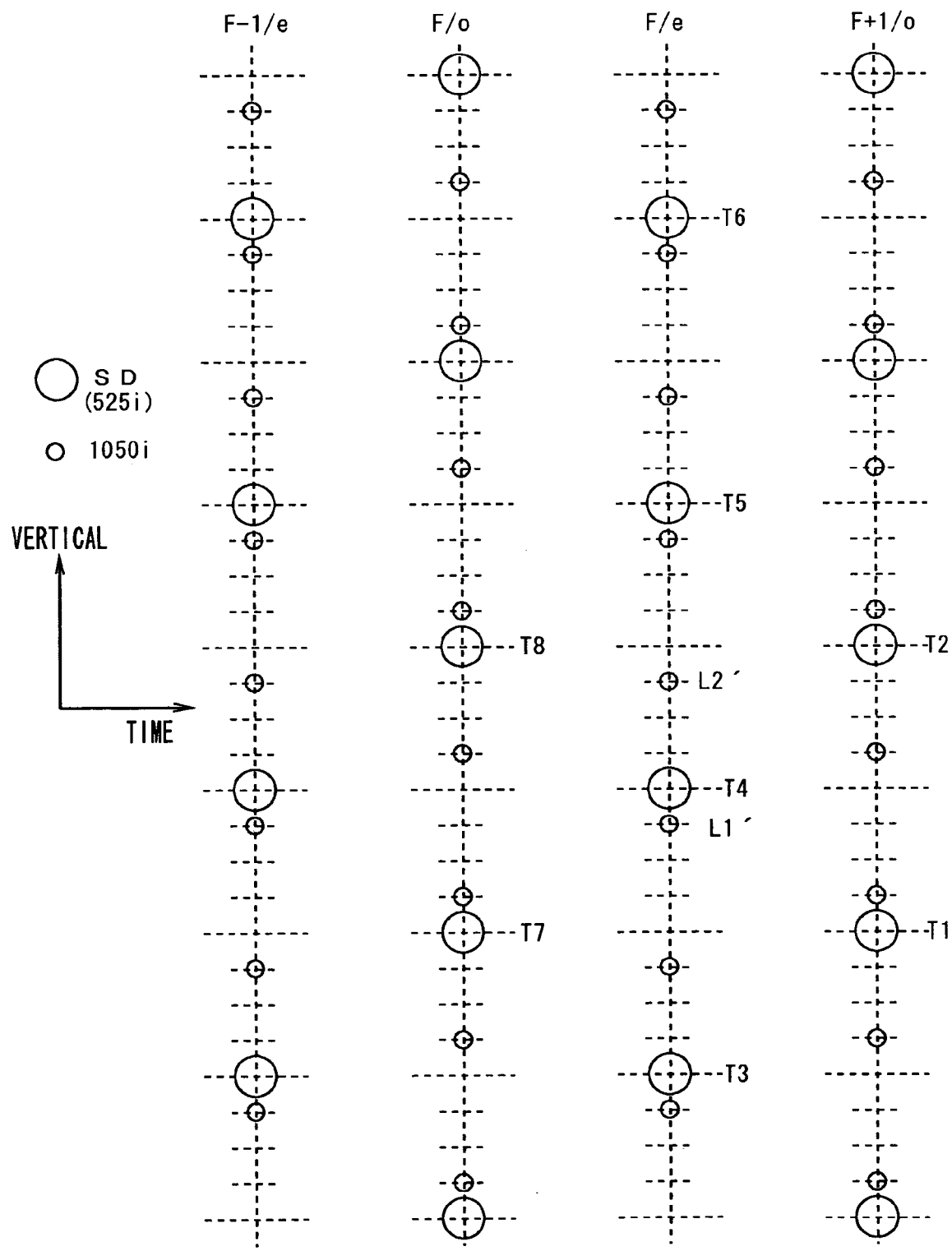

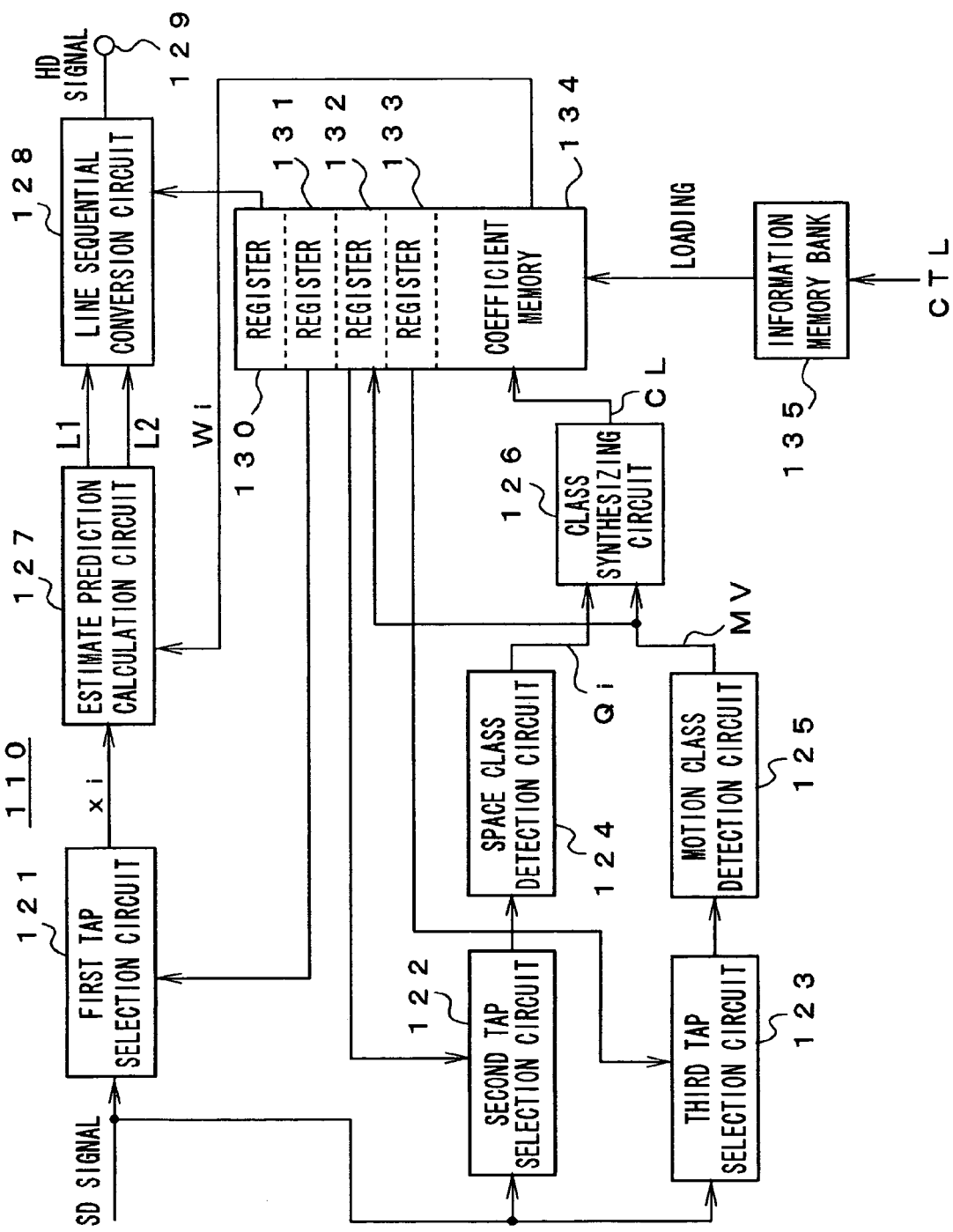

F I G. 2 4

| KINDS OF IMAGE DISPLAY DEVICES | TENDENCY OF COEFFICIENT DATA | STANDARD DEVIATION $\sigma$ | KINDS OF HD SIGNALS |
|---|---|---|---|
| CRT DISPLAY | NORMAL | 2.0 | I OR P |
| LIQUID CRYSTAL DISPLAY | SLIGHTLY LPF | 1.6 | I |
| PLASMA DISPLAY | SLIGHTLY HPF | 2.4 | P |
| PROJECTOR | HPF | 2.8 | P |

IMAGE SIGNAL CONVERSION APPARATUS, METHOD AND, DISPLAY FOR IMAGE SIGNAL CONVERSION BASED ON SELECTED PIXEL DATA

This application is a continuation of U.S. patent application Ser. No. 10/019,977 filed Feb. 15, 2002 now U.S. Pat. No. 6,987,539, the entirety of which is hereby incorporated by reference.

TECHNICAL FIELD

The present invention relates to an image signal conversion apparatus, an image signal conversion method, an image display apparatus using the same, and a coefficient data generating apparatus used therein, which are preferably used, for example, when a video signal of NTSC system is converted into a video signal of high definition television (hereinafter called "HDTV").

BACKGROUND ART

In recent years, because of the enhanced audio visual oriented trend, the development of a television receiver capable of displaying the image having a higher resolution has been desired so that the above HDTV can be developed corresponding to this demand. The number of scanning lines of the HDTV system is 1,125 lines, which is 2-fold or more compared with the number of scanning lines of 525 of NTSC system. Moreover, as for the aspect ratio, the ratio of the HDTV system is 9:16 while the one of NTSC system is 3:4. Therefore, according to the HDTV system, the image having a higher resolution and giving the user more feeling of being at a live performance than NTSC system can be displayed.

Although the HDTV has such excellent characteristics, the image according to the HDTV system cannot be displayed on the HDTV television receiver as if a video signal of NTSC system is supplied to the HDTV television receiver as it is. This is because the standards of NTSC system and the HDTV system are different as described above.

Hence, in order to display an image according to the video signal of NTSC system on the HDTV television receiver, the present applicant has proposed a conversion apparatus for converting the video signal of NTSC system into a video signal of the HDTV system (See Japanese Unexamined Patent Publication No. Hei-08-051599). This conversion apparatus extracts the pixel data of blocks (regions) corresponding to a subject pixel of the video signal of the HDTV system from the video signal of NTSC system, determines a class of the above-described subject pixel on the basis of level distribution patterns of the pixel data of these blocks, and generates pixel data of the above-described subject pixel corresponding to the class.

In the above-described conversion apparatus, however, the resolution of an image according to the video signal of the HDTV system is fixed and this fails to adjust the resolution to the desired one corresponding to the image contents or the like as the conventional adjustments for contrast, sharpness and the like.

Moreover, in the above-described conversion apparatus, an image quality of an image formed from the video signal of the HDTV system is fixed and this fails to obtain the image quality to which the respective users prefer. Therefore, the user has been required to separately perform a few kinds of adjustments for contrast, sharpness and the like, which have been troublesome.

Alternatively, as a display device for displaying an image formed from the video signal of the HDTV system obtained from the above-described conversion apparatus, a CRT (cathode-ray tube) display, a liquid crystal display, a plasma display, a projector and the like are used. In the above-described conversion apparatus, a image quality of the image formed from the video signal of the HDTV system is fixed, so that the image quality adaptable for the image display device to be used is not available. Therefore, the user has been required to separately adjust contrast, sharpness and the like by, for example, the image-quality-adjustment-function provided to the image display device so as to obtain the image quality adaptable for the image display device, which have been troublesome.

An object of the present invention is to provide an image signal conversion apparatus and the like that the user can optionally adjust the resolution of an image formed from an output image signal to the desired value. Another object of the present invention is to provide an image signal conversion apparatus and the like whose image quality of an image formed from an output image signal automatically becomes preferred one for the user, and which is capable of making the adjustments by the user for contrast, sharpness and the like unnecessary. Still another object of the present invention is to provide an image signal conversion apparatus and the like whose image quality of the image formed from an output image signal automatically becomes adaptable for the image display device, and which is capable of making the adjustment by the user for contrast, sharpness and the like unnecessary.

DISCLOSURE OF THE INVENTION

An image signal conversion apparatus according to the present invention for converting a first image signal including a plurality of pixel data to a second image signal including a plurality of pixel data comprises first data selection means for selecting, from the first image signal, a plurality of first pixel data adjacent to a subject pixel of the second signal, class detection means for detecting a class of the subject pixel based on a plurality of the first pixel data selected by this first data selection means, resolution selection means for selecting a resolution of an image formed from the second image signal, and pixel data generation means for generating pixel data of the subject pixel corresponding to the class detected by the class detection means and the resolution selected by the resolution selection means.

An image signal conversion method according to the present invention for converting the first image signal including a plurality of pixel data into the second image signal including a plurality of pixel data comprises a first step of selecting, from the first image signal, a plurality of the first pixel data adjacent to a subject pixel of the second image signal, a second step of detecting a class of the subject pixel based on a plurality of the first pixel data selected in the first step, a third step of selecting a resolution of an image formed from the second image signal, and a fourth step of generating pixel data of the subject pixel corresponding to the class detected in the second step and the resolution selected in the third step.

An image display apparatus according to the present invention comprises image signal input section for inputting a first image signal including a plurality of pixel data, image signal conversion means for receiving the first image signal from the image signal input section, converting the first image signal into a second image signal including a plurality of pixel data, and outputting the second image signal, image display means for receiving the second image signal from the image signal conversion means and displaying an image formed from the second image signal, and resolution selection means for selecting a resolution of the image displayed in the image display means. Then, the image signal conversion means includes first data selection means for selecting, from the first image signal, a plurality of first pixel data adjacent to the subject pixel of the second image signal, class detection means for detecting a class of the subject pixel based on a plurality of the first pixel data selected by the first data selection means, and pixel data generation means for generating pixel data of the subject pixel corresponding to the class detected by the class detection means and the resolution selected by the resolution selection means.

In the present invention, a plurality of first pixel data adjacent to the subject pixel of the second image signal are selected from the first image signal, and a class of the above-described subject pixel is detected on the basis of a plurality of the first pixel data. For example, a level distribution pattern of a plurality of the first pixel data is detected, and a class of the above-described subject pixel is detected on the basis of the level distribution pattern. It should be noted that the first image signal is illustratively obtained from a broadcasting signal. Moreover, the resolution according to the second image signal is selected by operation of pushing resolution grade-up key and resolution grade-down key or by operation of rotating a resolution adjustment knob with by the user. Thus selected resolution is displayed on a screen of the display means on which an image, for example, according to the second image signal is displayed by the means of numerical value, bar graph or the like. The first and second data selection means are commonly configured so that a plurality of the first pixel data and a plurality of the second pixel data may be identical with each other.

Then, a pixel data of the subject pixel is generated corresponding to the selected resolution and the detected class. For example, coefficient data of an estimating equation previously generated according to every combination of the class and the resolution are memorized in a memory and the coefficient data corresponding to the selected resolution and the detected class is read out of this memory as well as a plurality of the second pixel data adjacent to the subject pixel of the second image signal are selected from the first image signal, and pixel data of the above-described subject pixel is calculated by the above-mentioned estimating equation.

As described above, when the first image signal is converted into the second image signal, the pixel data of the subject pixel of the second image signal is generated corresponding to the resolution selected by the user. Therefore, the resolution of an image formed from the second image signal can be optionally adjusted to the desired value by the user as the conventional adjustments for the contrast, sharpness and the like.

A coefficient data generation apparatus according to the present invention for generating coefficient data of an estimating equation used when the first image signal including a plurality of pixel data is converted into a second image signal including a plurality of pixel data comprises signal processing means for processing an instructive signal corresponding to the second image signal and obtaining an input signal corresponding to the first image signal, resolution selection means for selecting a resolution of an image formed from the input signal obtained in the signal processing means, first data selection means for selecting, from the input signal, a plurality of first pixel data adjacent to a subject pixel of the instructive signal, class detection means for detecting a class of the above-described subject pixel based on a plurality of the first pixel data selected by the first data selection means, second data selection means for selecting, from the input signal, a plurality of second pixel data adjacent to a subject pixel of the instructive signal, normal equation generation means for generating a normal equation for obtaining the coefficient data of each class, on the basis of the class detected by the class detection means, a plurality of second pixel data selected by the second data selection means, and the data of the subject pixel of the instructive signal, and coefficient data calculation means for obtaining coefficient data of each class by solving the normal equation.

A coefficient data generation method according to the present invention for generating coefficient data of an estimating equation used when a first image signal including a plurality of pixel data is converted into a second image signal including a plurality of pixel data comprises a first step of processing an instructive signal corresponding to said second image signal and obtaining an input signal corresponding to said first image signal, a second step of selecting a resolution of an image formed from said input signal obtained in said first step, a third step of selecting from said input signal a plurality of first pixel data adjacent to a subject pixel of said instructive signal, a fourth step of detecting a class of said subject pixel based on a plurality of said first pixel data selected in said third step, a fifth step of selecting, from said input signal, a plurality of second pixel data adjacent to said subject pixel of said instructive signal, a sixth step of generating a normal equation for obtaining said coefficient data of each class on the basis of said class detected in said fourth step, a plurality of said second pixel data selected in said fifth step and said data of said subject pixel of said instructive signal, and a seventh step of obtaining coefficient data of said each class by solving said normal equation generated in said sixth step.

In the present invention, the second image signal, for example, the instructive signal corresponding to the video signal of the HDTV system is processed so that the first image signal, for example, an input signal corresponding to the video signal of NTSC system is obtained. In this case, the resolution of an image formed from the input signal corresponds to the previously selected resolution.

A plurality of the first pixel data adjacent to a subject pixel of the instructive signal is selected from the input signal and a class of the above-described subject pixel is detected on the basis of a plurality of the first pixel data. Moreover, a plurality of the second pixel data adjacent to the subject pixel of the instructive signal are selected from the input signal.

Then, a normal equation for obtaining coefficient data of each class is generated from the detected class, a plurality of the selected second pixel data, and the subject pixel of the instructive signal, and coefficient data of each class is obtained by solving the normal equation.

Although coefficient data of an estimating equation used when the first image signal is converted to the second image signal is generated as described above, the lower the resolution of an image formed from the above-described input signal is, the higher the resolution of the image formed from the second image signal is. Owing to this, coefficient data is previously generated by in turn changing the resolution of image formed from the input signal, and then the resolution of the second image signal can be optionally adjusted by selectively using the coefficient data when the first image signal is converted to the second image signal.

An image signal conversion apparatus according to the present invention for converting the first image signal including a plurality of pixel data into the second image signal including a plurality of pixel data comprises first data selection means for selecting, from said first image signal, a plurality of first pixel data adjacent to a subject pixel of said second image signal, class detection means for detecting a class of said subject pixel based on a plurality of said first pixel data selected by said first data selection means, information input section for inputting a user identification information, image quality information obtaining means for obtaining image quality information corresponding to said user identification information input into said information input section, and pixel data generation means for generating pixel data of said subject pixel corresponding to said class detected by said class detection means and said image quality information obtained from said image quality information obtaining means.

An image signal conversion method according to the present invention for converting a first image signal including a plurality of pixel data to the second image signal including a plurality of pixel data comprises a first step of selecting, from the first image signal, a plurality of first pixel data adjacent to a subject pixel of the second image signal, a second step of detecting a class of the subject pixel based on a plurality of the first pixel data selected in the first step, a third step of obtaining image quality information corresponding to input user identification information, and a fourth step of generating pixel data of the subject pixel corresponding to the class detected in the second step and the image quality information obtained in the third step.

An image display apparatus according to the present invention comprises image signal input section for inputting a first image signal including a plurality of pixel data, image signal conversion means for receiving the first image signal from the image signal input section, converting the first image signal into a second image signal including a plurality of pixel data, and outputting the second image signal, image display means for receiving the second image signal from the image signal conversion section and displaying an image formed from the second image signal, user identification means for identifying the user, and image quality information obtaining means for obtaining image quality information corresponding to identification identified by the user identification means. The image signal conversion means includes first data selection means for selecting, from the first image signal, a plurality of first pixel data adjacent to a subject pixel of the second image signal, class detection means for detecting a class of the subject pixel based on a plurality of the first pixel data selected by the first data selection means, and pixel data generation means for generating pixel data of the subject pixel corresponding to the class detected by the class detection means and the image quality information obtained from the image quality information obtaining means.

In this present invention, a plurality of the first pixel data adjacent to the subject pixel of the second image signal is selected from the first image signal, and a class of the above-described subject pixel is detected on the basis of a plurality of the first pixel data.

Moreover, the user may be identified by, for example, the user identification means. The user identification comprises image identification apparatus equipped with solid-state image sensing element. The user identification means may identify the user from its fingerprint, iris, voice or the like, or may identify the user from the input ID number or the like. The image quality information is obtained corresponding to the identification result of the user. For example, a memory means for previously memorizing the corresponding-relationship between the user identification information and the image quality information is mounted and the image quality information is obtained with reference to the corresponding-relationship memorized in the memory means.

Then, a pixel data of the subject pixel is generated corresponding to the obtained image quality information and the detected class. For example, as coefficient data of an estimating equation previously generated according to every combination of the class and the image quality information is memorized in the memory, the coefficient data corresponding to the obtained image quality information and the detected class are read out of this memory as well as a plurality of second pixel data adjacent to the subject pixel of the second image signal are selected from the first image signal and the pixel data of the above-described subject pixel is calculated by the above-described estimating equation.

As described above, when the first image signal is converted to the second image signal, the pixel data of the subject pixel of the second image signal is generated on the basis of the obtained image quality information corresponding to the user identification information. Therefore, as the image quality of an image formed from an output image signal (the second image signal) automatically becomes the one preferred by the user, it is not necessary for the user to perform the adjustments for contrast, sharpness or the like.

An image signal conversion apparatus according to the present invention for converting a first image signal including a plurality of pixel data into a second image signal including a plurality of pixel data comprises first data selection means for selecting, from the first image signal, a plurality of first pixel data adjacent to a subject pixel of the second image signal, class detection means for detecting a class of the subject pixel based on a plurality of the first pixel data selected by the first data selection means, information input section for inputting display-device-information including first identification information showing at least a kind of image display device, image quality information obtaining means for obtaining image quality information corresponding to the first identification information included in the display-device-information received from the information input section, and pixel data generation means for generating pixel data of said subject pixel corresponding to the class detected by the class detection means and the image quality information obtained from the image quality information obtaining means.

An image signal conversion method according to the present invention for converting a first image signal including a plurality of pixel data into a second image signal including a plurality of pixel data comprises a step of selecting, from the first image signal, a plurality of first pixel data adjacent to a subject pixel of the second image signal, a step of detecting a class of the subject pixel based on a plurality of the selected first pixel data, a step of inputting display-device-information including first identification information showing at least a kind of image display device, a step of obtaining image quality information corresponding to the first identification information included in the input display-device-information, and a step of generating pixel data of said subject pixel corresponding to the detected class and the obtained image quality information.

An image display apparatus according to the present invention comprises an image signal input section for inputting a first image signal including a plurality of pixel data, image signal conversion means for receiving the first image signal from the image signal input section, converting the first image signal into a second image signal including a plurality of pixel data, and outputting the second image signal, and image display device for receiving the second image signal from the image signal conversion means and displaying an image formed from the second image signal. The image display device includes memory means for memorizing display-device-information including a first identification information showing a kind of image display device at least, and information sending means for sending said display-device-information memorized in the memory means to said image signal conversion section as well as the image signal conversion means includes first data selection means for selecting, from the first image signal, a plurality of first pixel data adjacent to a subject pixel of the second image signal, class detection means for detecting a class of the subject pixel based on a plurality of the first pixel data selected by the first data selection means, information receiving means for receiving the display-device-information sent from the image display device, image quality information obtaining means for obtaining image quality information corresponding to the first identification information included in the display-device-information received by said information receiving means, and pixel data generation means for generating pixel data of the subject pixel corresponding to the class detected by the class detection means and the image quality information obtained from the image quality information obtaining means.

In this present invention, a plurality of the first pixel data adjacent to the subject pixel of the second image signal is selected from the first image signal, and a class of the above-described subject pixel is detected on the basis of a plurality of the first pixel data.

The image quality information corresponding to the first identification information indicating the kind of an image display device is obtained. For example, a memory means for previously memorizing the corresponding-relationship between the first identification information and the image quality information is mounted and the image quality information is obtained with reference to the corresponding-relationship memorized in the memory means.

Then, a pixel data of the subject pixel is generated corresponding to the obtained image quality information and the detected class. For example, as coefficient data of an estimating equation previously generated according to every combination of the class and the image quality information is memorized in the memory, the coefficient data corresponding to the obtained image quality information and the detected class may be read out of the memory as well as a plurality of second pixel data adjacent to the subject pixel of the second image signal are selected from the first image signal and the pixel data of the above-described subject pixel is calculated by the above-described estimating equation.

As described above, when the first image signal is converted to the second image signal, the pixel data of the subject pixel of the second image signal is generated on the basis of the obtained image quality information corresponding to the first identification information indicating the kind of an image display device. Therefore, as the image quality of an image formed from an output image signal (second image signal) is automatically adaptable for the image display device, it is not necessary for the user to perform the adjustments for contrast, sharpness or the like.

Moreover, when the second image signal is supplied to the image display device having image quality adjustment functions such as contrast and sharpness and the image display device displays an image formed from the second image signal, these functions are invalidated. Owing to this, the deterioration of the image quality of the image formed from the second image signal can be prevented by the image quality adjustment of the image display device, and the performance of the image signal conversion section is capable of exerting to the maximum.

BRIEF DESCRIPTION OF THE DRAWINGS

FIG. 6 is a diagram showing the relationship of pixel positions between 525*i* signal and 1050*i* signal and one example of a prediction tap;

FIG. 7 is a diagram showing the relationship of pixel positions between 525*i* signal and 1050*i* signal and one example of a prediction tap;

FIG. 23 is a block diagram showing a configuration of an image signal conversion section; and FIG. 24 is a diagram showing the kinds of image display device, the tendency of coefficient data, standard deviation σ, and examples of relationship of the kinds of HD signals.

BEST MODE FOR CARRYING OUT THE INVENTION

Figure 1:
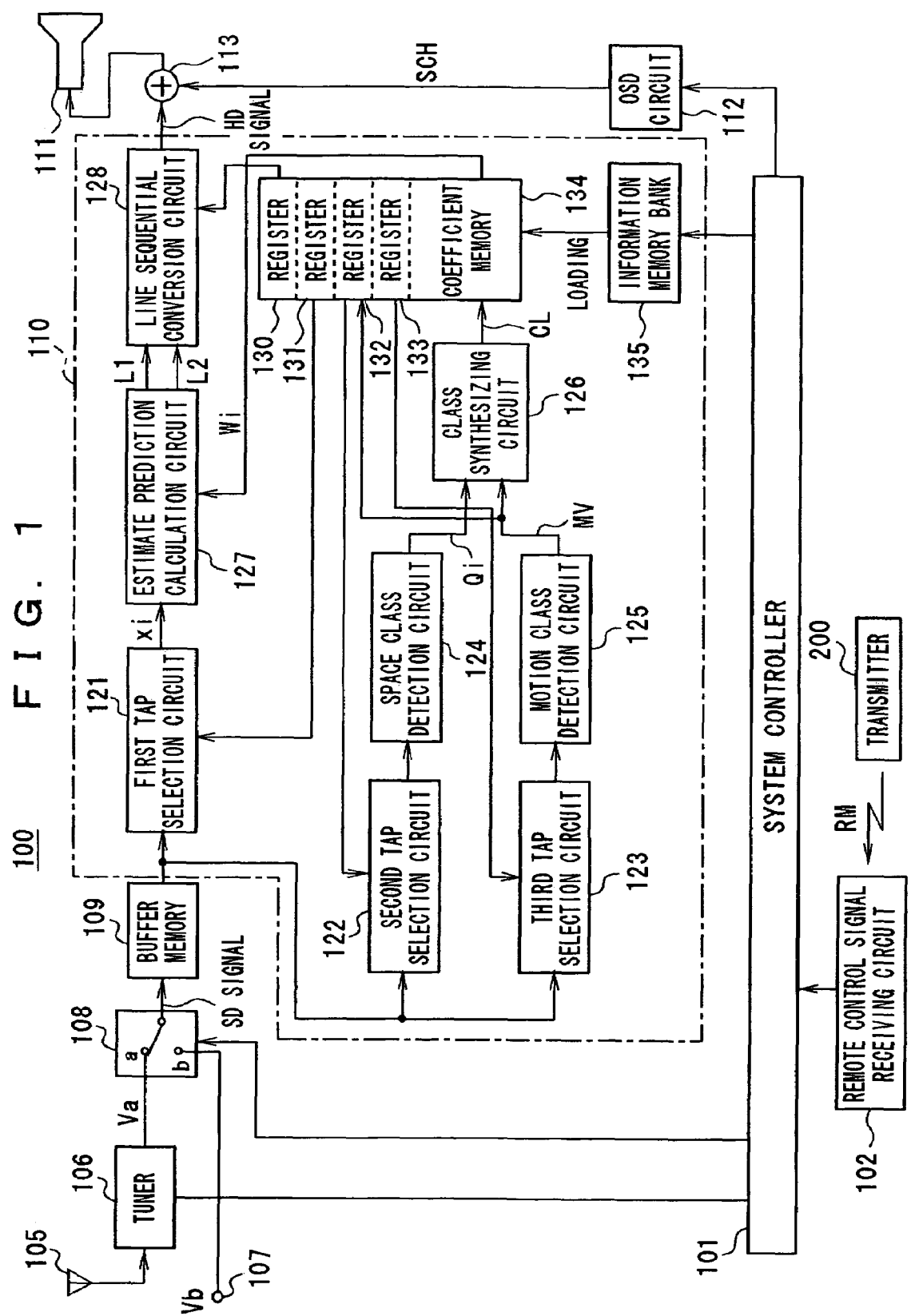
FIG. 1 is a block diagram showing a configuration of a television receiver as a preferred embodiment of the present invention.

FIG. 1 shows a configuration of a television receiver 100 as an preferred embodiment of the present invention. The television receiver 100 obtains as SD (Standard Definition) signal of 525$i$ signal from a broadcasting signal, the 525$i$ signal is then converted to a HD (High Definition) signal of 525$p$ signal or 1050$i$ signal, and the television receiver displays an image formed from its 525$p$ signal or 1050$i$ signal.

Now, 525$i$ signal is referred to an image signal for scanning the number of lines of 525 by interlace method, 525$p$ signal is referred to an image signal for scanning the number of lines of 525 by progressive method (non-interlace method), and 1050$i$ signal is referred to an image signal for scanning the number of lines of 1050 by interlace method.

The television receiver 100 comprises a system controller 101 with a microcomputer for controlling operations of the entire system and a remote control signal receiving circuit 102 for receiving remote control signal. The remote control signal receiving circuit 102 is connected to the system controller 101 and the receiving circuit is configured it receives remote control signal RM from the remote control transmitter 200 according to the operations of a user and supplies operation signal corresponding to the signal RM to the system controller 101.

Moreover, the television receiver 100 comprises a receiving antenna 105, a tuner 106 for receiving a broadcasting signal (RF modulating signal) captured by this receiving antenna 105 and obtaining the above-described SD signal Va (525$i$ signal) by performing a tuning processing, an intermediate frequency amplification processing, a detection processing and the like, an external input terminal 107 for inputting SD signal Vb (525$i$ signal) from the external, a changing-over switch 108 for selectively outputting either one of these SD signals Va and Vb, and a buffer memory 109 for storing temporarily the SD signal received from the change-over switch 108.

The SD signal Va output from the tuner 106 is supplied to the fixed terminal of "a" side of the change-over switch 108 while the SD signal Vb input through the external input terminal 107 is supplied to the fixed terminal on "b" side of the change-over switch 108. The change-over switch 108 is controlled by the system controller 101.

The television receiver 100 comprises further an image signal conversion section 110 for converting the SD signal (525$i$ signal) temporarily stored in the buffer memory 109 to a HD signal (525$p$ signal or 1050$i$ signal), a display section 111 for displaying an image formed from the HD signal output from the image signal conversion section 110, an OSD (On Screen Display) circuit 112 for generating a display signal SCH for displaying character, pattern and the like on the screen of the display section 111, and a superimposing device 113 for superimposing its display signal SCH on the HD signal received from the above-described image signal conversion section 110 and supplying it to the display section 111.

The display section 111 includes a CRT (cathode-ray tube) display or a flat panel display such as LCD (liquid crystal display). Moreover, the generation operation of the display signal SCH in the OSD circuit 112 is also controlled by the system controller 101.

An operation of the television receiver 100 shown in FIG. 1 will be described below.

When a mode for displaying an image corresponding to the SD signal Va received from the tuner 106 is selected on the basis of the operation of the remote control transmitter 200 by the user, the change-over switch 108 is connected to the "a" side by the control of the system controller 101, and the SD signal Va is output from the change-over switch 108. Alternatively, when a mode for displaying an image corresponding to the SD signal Vb input through the external input terminal 107 is selected on the basis of the operation of the remote control transmitter 200 by the user, the change-over switch 108 is connected to the "b" side by the control of the system controller 101, and the SD signal Vb is output from the change-over switch 108.

The SD signal (525$i$ signal) output from the change-over switch 108 is memorized and temporarily stored in the buffer memory 109. Then, the SD signal thus temporarily stored in the buffer memory 109 is supplied to the image signal conversion section 110 wherein it is converted to the HD signal (525$p$ signal or 1050$i$ signal). Specifically, in the image signal conversion section 110, pixel data constituting the HD signal (hereinafter, referred to as "HD pixel data") is obtained from pixel data constituting the SD signal (hereinafter, referred to as "SD pixel data"). The HD signal output from the image signal conversion section 110 is supplied to the display section 111 via the superimposing device 113, and an image formed from the HD signal is displayed on the screen of the display section 111. Moreover, the selection of 525$p$ signal or 1050$i$ signal is performed by the operation of the remote control transmitter 200 by the user.

Moreover, the user can select a resolution of the image displayed on the screen of the display section 111 by the operation of the remote control transmitter 200. For example, in the resolution selection mode, the resolution is selected by operation of pushing grade-up key and grade-down key. Moreover, for example, in the resolution selection mode, the resolution is selected by operation of rotating the knob such as jogging dial or the like.

In the image signal conversion section 110, as described later, although the HD pixel data is calculated by an estimating equation, the data corresponding to the resolution selected by the operation of the remote control transmitter 200 by the user is used as coefficient data of the estimating equation. Owing to this, the resolution of an image according to the HD signal output from the image signal conversion section 110 corresponds to the resolution selected by the operation of the user.

When the selection operation of the resolution is performed by the operation of the remote control transmitter 200 by the user, the selected resolution is displayed on the screen of the display section 111. Although herein it is not shown, this display is indicated by a numerical value, bar graph or the like. The user can select the resolution with reference to the resolution display. When the selected resolution is displayed in this way on the screen, the system controller 101 supplies the display data to the OSD circuit 112. The OSD circuit 112 generates the display signal SCH on the basis of the display data, and supplies the display signal SCH to the display section 111 via the superimposing device 113.

Next, the image signal conversion section 110 will be described in detail below. The image signal conversion section 110 comprises first to third tap selection circuits 121-123 for selectively fetching a plurality of the SD pixel data adjacent to a subject pixel of the HD signal (1050$i$ signal or 525$p$ signal) from the SD signal (525$i$ signal) memorized in the buffer memory 109 and outputting it.

A first tap selection circuit 121 is a circuit for selectively fetching the data of the SD pixel used for a prediction (referred to as "prediction tap"). A second tap selection circuit 122 is a circuit for selectively fetching the data of the SD pixel used for class classification corresponding to the level distribution pattern of the SD pixel data (referred to as "space class tap"). A third tap selection circuit 123 is a circuit for selectively fetching the data of the SD pixel used for class classification corresponding to the motion (referred to as "motion class tap"). When a space class is determined using the SD pixel data belonging to a plurality of fields, this space class also includes the motion information.

Figure 2:
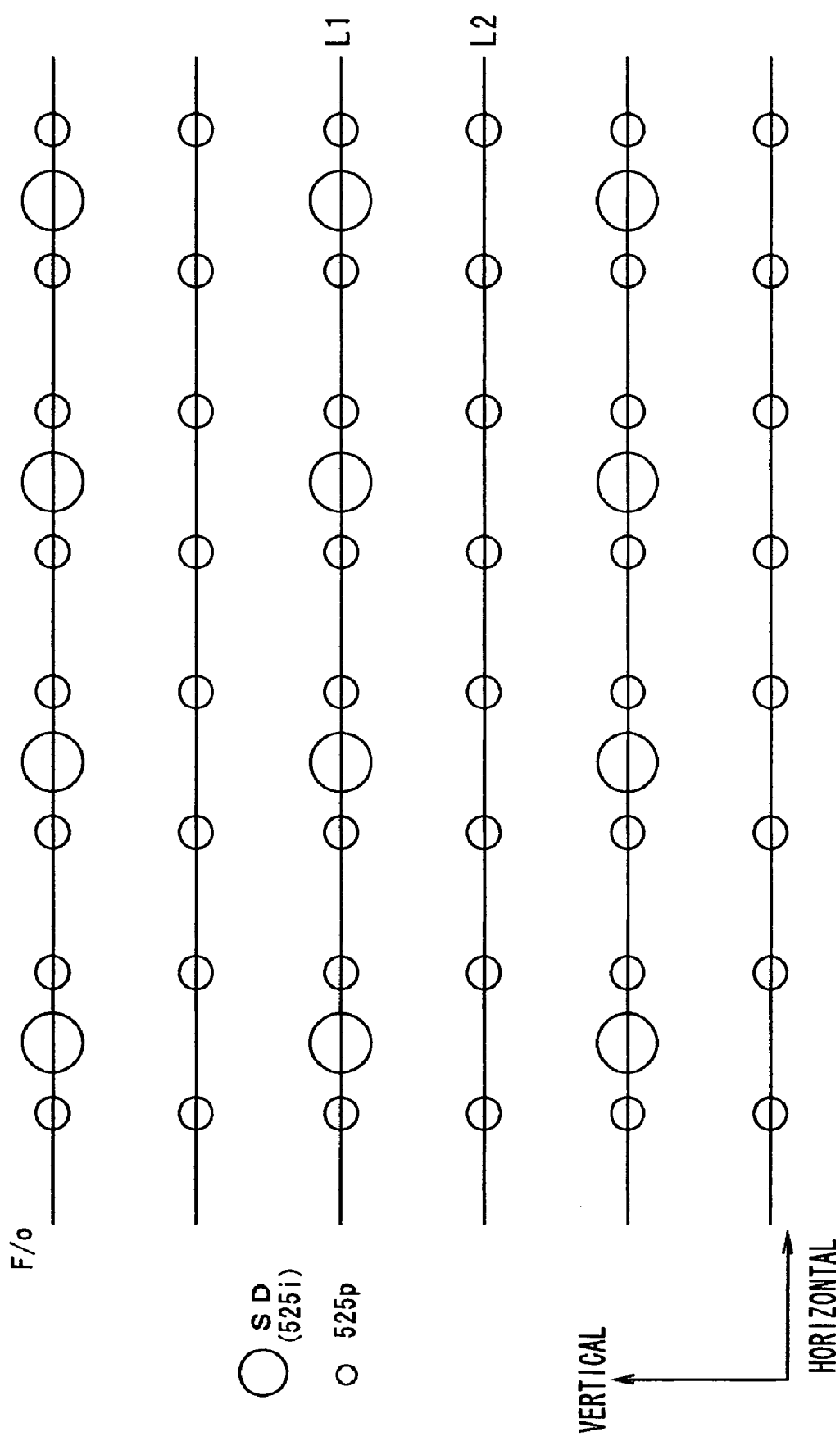
FIG. 2 is a diagram for illustrating the relationship of pixel positions between 525*i* signal and 525*p* signal.

FIG. 2 shows the relationship of pixel positions of an odd number field (o) in a frame (F) in which the 525*i* signal and 525*p* signal exist. The large dot denotes a pixel of 525*i* signal, and the smaller dot denotes a pixel of 525*p* signal to be output. In the even number field (e), the line of 525*i* signal is a line deviated spatially 0.5 portion. As is apparent from FIG. 2, as a pixel data of 525*p* signal, line data L1 which is the same location with the line of 525*i* signal and line data L2 which is located at the intermediate location between the upper and lower lines of the 525*i* signal exist. Moreover, now, the number of pixels of the respective lines of 525*p* signals is two-fold of the number of pixels of the respective lines of the 525*i* signals.

Figure 3:
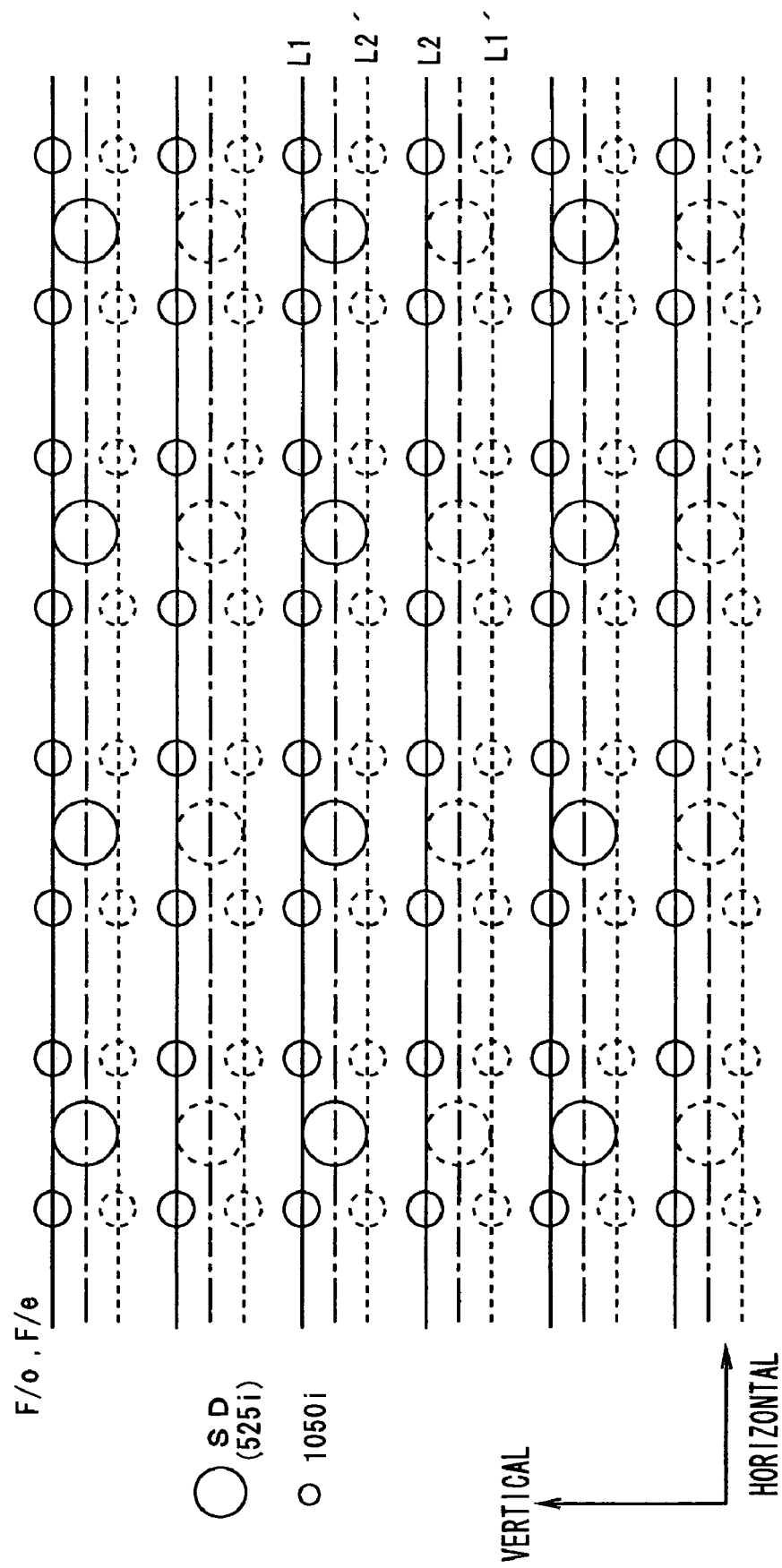
FIG. 3 a diagram for illustrating the relationship of pixel positions between 525*i* signal and 1050*i* signal.

FIG. 3 shows the relationship of pixel positions in a frame (F) in which the 525*i* signal and 1050*i* signal exist. The continuous line denotes a position of a pixel of 525*i* signal in the odd number field (o), and the dashed line denotes a position of a pixel of 525*p* signal in the even number field (e). The large dot denotes a pixel of 525*i* signal, and the smaller dot denotes a pixel of 1050*i* signal to be output. As is apparent from FIG. 3, as pixel data of 1050*i* signal, line data L1 and L1' adjacent to the line of 525*i* signal and line data L2 and L2' away from the line of 525*i* signal exist, where L1 and L2 are line data in the odd number field, and the L1' and L2' are line data in the even number field. Moreover, the number of pixels of the respective lines of 1050*i* signal is two-fold of the number of pixels of the respective lines of the 525*i* signals.

Figure 4:
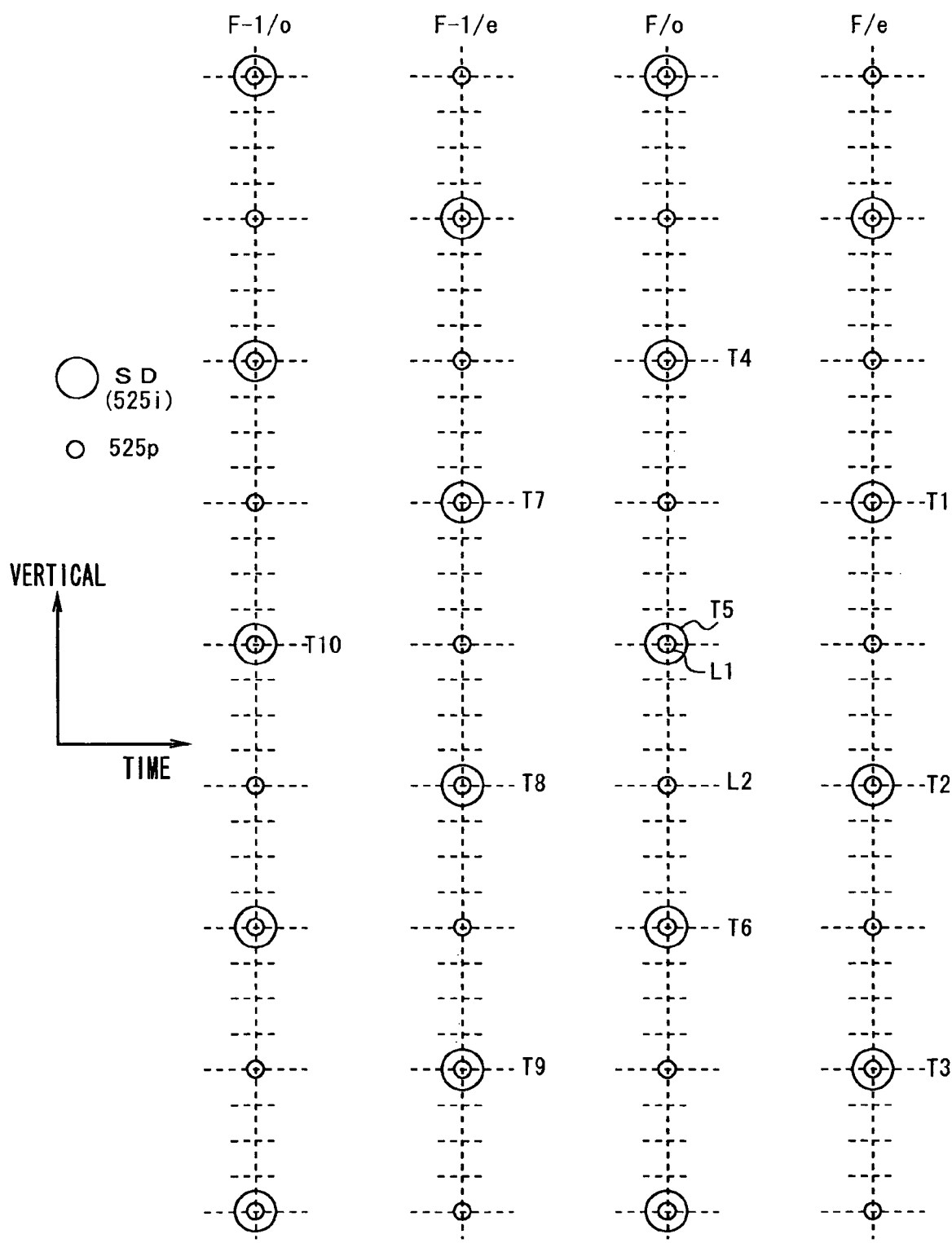
FIG. 4 is a diagram showing the relationship of pixel positions between 525*i* signal and 525*p* signal and one example of a prediction tap.
Figure 5:
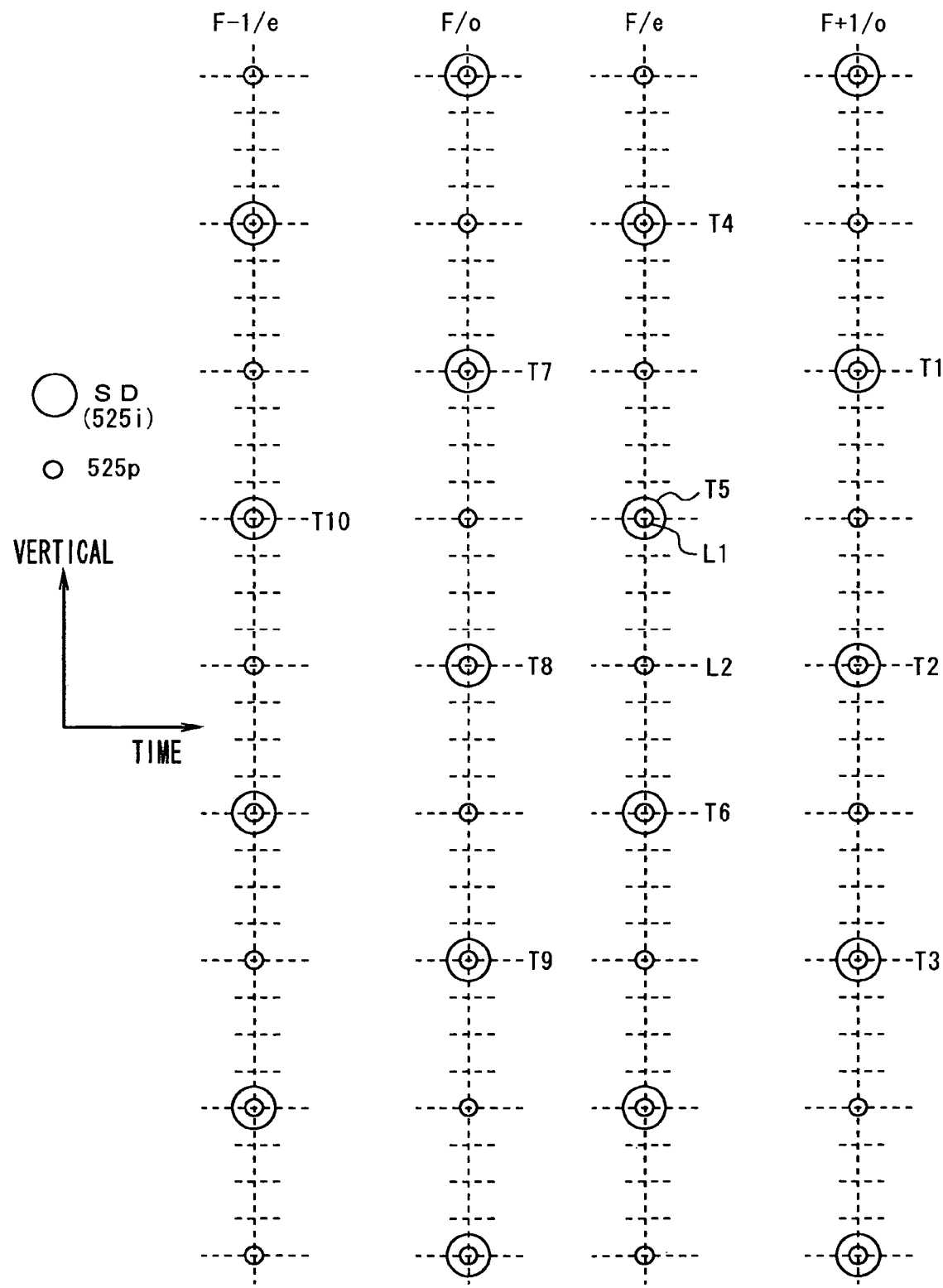
FIG. 5 is a diagram showing the relationship of pixel positions between 525*i* signal and 525*p* signal and one example of a prediction tap.

FIG. 4 and FIG. 5 show concrete examples of the prediction tap (SD pixel) selected by the first tap selection circuit 121 when the 525*i* signal is converted to 525*p* signal. FIG. 4 and FIG. 5 show the relationship of the pixel positions in the vertical direction in the odd number field (o) and even number field (e) of the frame F−1, F, and F+1, which are continuous in time.

As shown in FIG. 4, when the line data L1 and L2 of the field F/o are predicted, prediction taps are SD pixels T1, T2 and T3 spatially adjacent to the pixel of 525*p* signal (subject pixel) to be prepared and located in the field F/e, SD pixels T4, T5 and T6 spatially adjacent to the pixel of 525*p* signal to be prepared and located in the field F/o, SD pixels T7, T8 and T9 spatially adjacent to the pixel of 525*p* signal to be prepared and located in the field F−1/e and further, SD pixel T10 spatially adjacent to the pixel of 525*p* signal to be prepared and located in the field of F−1/o.

As shown in FIG. 5, when the line data L1 and L2 of the field F/e are predicted, prediction taps are SD pixels T1, T2 and T3 spatially adjacent to the pixel of 525*p* signal to be prepared and located in the field F+1/o, SD pixels T4, T5 and T6 spatially adjacent to the pixel of 525*p* signal to be prepared and located in the field F/e, SD pixels T7, T8 and T9 spatially adjacent to the pixel of 525*p* signal to be prepared and located in the field F/o and further, SD pixel T10 spatially adjacent to the pixel of 525*p* signal to be prepared and located in the field of F−1/e.

It should be noted that when the line data L1 is predicted, the SD pixel T9 may not be selected as a prediction tap, whereas when the line data L2 is predicted, the SD pixel T4 may not be selected as a prediction tap, or other tap examples may be available.

FIG. 6 and FIG. 7 show concrete examples of the prediction tap (SD pixel) selected in the first tap selection circuit 121 when 525*i* signal is converted to 1050*i* signal. FIG. 6 and FIG. 7 show the relationship of pixel positions in the vertical direction in the odd number field (o) and the even number field (e) of the frame F−1, F, F+1, which are continuous in time.

As shown in FIG. 6, when the line data L1 and L2 of the field F/o are predicted, prediction taps are the SD pixels T1 and T2 spatially adjacent to the pixel of 1050*i* signal (subject pixel) to be prepared and located in the field F/e, the SD pixels T3, T4, T5 and T6 spatially adjacent to the pixel of 525*p* signal to be prepared and located in the field F/o, the SD pixels T7 and T8 spatially adjacent to the pixel of 1050*i* signal to be prepared and located in the field F−1/e.

As shown in FIG. 7, when the line data L1' and L2' of the field F/e are predicted, prediction taps are the SD pixels T1 and T2 spatially adjacent to the pixel of 1050*i* signal (subject pixel) to be prepared and located in the field F+1/o, the SD pixels T3, T4, T5 and T6 spatially adjacent to the pixel of 1050*i* signal to be prepared and located in the field F/e, the SD pixels T7 and T8 spatially adjacent to the pixel of 1050*i* signal to be prepared and located in the field F/o.

It should be noted that when the line data L1 and L1' are predicted, the SD pixel T6 may not be selected as a prediction tap, whereas when the line data L2 and L2' are predicted, the SD pixel T3 may not be selected as a prediction tap.

Furthermore, as shown in FIG. 4 through FIG. 7, in addition to the SD pixels distributed in the vertical direction in each of the fields, one or more SD pixels distributed in the horizontal direction may be selected as a prediction tap, or other tap examples may be available.

Figure 8:
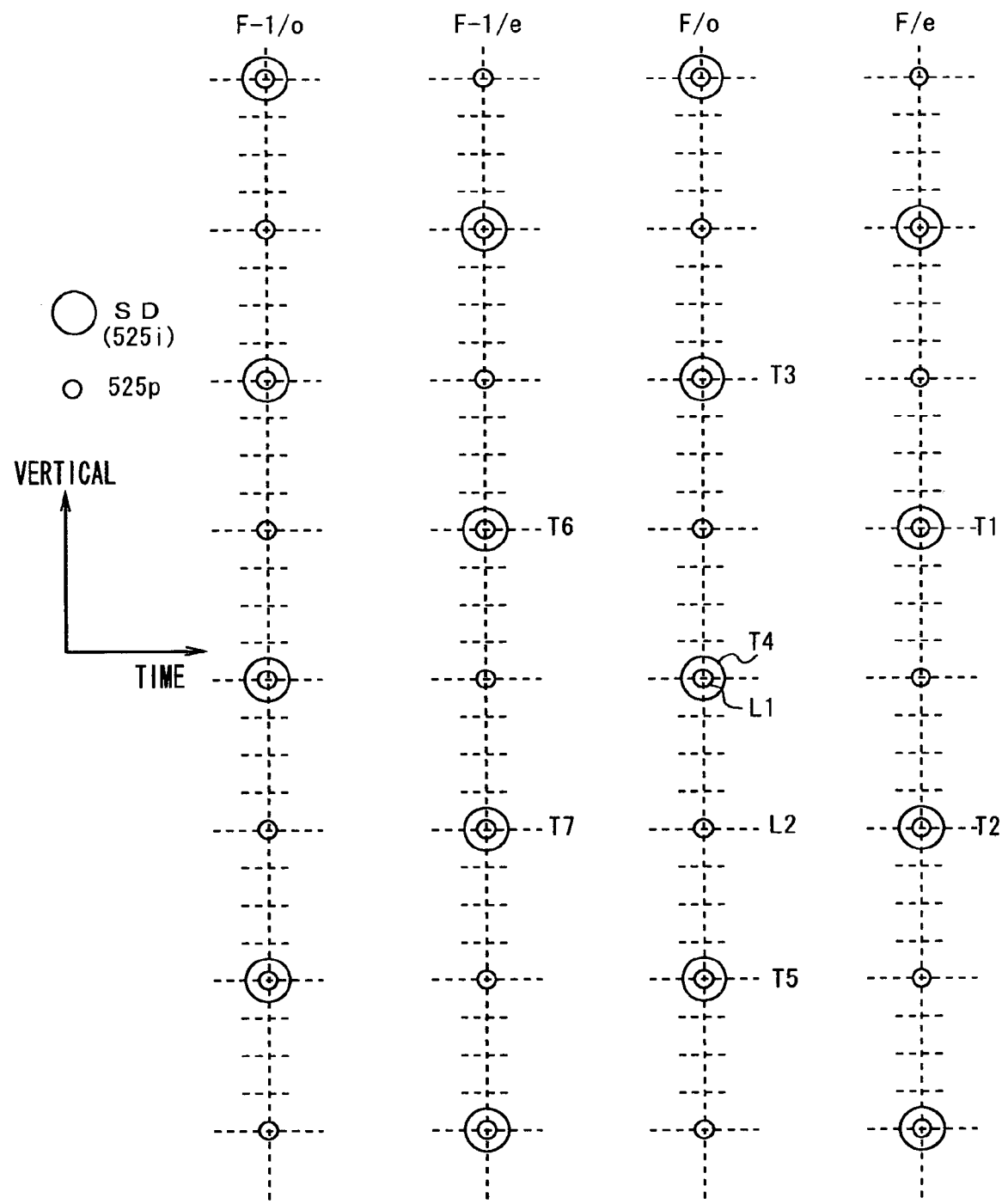
FIG. 8 is a diagram showing the relationship of pixel positions between 525*i* signal and 525*p* signal and one example of a space class tap.
Figure 9:
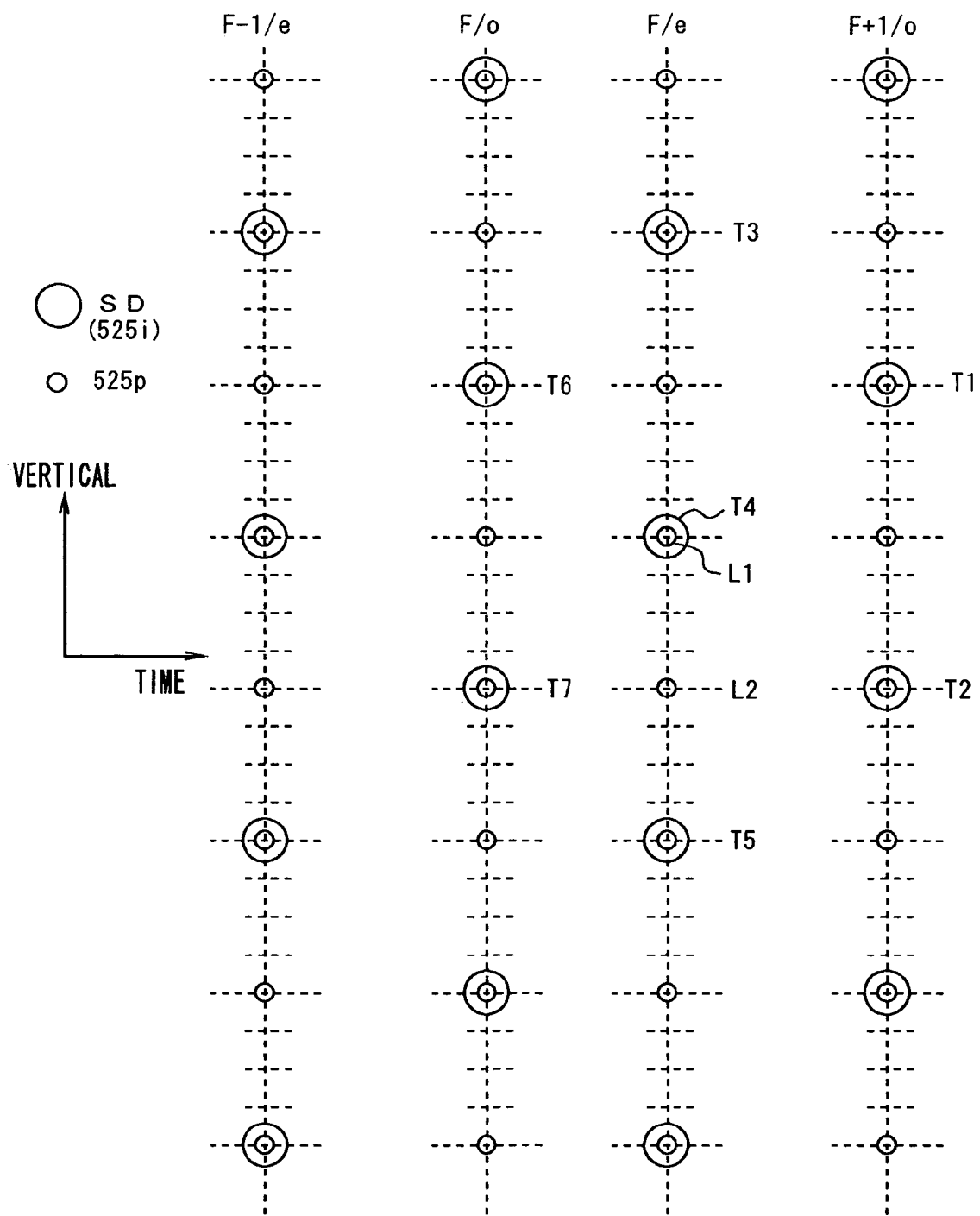
FIG. 9 is a diagram showing the relationship of pixel positions between 525*i* signal and 525*p* signal and one example of a space class tap.

FIG. 8 and FIG. 9 show concrete examples of the space class tap (SD pixel) selected by the second tap selection circuit 122 when 525*i* signal is converted to 525*p* signal. FIG. 8 and FIG. 9 show the relationship of pixel positions in the vertical direction of the odd number field (o) and the even number field (e) of the frames F−1, F, F+1, which are continuous in time.

As shown in FIG. 8, when the line data L1 and L2 of the field F/o are predicted, space class taps are the SD pixels T1 and T2 spatially adjacent to the pixel of 525*p* signal (subject pixel) to be prepared and located in the field F/e, the SD pixels T3, T4 and T5 spatially adjacent to the pixel of 525*p* signal to be prepared and located in the field F/o, the SD pixels T6 and T7 spatially adjacent to the pixel of 525*p* signal to be prepared and located in the field F−1/e.

As shown in FIG. 9, when the line data L1 and L2 of the field F/e are predicted, space class taps are the SD pixels T1 and T2 spatially adjacent to the pixel of 525*p* signal (subject pixel) to be prepared and located in the field F+1/o, the SD pixels T3, T4 and T5 spatially adjacent to the pixel of 525*p* signal to be prepared and located in the field F/e, the SD pixels T6 and T7 spatially adjacent to the pixel of 525*p* signal to be prepared and located in the field F/o.

It should be noted that when the line data L1 is predicted, the SD pixel T7 may not be selected as a space class tap, whereas when the line data L2 is predicted, the SD pixel T6 may not be selected as a space class tap, or other tap examples may be available.

Figure 10:
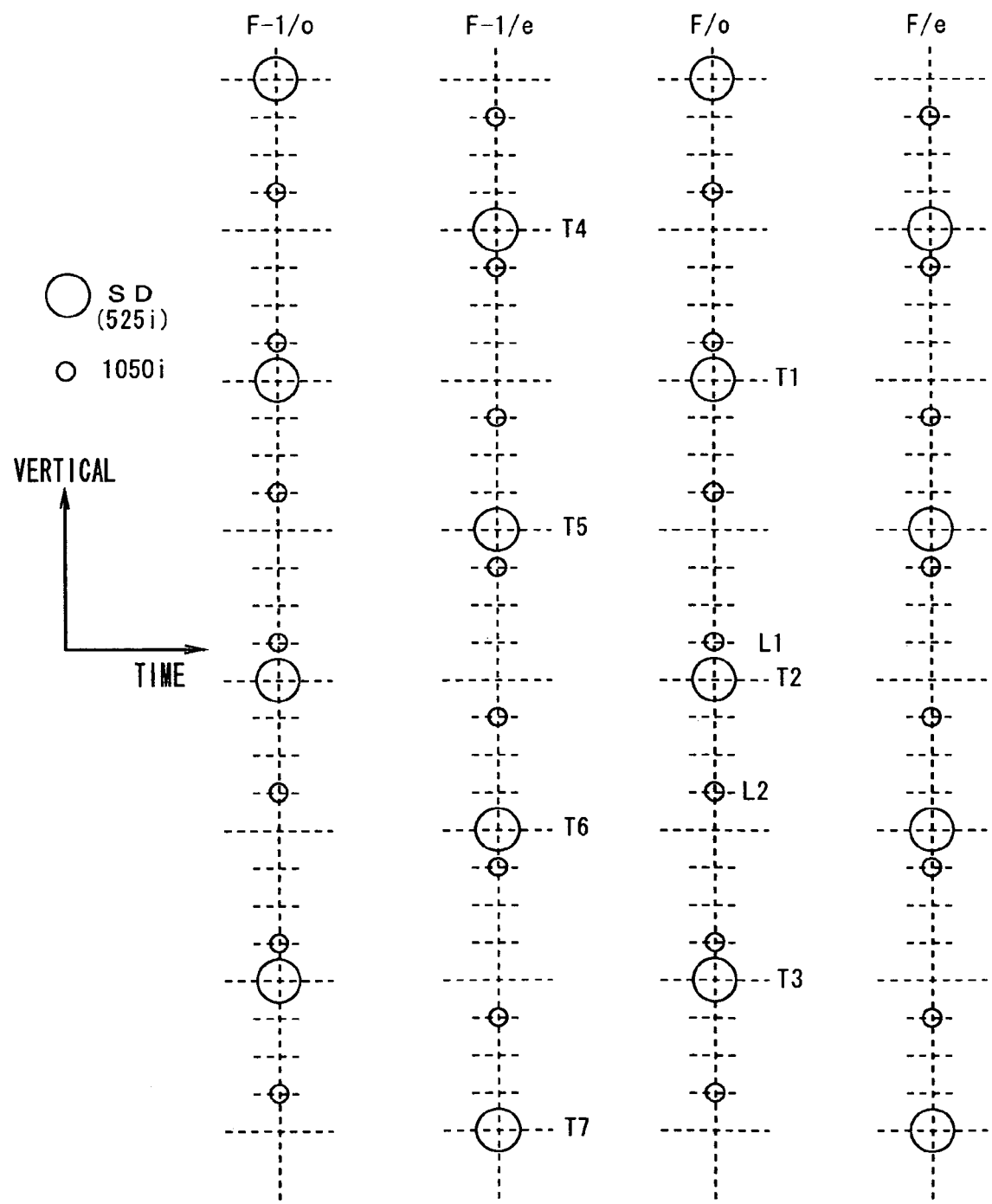
FIG. 10 is a diagram showing the relationship of pixel positions between 525*i* signal and 1050*i* signal and one example of a space class tap.
Figure 11:
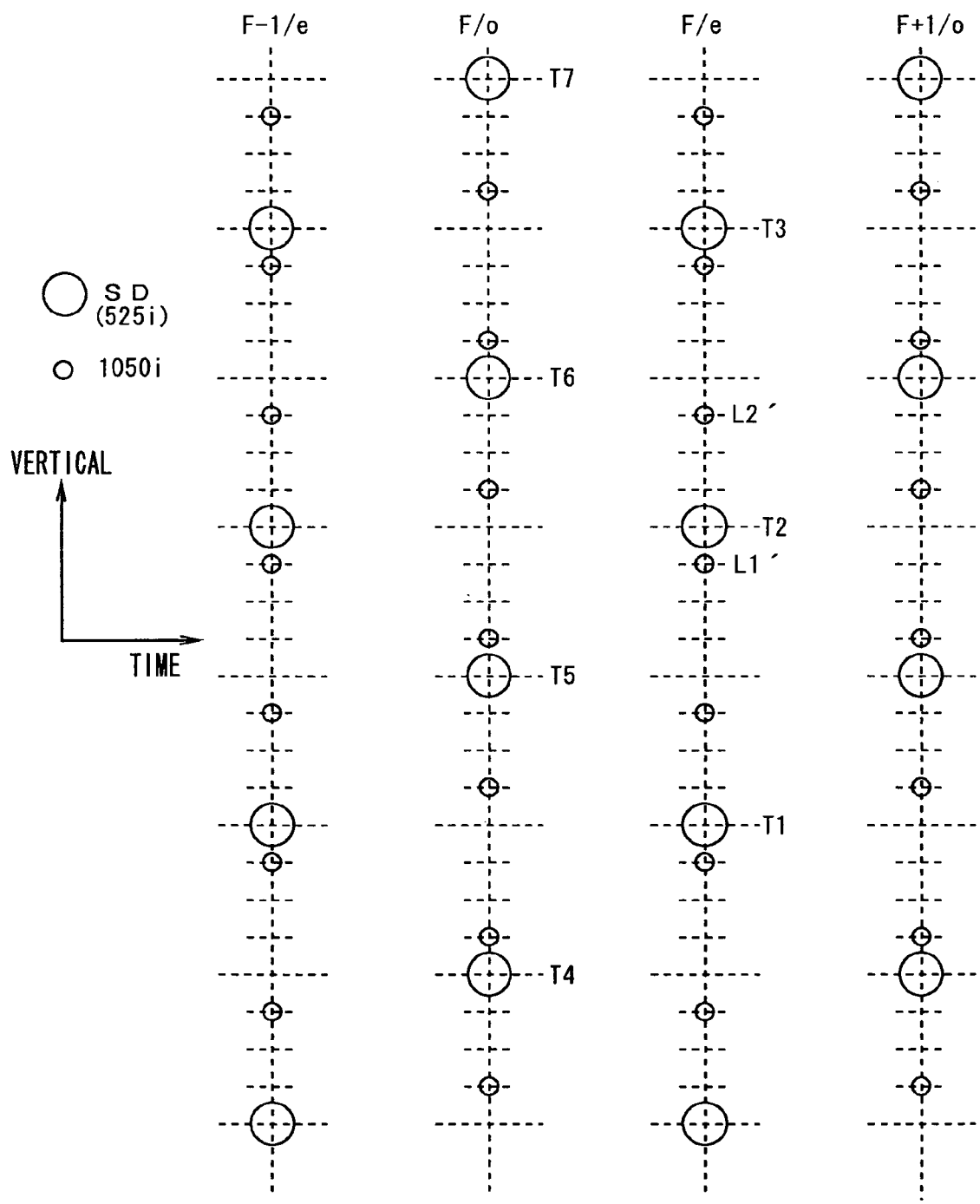
FIG. 11 is a diagram showing the relationship of pixel positions between 525*i* signal and 1050*i* signal and one example of a space class tap.

FIG. 10 and FIG. 11 show concrete examples of the space class tap (SD pixel) selected by the second tap selection circuit 122 when 525*i* signal is converted to 1050*i* signal. FIG.

10 and FIG. 11 show the relationship of pixel positions in the vertical direction of the odd number field (o) and the even number field (e) of the frames F−1, F, F+1, which are continuous in time.

As shown in FIG. 10, when the line data L1 and L2 of the field F/o are predicted, space class taps are the SD pixels T1, T2 and T3 spatially adjacent to the pixel of 1050*i* signal (subject pixel) to be prepared and located in the field F−1/o, the SD pixels T4, T5, T6 and T7 spatially adjacent to the pixel of 1050*i* signal to be prepared and located in the field F/e.

As shown in FIG. 11, when the line data L1' and L2' of the field F/e are predicted, space class taps are the SD pixels T1, T2 and T3 spatially adjacent to the pixel of 1050*i* signal (subject pixel) to be prepared and located in the field F/e, the SD pixels T4, T5, T6 and T7 spatially adjacent to the pixel of 1050*i* signal to be prepared and located in the field F/o.

It should be noted that when the line data L1 and L1' are predicted, the SD pixel T7 may not be selected as a space class tap whereas when the line data L2 and L2' are predicted, the SD pixel T4 may not be selected as a space class tap, or other tap examples may be available.

Furthermore, as shown in FIG. 8 through FIG. 11, in addition to the SD pixels distributed in the vertical direction in each of the fields, one or a plurality of SD pixels distributed in the horizontal direction may be selected as a prediction tap, or other tap examples may be available.

Figure 12:
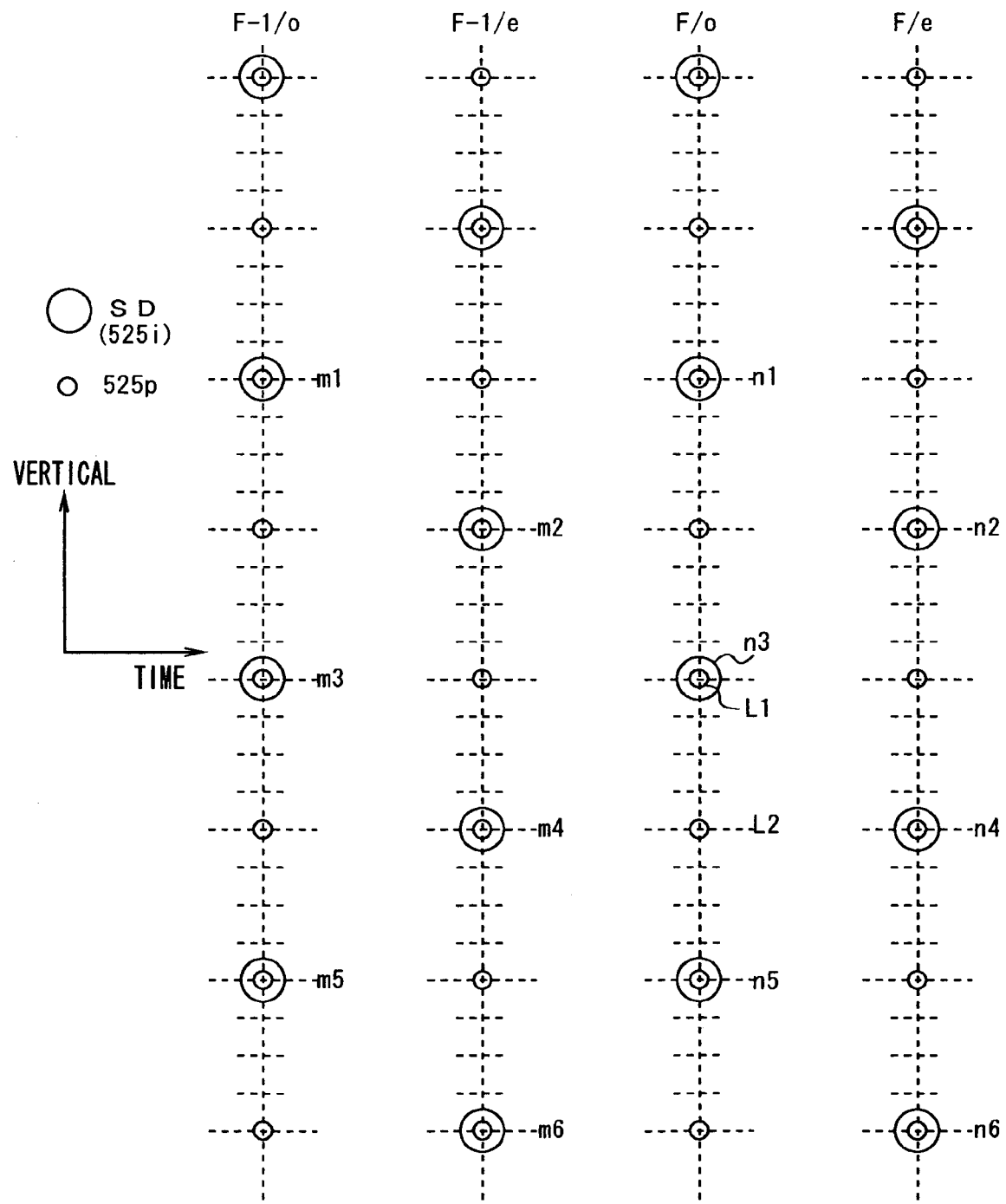
FIG. 12 is a diagram showing the relationship of pixel positions between 525*i* signal and 525*p* signal and one example of a motion class tap.

FIG. 12 shows a concrete example of motion class tap (SD pixel) selected by the third tap selection circuit 123 when 525*i* signal is converted to 525*p* signal. FIG. 12 shows the relationship of pixel positions in the vertical direction of the odd number field (o) and the even number field (e) of the frames F−1, F, which are continuous in time.

As shown in FIG. 12, when the line data L1 and L2 of the field F/o are predicted, motion class taps are the SD pixels n2, n4 and n6 spatially adjacent to the pixel of 525*p* signal (subject pixel) to be prepared and located in the field F/e, the SD pixels n1, n3 and n5 spatially adjacent to the pixel of 525*p* signal to be prepared and located in the field F/o, the SD pixels m2, m4 and m6 spatially adjacent to the pixel of 525*p* signal to be prepared and located in the field F−1/e, and the SD pixels m1, m3 and m5 spatially adjacent to the pixel of 525*p* signal to be prepared and located in the field F−1/o. The respective positions in the vertical direction of the SD pixels n1-n6 correspond with the respective positions in the vertical direction of the SD pixels m1-m6.

Figure 13:
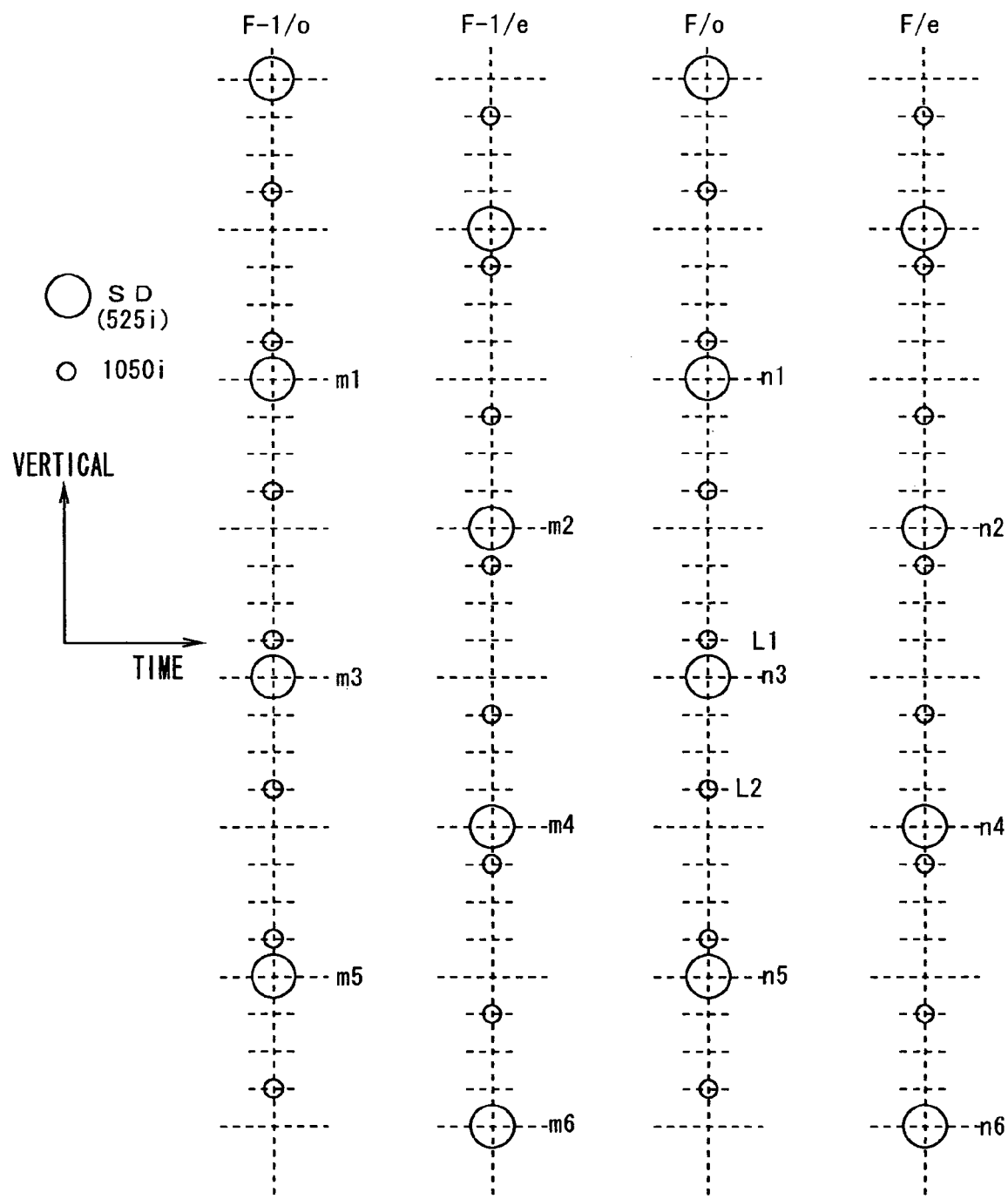
FIG. 13 is a diagram showing the relationship of pixel positions between 525*i* signal and 1050*i* signal and one example of a motion class tap.

FIG. 13 shows a concrete example of motion class tap (SD pixel) selected by the third tap selection circuit 123 when 525*i* signal is converted to 1050*i* signal. FIG. 13 shows the relationship of pixel positions in the vertical direction of the odd number field (o) and the even number field (e) of the frames F−1, F, which are continuous in time.

As shown in FIG. 13, when the line data L1 and L2 of the field F/o are predicted, motion class taps are the SD pixels n2, n4 and n6 spatially adjacent to the pixel of 1050*i* signal (subject pixel) to be prepared and located in the field F/e, the SD pixels n1, n3 and n5 spatially adjacent to the pixel of 1050*i* signal to be prepared and located in the field F/o, the SD pixels m2, m4 and m6 spatially adjacent to the pixel of 1050*i* signal to be prepared and located in the field F−1/e, and the SD pixels m1, m3 and m5 spatially adjacent to the pixel of 1050*i* signal to be prepared and located in the field F−1/o. The respective positions in the vertical direction of the SD pixels n1-n6 correspond with the respective positions in the vertical direction of the SD pixels m1-m6.

Returning to FIG. 1, again the image signal conversion section 110 comprises a space class detection circuit 124 for detecting the level distribution pattern of space class tap data (SD pixel data) selectively fetched by the second tap selection circuit 122, detecting the space class on the basis of the level distribution pattern, and outputting its class information.

In the space class detection circuit 124, the calculation determining the space class is performed. For example, the calculation such that each SD pixel data of 8 bits is compressed to data of two bits is performed, and then, the space class detection circuit 124 outputs a compressed data corresponding to the each SD pixel data as a class information of the space class. In the present embodiment, data compression is performed according to ADRC (Adaptive Dynamic Range Coding). As information compression means, DPCM (Differential Pulse Code Modulation), VQ (Vector Quantization) and the like except for ADRC may be employed.

Originally, ADRC is an adaptive re-quantizing method, which has been developed for high performance coding for use in VTR (Video Tape Recorder). Since local pattern of signal level can be efficiently expressed in a shorter word length by employing this ADRC, it is preferable to use it for the above-described data compression. When ADRC is used, suppose that the maximum value of data (SD pixel data) of the space class tap is MAX, its minimum value is MIN, the dynamic range of data of space class tap is DR (=MZX−MIN+1), and the number of re-quantizing bit is P, re-quantizing code Qi is obtained as compression data by the calculation of a following equation (1) for each SD pixel data ki as space class tap data. However, in the equation (1), [ ] means a round-down processing. As space class tap data, when each of the SD pixel data of Na pieces exists i=1~Na is held.

$$Qi=[(ki-MIN+0.5)0.2^P/DR] \quad (1)$$

Moreover, the image signal conversion section 110 comprises a motion class detectin circuit 125 for detecting the motion class indicating mainly the degree of the motion on the basis of the motion class tap data (SD pixel data) selectively fetched by the third tap selection circuit 123, and outputs the class information.

In the motion class detection circuit 125, a finite difference between frames is calculated using the motion class tap data (SD pixel data) mi, ni selectively fetched by the third tap selection circuit 123, and further the motion class which is an index of the motion, is detected by performing threshold value processing to the average value of the absolute value of the finite difference between the frames. Specifically, in the motion class detection circuit 125, the average value AV of the absolute value of the finite difference is calculated a following the equation (2). In the third tap selection circuit 123, for example, as described above, when 12 pieces of SD pixel data m1-m6, n1-n6 are fetched, Nb is 6 in the equation (2):

$$AV = \frac{\sum_{i=1}^{Nb}|mi-ni|}{Nb} \quad (2)$$

Then, in the motion class detection circuit 125, the class information MV of the motion class is obtained by comparing the average value AV calculated as described above with threshold value(s) of one or a plurality of pieces. For example, in the case where three pieces of threshold values th1, th2 and th3 (th1<th2<th3) are prepared, then four motion classes are detected, it is considered that when AV≦th1 holds, MV=0; when th1<AV≦th2 holds, MV=1; when th2<AV≦th3 holds, MV=2; and when th3<AV holds, MV=3.

Moreover, the image signal conversion section 110 comprises a class synthesizing circuit 126 for obtaining a class code CL indicating a class of a pixel (subject pixel) to be prepared of the HD signal (525*p* signal or 1050*i* signal) belongs on the basis of re-qualitizing code Qi as the class information of space class received from the space class detection circuit 124 and the class information MV of the motion class received from the motion class detection circuit 125.

In the class synthesizing circuit 126, by a following equation (3), the calculation of class code CL is performed. In the equation (3), Na indicates the number of space class tap data (SD pixel data), and P indicates the re-qualitizing bit number in ADRC:

$$CL = \sum_{i=1}^{Na} qi(2^P)^i + MV \cdot 2^{PNa} \qquad (3)$$

Moreover, the image signal conversion section 110 comprises registers 130-133 and a coefficient memory 134. The line sequential conversion circuit 128 described later switches the signal output sequence between the case where 525*p* signal is output and the case where 1050*i* signal is output. The register 130 stores operation designation information for designating an operation of the line sequential conversion circuit 128. The line sequential conversion circuit 128 operates according to the operation designation information supplied from the register 130.

The register 131 stores tap position information of prediction taps selected by the first tap selection circuit 121. The first tap selection circuit 121 selects the prediction tap according to the tap position information supplied by the register 131. The tap position information is information that for example, a plurality of SD pixels capable of being selected are numbered, and the numbers of SD pixels to be selected are designated. In the following tap position information, the similar procedure is done.

The register 132 stores tap position information of the space class tap selected by the second tap selection circuit 122. The second tap selection circuit 122 selects a space class tap according to the tap position information supplied from the register 132.

Now, in the register 132, the tap position information A when the motion is comparatively small and the tap position information B when the motion is comparatively large are stored. Which tap position information A or B is supplied to the second tap selection circuit 122 is selected according to the class information MV of the motion class received from the motion class detection circuit 125.

Specifically, since the motion does not exist or the motion is small when MV=0, or MV=1 holds, the tap position information A is supplied to the second tap selection circuit 122, and a space class tap selected by the second tap selection circuit 122, as shown in FIG. 8 through FIG. 11, spans over two fields. Moreover, since the motion is comparatively large when MV=2 or MV=3 holds, the tap position information B is supplied to the second tap selection circuit 122, and the space class tap selected by the second tap selection circuit 122 (not shown) is considered as only SD pixels within the same field with the pixels to be prepared.

The tap position information where the motion is comparatively small and where the motion is comparatively large can be stored in the above-described register 131, and the tap position information supplied to the first tap selection circuit 121 may be selected by the class information MV of the motion class output from the motion class detection circuit 125.

The register 133 stores the tap position information of the motion class tap selected by the third tap selection circuit 123. The third tap selection circuit 123 selects the motion class tap according to the tap position information supplied from the register 133.

Furthermore, the coefficient memory 134 stores coefficient data of each class of an estimating equation used in the estimate prediction calculation circuit 127 described later. The coefficient data is information to be used when 525*i* signal as the SD signal is converted to 525*p* signal or 1050*i* signal as the HD signal. To the coefficient memory 134, class code CL output from the above-described class synthesizing circuit 126 is supplied as read address information while coefficient data corresponding to the class code CL is read from the coefficient memory 134 and supplied to the estimate prediction calculation circuit 127.

Moreover, the image signal conversion section 110 comprises an information memory bank 135. In the information memory bank 135, the operation designation information for storage in the register 130, the tap position information for storage in the registers 131-133 and the coefficient data for storage in the coefficient memory 134 have been previously stored.

Now, as operation designation information for storage in the register 130, in the information memory bank 135, the first operation designation information for making the line sequential conversion circuit 128 operate so as to output 525*p* signal and the second operation designation information for making the line sequential conversion circuit 128 so as to output 1050*i* signal have been previously stored.

The user can select the first conversion method for outputting 525*p* signal as the HD signal or the second conversion method for outputting 1050*i* signal as the HD signal with operating the remote control transmitter 200. To the information memory bank 135, the selection information of the conversion method is supplied from the system controller 101, and then, the first operation designation information or the second operation designation information is loaded in the register 130 from the information memory bank 135 according to the selection information.

Moreover, as tap position information of the prediction tap for storage in the register 131, the first tap position information corresponding to the first conversion method (525*p* ) and the second tap position information corresponding to the second conversion method (1050*i*) have been previously stored. The first tap position information or second tap position information is loaded on the register 131 from the information memory bank 135 according to the selection information of the above-described conversion method.

Moreover, as tap position information of the space class tap for storage in the register 132, the first tap position information corresponding to the first conversion method (525*p* ) and the second tap position information corresponding to the second conversion method (1050*i*) have been previously stored. Each of the first and second tap position information includes the tap position information when the respective motion is comparatively small and the tap position information when the motion is comparatively large. The first tap position information or the second tap position information is loaded on the register 132 from the information memory bank 135 according to the selection information of the above-described conversion method.

Moreover, as tap position information of the motion class tap for storage in the register 133, the first tap position information corresponding to the first conversion method (525*p*) and the second tap position information corresponding to the second conversion method (1050*i*) have been previously stored. The first tap position information or the second tap position information is loaded on the register 133 from the information memory bank 135 according to the selection information of the above-described conversion method.

Moreover, as coefficient data for storage in the coefficient memory 134, coefficient data of each class on a plurality of the resolutions corresponding to the respective first and second conversion methods has been previously stored. The generation method of coefficient data corresponding to a plurality of the resolutions will be described later.

Although it has not been described above, the user can optionally select the resolution of an image formed from the HD signal output from the image conversion section 110 by pushing operation of grade up key and grade down key in the operation section of the remote control transmitter 200 or rotating operation of knob such as jogging dial. To the information memory bank 135, the selection information of the resolution is supplied from the system controller 101, and the coefficient data corresponding to the selected resolution and the above-described selected conversion method is loaded on the coefficient memory 134 from the information memory bank 135.

Moreover, the image signal conversion section 110 comprises an estimate prediction calculation circuit 127 for calculating data (HD pixel data) of the pixel (subject pixel) to be prepared of the HD signal from the prediction tap data (SD pixel data) xi selectively fetched by the first tap selection circuit 121 and the coefficient data wi read from the coefficient memory 134.

In the estimate prediction calculation circuit 127, when 525*p* signal is output, as shown in FIG. 2 described above, the line data L1 which is the same position with the line of 525*i* signal and the line data L2 of the intermediate position of the upper and lower lines of 525*i* signal are generated in the odd number field (o) and the even number field (e), and the number of pixels on each line becomes two-fold. Moreover, in the estimate calculation circuit 127, when the 1050*i* signal is output, as shown in FIG. 3 described above, the line data L1 and L1' adjacent to the line of 525*i* signal and the line data L2 and L2' away from the line of 525*i* signal are generated in the odd number field (o) and the even number field (e), and the number of pixels on each line becomes two-fold.

Therefore, in the estimate prediction calculation circuit 127, data of four pixels constituting the HD signal is generated. For example, the data of four pixels is generated by estimating equations whose coefficient data are different, respectively, and the coefficient data of the respective estimating equations are supplied from the coefficient memory 134. Now, in the estimate prediction calculation circuit 127, a HD pixel data y to be prepared is calculated a following the linear estimating equation (4) from the prediction tap data (SD pixel data) xi and the coefficient data wi read out of the coefficient memory 134. When the number of the prediction tap selected in the first tap selection circuit 121 is 10 pieces as described FIG. 4 and FIG. 5, n in the equation (4) is 10.

$$y = \sum_{i=1}^{n} wi \cdot xi \quad (4)$$

Moreover, the image signal conversion section 110 comprises a line sequential conversion circuit 128 for performing the line double rate processing whose horizontal period is made double, and line sequencing the line data L1 and L2 (L1' and L2') received from the estimate prediction calculation circuit 127.

Figure 14:
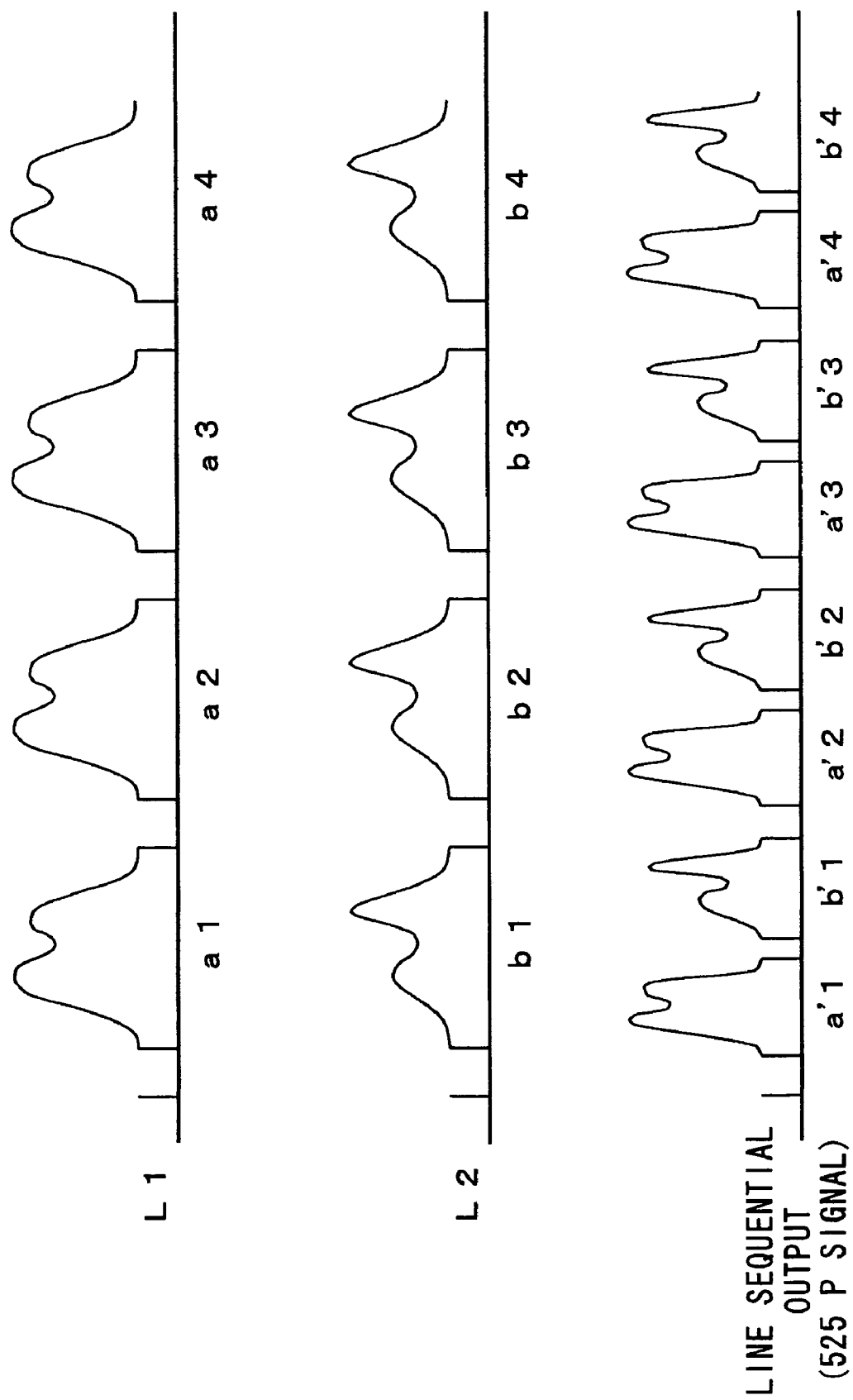
FIG. 14 is a graphical representation for illustrating a line double rate processing when 525*p* signal is output.

FIG. 14 shows the line double rate processing when 525*p* signal is output using analog waveform. As described above, in the estimate prediction calculation circuit 127, each of the line data L1 and L2 is generated. The line data L1 includes in turn a1, a2, a3, . . . lines, and the line data L2 includes in turn b1, b2, b3 . . . lines. The line sequential conversion circuit 128 compresses data of each line into ½ in the time base direction, and forms the line sequential outputs a'1, b'1, a'2, b'2 . . . .

When the 1050*i* signal is output, the line sequential conversion circuit 128 generates line sequential outputs so as to satisfy the interlace relationship in the odd number field (o) and even number field (e). Therefore, the line sequential conversion circuit 128 is required to switch its operation depending upon the case where 525*p* signal is output and the case where 1050*i* signal is output. As described above, the motion designation information is supplied from the register 130.

Next, an operation of the image signal conversion section 110 will be described below.

The space class tap data (SD pixel data) is selectively fetched by the second tap selection circuit 122 from SD signal (525*i* signal) memorized in the buffer memory 109. In this case, in the second tap selection circuit 122, the tap is selected on the basis of the tap position information corresponding to the conversion method selected by the user and the motion class detected by the motion class detection circuit 125, which are supplied from the register 132.

The space class tap data (SD pixel data) selectively fetched by the second tap selection circuit 122 is supplied to the space class detection circuit 124. In the space class detection circuit 124, the re-quantizing code Qi as class information of the space class (mainly class classification for waveform expression within the space) is obtained by performing ADRC processing to each SD pixel data as the space class tap data (see the equation (1)).

Moreover, the motion class tap data (SD pixel data) is selectively fetched by the third tap selection circuit 123 from the SD signal (525*i* signal) memorized in the buffer memory 109. In the third tap selection circuit 123, the tap is selected on the basis of the tap position information corresponding to the conversion method selected by the user, which is supplied from the register 133.

The motion class tap data (SD pixel data) selectively fetched by the third tap selection circuit 123 is supplied to the motion class detection circuit 125. In the motion class detection circuit 125, the class information MV of the motion class (mainly class classification for expressing the degree of the motion) is obtained from each SD pixel data as the motion class tap data.

The motion information MV and the above-described re-quantizing code Qi are supplied to the class synthesizing circuit 126. In the class synthesizing circuit 126, the class code CL indicating a class of the pixel (subject pixel) to be prepared of the HD signal (525*p* signal or 1050*i* signal) is obtained from the motion information MV and the re-quantizing code Qi (see the equation (3)). Then, the class code CL is supplied to the coefficient memory 134 as read address information.

In the coefficient memory 134, coefficient data of each class on the resolution and the conversion method selected by the user is loaded and stored from the information memory bank 135. As described above, the class code CL is supplied as read address information, thereby reading the coefficient data wi corresponding to the class code CL from the coefficient memory 134 and supplying the coefficient data wi to the estimate prediction calculation circuit 127.

Moreover, in the first tap selection circuit 121, the prediction tap data (SD pixel data) is selectively fetched from the SD signal (525$i$ signal) memorized in the buffer memory 109. In this case, in the first tap selection circuit 121, the tap position information corresponding to the conversion method selected by the user is supplied from the register 131. Then, in the first tap selection circuit 121, the prediction tap is selected. The prediction tap data (SD pixel data) xi selectively fetched by the first tap selection circuit 121 is supplied to the estimate prediction calculation circuit 127.

In the estimate prediction calculation circuit 127, the data (HD pixel data) y of the pixel (subject pixel) to be prepared of the HD signal is calculated from the prediction tap data (SD pixel data) xi and the coefficient data wi read out of the coefficient memory 134 (see the equation (4)). In the case, the data of four pixels constituting the HD signal are generated.

Owing to this, when the first conversion method for outputting 525$p$ signal is selected, in the odd number field (o) and the even number field (e), the line data L1 being at the same position with the line of 525$i$ signal and the line data L2 being at the intermediate position of the upper and lower lines of 525$i$ signal are generated (see FIG. 2). Moreover, when the second conversion method for outputting 1050$i$ signal is selected, in the odd number field (o) and the even number field (e), the line data L1 and L1' being at the position adjacent to the line of 525$i$ signal and the line data L2 and L2' being at the position away from the line of 525$i$ signal are generated (see FIG. 3).

The line data L1 and L2 (L1' and L2') thus generated in the estimate prediction calculation circuit 127 is supplied to the line sequential conversion circuit 128. Then, in the line sequential conversion circuit 128, each of the line data L1 and L2 (L1' and L2') are line-sequenced and a HD signal is generated. The line sequential conversion circuit 128 operates according to the operation designation information corresponding to the conversion method selected by the user, which is supplied from the register 130. Therefore, when the user selects the first conversion method (525$p$), 525$p$ signal is output from the line sequential conversion circuit 128. Alternatively, when the user selects the second conversion method (1050$i$), 1050$i$ signal is output from the line sequential conversion circuit 128.

As described above, the coefficient data of each class stored in the coefficient memory 134 corresponds to the resolution selected by the user. Therefore, when the user operates modification of the resolution using the remote control transmitter 200, the coefficient data of each class stored in the coefficient memory 134 are also modified accompanying therewith, and pixel data of the HD signal is generated corresponding to the resolution selected by the user in the estimate prediction calculation circuit 127. Therefore, the resolution of an image of the HD signal output from the line sequential conversion circuit 128 is also modified so that the user can optionally adjust thus converted and obtained resolution of an image of the HD signal to the desired value just as the conventional adjustments for contrast and sharpness.

As described above, in the information memory bank 135, the coefficient data of each class on a plurality of resolutions are memorized. The coefficient data have been previously generated by learning.

First, the learning method will be described below. A following example in which the coefficient data wi (i=1~n) based on the estimating equation (4) is found by the method of least squares is shown. As an example generalized, suppose that X is input data, W is coefficient data, and Y is a prediction value, and consider an observation equation (5). In this equation (5), m indicates the number of learning-data, n indicates the number of prediction tap:

$$XW = Y \quad (5)$$

$$X = \begin{bmatrix} X11 & X121 & \dots & X1n \\ X21 & X22 & \dots & X2n \\ \dots & \dots & \dots & \dots \\ Xm1 & Xm2 & \dots & Xmn \end{bmatrix}, W = \begin{bmatrix} W1 \\ W2 \\ \dots \\ Wn \end{bmatrix}, Y = \begin{bmatrix} y1 \\ y2 \\ \dots \\ ym \end{bmatrix}$$

The method of least squares is applied to the data collected by the observation equation (5). A residual equation (6) is considered on the basis of the observation equation (5).

$$XW = Y + E, E = \begin{bmatrix} e1 \\ e2 \\ \dots \\ em \end{bmatrix} \quad (6)$$

From the residual equation (6), the most probable value of each wi is considered as being in the case where the condition making the $e^2$ of a following equation (7) minimum holds. That is, the condition of a following equation (8) may be considered.

$$e^2 = \sum_{i=1}^{m} ei^2 \quad (7)$$

$$e1\frac{\partial e1}{\partial wi} + e2\frac{\partial e2}{\partial wi} + \dots + em\frac{\partial em}{\partial wi} = O \ (i = 1, 2, \dots, n) \quad (8)$$

Specifically, the condition of n pieces based on i of the equation (8) is considered, and then, wi, w2 . . . , wn satisfying this may be calculated. Then, a following equation (9) is obtained from the residual equation (6). Furthermore, a following equation (10) is obtained from the equation (9) and the equation (5).

$$\frac{\partial ei}{\partial w1} = xi1, \frac{\partial ei}{\partial w2} = xi2, \dots, \frac{\partial ei}{\partial wn} = xin \ (i = 1, 2, \dots, m) \quad (9)$$

$$\sum_{i=1}^{m} ei \times i1 = O, \sum_{i=1}^{m} ei \times i2 = O, \dots, \sum_{i=1}^{m} ei \times in = O \quad (10)$$

Then, a normal equation (11) is obtained from the equation (6) and the equation (10).

$$\begin{cases} \left(\sum_{j=1}^{m} \times j1 \times j1\right)w1 + \left(\sum_{j=1}^{m} \times j1 \times j2\right)w2 + \ldots + \left(\sum_{j=1}^{m} \times j1 \times jn\right)wn = \left(\sum_{j=1}^{m} \times j1yj\right) \\ \left(\sum_{j=1}^{m} \times j2 \times j1\right)w1 + \left(\sum_{j=1}^{m} \times j2 \times j2\right)w2 + \ldots + \left(\sum_{j=1}^{m} \times j2 \times jn\right)wn = \left(\sum_{j=1}^{m} \times j2yj\right) \\ \quad \ldots \\ \left(\sum_{j=1}^{m} \times jn \times j1\right)w1 + \left(\sum_{j=1}^{m} \times jn \times j2\right)w2 + \ldots + \left(\sum_{j=1}^{m} \times jn \times jn\right)wn = \left(\sum_{j=1}^{m} \times jnyj\right) \end{cases} \quad (11)$$

Since as for the normal equation (11), the equations whose number is the same as the number of unknown number n is capable of being written, the most probable value of each wi can be found. In this case, the simultaneous equations are solved using sweep out method (Gauss-Jordan elimination method) or the like.

Figure 15:
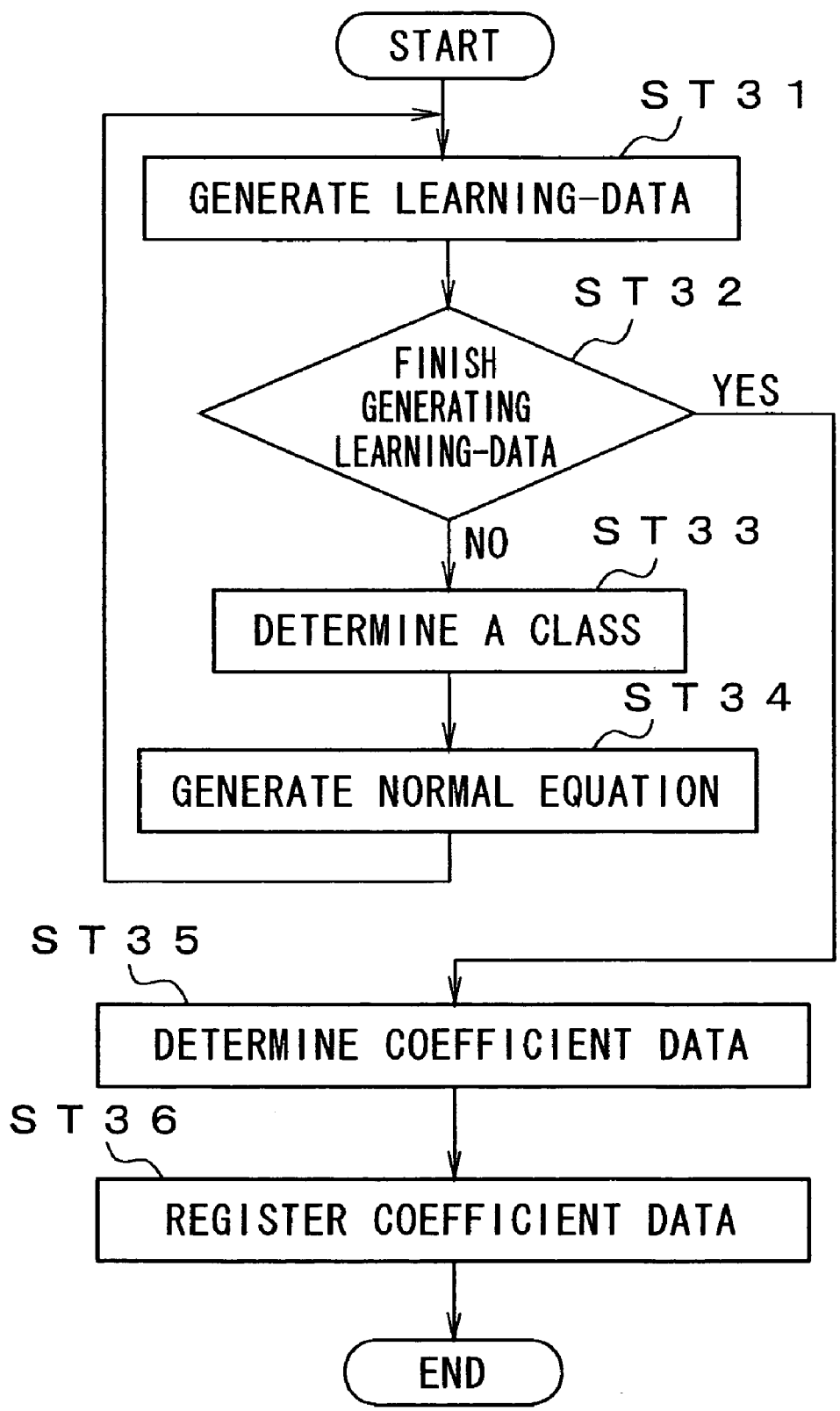
FIG. 15 is a flowchart showing learning flow of coefficient data.

FIG. 15 shows a learning flow of the above-described coefficient data. In order to perform the learning, an input signal and an instructive signal to be the objective of the prediction are prepared.

First, in step ST 31, the combination of the subject pixel data obtained from the instructive signal and pixel data of n pieces of the prediction tap obtained from the input signal is generated as the learning-data. Next, in step ST 32, whether or not the generation of the learning-data is finished is determined and then, when the generation of the learning-data is not finished, a class of the subject pixel data in the learning-data is determined in step ST 33. The class is determined on the basis of the pixel data of the predetermined number obtained from the input signal corresponding to the subject pixel data.

Then, in step ST 34, the normal equation of each class as shown in the equation (11) is generated using the learning-data generated in the step ST 31, that is, the subject pixel data, and the pixel data of n pieces of the prediction tap. The operations of the step ST 31 through the step ST 34 are repeated until the generation of the learning-data is finished so that, the normal equation on which the learning-data is registered can be generated.

In the step ST 32, when the generation of the learning-data is finished, operation is transferred to step ST 35. In the step ST 35, the normal equation generated according to every class is solved, and the coefficient data wi of n pieces of each class are determined. Then, in step ST 36, the coefficient data wi is registered in the memory address divided by each class, and the learning flow is finished.

Figure 16:
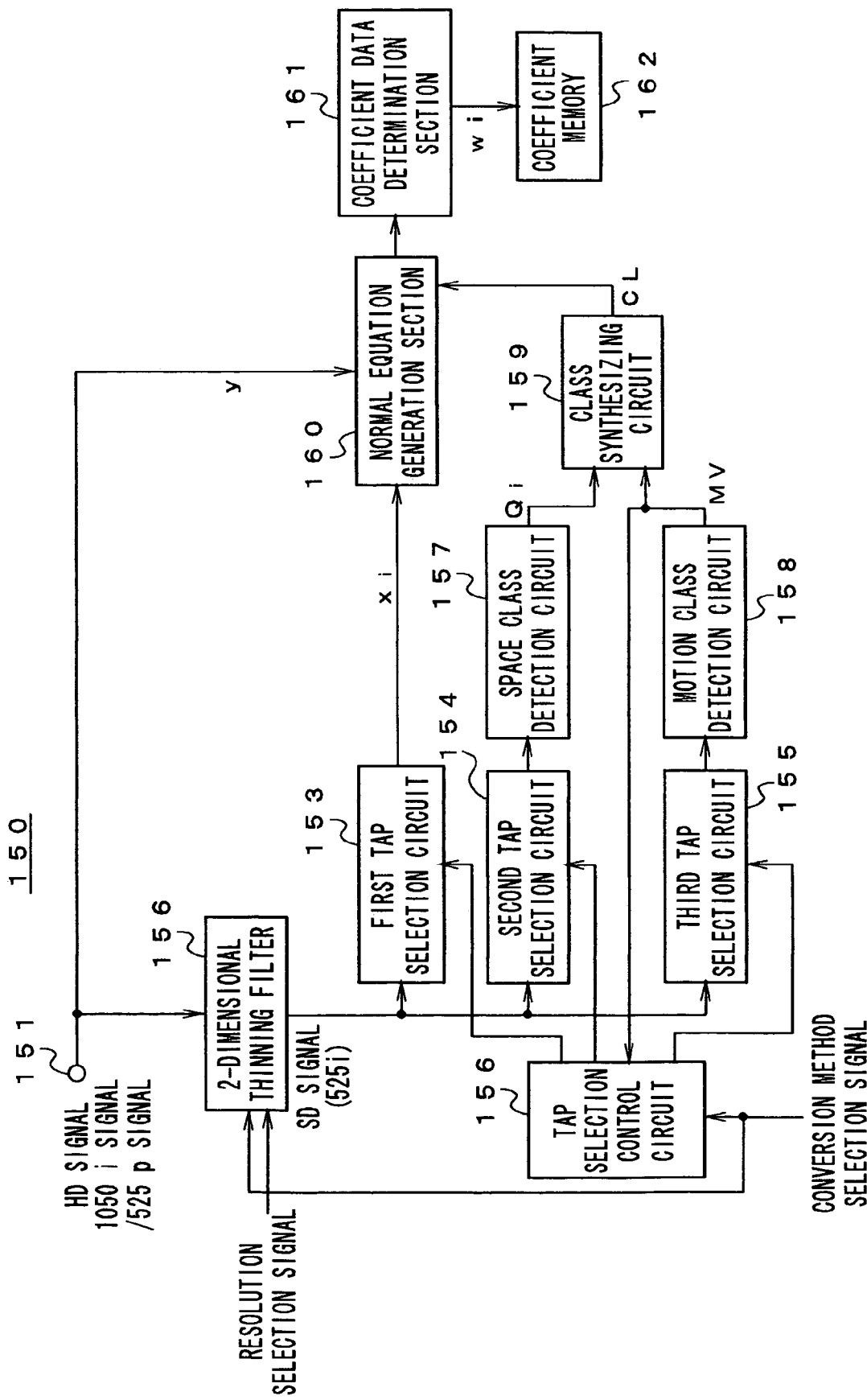
FIG. 16 is a block diagram showing an example of configuration of a coefficient data generation apparatus.

Next, coefficient data generation apparatus 150 for previously generating coefficient data wi of each class on a plurality of resolutions memorized in the information memory bank 135 within the image signal conversion section 110 of the television receiver 100 shown in FIG. 1 according to the principle of learning described above will be described in detail below. FIG. 16 shows a configuration example of the coefficient data generation apparatus 150.

The coefficient data generation apparatus 150 comprises an input terminal 151 for input a HD signal (525p signal/1050i signal) as an instructive signal, and a 2-dimensional thinning filter 152 for obtaining an SD signal as an input signal by performing horizontal and vertical thinning filter processing to the HD signal.

To the 2-dimensional thinning filter 152, a conversion method selection signal is supplied as a control signal. When the first conversion method (525p signal is obtained from 525i signal in the image signal conversion section 110 of FIG. 1) is selected, the 2-dimensional thinning filer 152 generates the SD signal by performing the thinning processing to the 525p signal (see FIG. 2). On the other hand, when the second conversion method (1050i signal is obtained from 525i signal in the image signal conversion section 110 of FIG. 1) is selected, the 2-dimensional thinning filer 152 generates the SD signal by performing the thinning processing to the 1050i signal (see FIG. 3).

Moreover, to the 2-dimensional thinning filter 152, the resolution selection signal is supplied as a control signal. The resolution has the same meaning with a resolution in the television receiver 100 shown in FIG. 1, the resolution being selectable by means of the operation of the remote control transmitter 200 by the user. The higher the resolution indicated by the resolution selection signal is, the lower the resolution of an image formed from the SD signal generated by the 2-dimensional thinning filter 152 is.

For example, the 2-dimensional thinning filter 152 comprises a Gaussian filter. In this case, the vertical direction pixel data constituting the HD signal is performed with the thinning processing by 1-dimensional Gaussian filter expressed by a following equation (12) as well as the horizontal direction pixel data constituting the HD signal is performed with the thinning processing by the 1-dimensional Gaussian filter, thereby generating the SD signal. When the 2-dimensional thinning filter 152 comprises the Gaussian filter, the value of the standard deviation σ is modified according to the above-described resolution selection signal.

$$\text{Out} = \frac{1.0}{\sigma\sqrt{2.0\pi}} e^{-\frac{(4.0x-37)^2}{2.0\sigma^2}} \quad (12)$$

Moreover, the coefficient data generation apparatus 150 comprises the first through third tap selection circuits 153-155 each for selectively fetching the data of a plurality of the SD pixels adjacent to a subject pixel of the HD signal (1050i signal or 525p signal) from the SD signal (525i signal) received from the 2-dimensional thinning filter 152 and outputting the data.

These first through third tap selection circuits 153-155 are configured similarly to the first through third tap selection circuits 121-123 of the above-described image signal conversion section 110. The taps selected by these first through third tap selection circuits 153-155 are designated by the tap position information from the tap selection control section 156.

To the tap selection control circuit 156, the conversion method selection signal is supplied as a control signal. The tap position information supplied to the first through third tap selection circuits 153-155 is different depending upon the case where the first conversion method is selected or the case where the second conversion method is selected. Moreover, to the tap selection control circuit 156, the class information MV of the motion class is supplied from the motion class detection circuit 158 described later. Owing to this, the tap position information to be supplied to the second tap selection circuit 154 is different depending upon whether the motion of is large or small.

Moreover, a space class detection circuit 157 in the coefficient data generation apparatus 150 detects a level distribution pattern of the space class tap data (SD pixel data) selectively fetched by the second tap selection circuit 154, detects the space class based on the level distribution pattern, and outputs the class information. The space class detection circuit 157 is configured similarly to the space class detection circuit 124 of the above-described image signal conversion section 110. From the space class detection circuit 157, re-quantizing code Qi of each SD pixel data as the space class tap data is output as class information indicating a space class.

Moreover, the motion class detection circuit 158 in the coefficient data generation apparatus 150 detects the motion class for mainly expressing the degree of the motion from the motion class tap data (SD pixel data) selectively fetched by the third tap selection circuit 155, and outputs its class information MV. The motion class detection circuit 158 is configured similarly to the motion class detection circuit 125 of the image signal conversion section 110 described above. In the motion class detection circuit 158, a finite difference between the frames is calculated from the motion class tap data (SD pixel data) selectively fetched by the third tap selection circuit 155, and further, the motion class, which is the index of the motion, is detected by performing threshold value processing to the average value of the absolute valued of its finite difference.

Moreover, the class synthesizing circuit 159 in the coefficient data generation apparatus 150 obtains class code CL indicating a class of the subject pixel of the HD signal (525$p$ signal or 1050$i$ signal), based on the re-quantizing code Qi as the class information of the space class received from the space class detection circuit 157 and the class information MV of the motion class received from the motion class detection circuit 158. The class synthesizing circuit 159 is also configured similarly to the class synthesizing circuit 126 of the above-described image signal conversion section 110.

Moreover, in the coefficient data generation apparatus 150, a normal equation generation section 160 generates the normal equation (see the equation (11)) for obtaining coefficient data wi of n pieces on each class based on each HD pixel data y as the subject pixel data obtained from the HD signal supplied through the input terminal 151, the prediction tap data (SD pixel data) xi selectively fetched by the first tap selection circuit 153 corresponding to each HD pixel data y, respectively, and the class code CL received from the class synthesizing circuit 159 corresponding to each HD pixel data y, respectively.

In the normal equation generation section 160, the above-described learning-data is generated by the combination of one piece of HD pixel data y and the prediction tap pixel data of n pieces corresponding to it. Therefore, the normal equation generation section 160 generates the normal equation on which a large number of the learning-data are registered. Although it is not shown in figures, by disposing a delay circuit for timing at the preceding stage of the first tap selection circuit 153, the timing of SD pixel data xi supplied from the first tap selection circuit 153 to the normal equation generation section 160 is adjusted.

Moreover, the coefficient data determination section 161 of the coefficient data generation apparatus 150 receives the data of the normal equation generated according to each class from the normal equation generation section 160, solves the normal equation generated according to each class, and determines coefficient data wi of each class, and then, the coefficient memory 162 memorizes thus determined coefficient data wi. In the coefficient data determination section 161, the normal equation is solved, for example, by the sweep out method or the like, and the coefficient data wi is determined.

An operation of the coefficient data generation apparatus 150 shown in FIG. 16 will be described below. To the input terminal 151, the HD signal as the instructive signal (525$p$ signal or 1050$i$ signal) is supplied, and then, the SD signal as the input signal (525$i$ signal) is generated by performing thinning processing to the HD signal in the horizontal and vertical directions in the 2-dimensional thinning filter 152.

When the first conversion method (525$p$ signal is obtained from 525$i$ signal in the image signal conversion section 110 of FIG. 1) is selected, the SD signal is generated by performing the thinning process to 525$p$ signal in the 2-dimensional thinning filter 152. On the other hand, when the second conversion method (1050$i$ signal is obtained from 525$i$ signal in the image signal conversion section 110 of FIG. 1) is selected, the SD signal is generated by performing the thinning process to 1050$i$ signal in the 2-dimensional thinning filter 152.

The resolution of an image formed from the generated SD signal corresponds to the one selected by the resolution selection signal, and the higher the resolution selected by the resolution selection signal is, the lower the resolution of an image formed from the SD signal generated by the 2-dimensional thinning filter 152 is. The lower the resolution of an image formed from the SD signal is, the coefficient data more enhancing the resolution of an image formed from the HD signal generated in the image signal conversion section 110 of FIG. 1 is obtained.

The space class tap data (SD pixel data) adjacent to a subject pixel of the HD signal (525$p$ signal or 1050$i$ signal) is selectively fetched by the second tap selection circuit 154 from the SD signal (525$i$ signal). In the second tap selection circuit 154, the tap is selected on the basis of the tap position information corresponding to the selected conversion method supplied from the tap selection control circuit 156 and the motion class detected by the motion class detection circuit 158.

The space class tap data (SD pixel data) selectively fetched by the second tap selection circuit 154 is supplied to the space class detection circuit 157. In the space class detection circuit 157, the re-quantizing code Qi as class information of the space class (mainly class classification for waveform expression within the space) is obtained by performing ADRC processing to each SD pixel data as the space class tap data (see the equation (1)).

Moreover, the motion class tap data (SD pixel data) adjacent to a subject pixel of the HD signal is selectively fetched by the third tap selection circuit 155 from the SD signal generated in the 2-dimensional thinning filter 152. In this case, in the third tap selection circuit 155, the tap is selected on the basis of the tap position information corresponding to the selected conversion method supplied from the tap selection control circuit 156.

The motion class tap data (SD pixel data) selectively fetched by the third tap selection circuit 155 is supplied to the motion class detection circuit 158. In the motion class detection circuit 158, the class information MV of the motion class (mainly class classification for expressing the degree of the motion) is obtained from each SD pixel data as the motion class tap data.

The motion information MV and the above-described re-quantizing code Qi are supplied to the class synthesizing circuit 159. In the class synthesizing circuit 159, the class code CL indicating a class of the subject pixel of the HD signal (525$p$ signal or 1050$i$ signal) is obtained from the motion information MV and the re-quantizing code Qi (see the equation (3)).

Moreover, in the first tap selection circuit 153, the prediction tap data (SD pixel data) adjacent to a subject pixel of the HD signal is selectively fetched from the SD signal generated in the 2-dimensional thinning filter 152. In this case, in the first tap selection circuit 153, the tap is selected on the basis of the tap position information corresponding to the selected conversion method supplied from the tap selection control circuit 156.

Then, in the normal equation generation section 160, the normal equation for generating coefficient data wi of n pieces on each class is generated on the basis of each HD pixel data y as the subject pixel data obtained from the HD signal supplied through the input terminal 151, the prediction tap data (SD pixel data) xi selectively fetched by the first tap selection circuit 121 corresponding to each HD pixel data y, respectively, and the class code CL received from the class synthesizing circuit 159 corresponding to each HD pixel data y, respectively.

Then, the normal equation is solved in the coefficient data determination section 161, the coefficient data wi of each class is determined, and the coefficient data wi is memorized in the coefficient memory 162 whose address is divided into separate classes.

In this way, in the coefficient data generation apparatus 150 shown in FIG. 16, the coefficient data wi of each class memorized in the information memory bank 135 of the image signal conversion section 110 of FIG. 1 can be generated.

In this case, in the 2-dimensional thinning filter 152, the SD signal (525$i$ signal) is generated using 525$p$ signal or 1050$i$ signal by the selected conversion method, and thus, the coefficient data corresponding to the first conversion method (525$p$ signal is obtained from 525$i$ signal in the image signal conversion section 110) and the second conversion method (1050$i$ signal is obtained from 525$i$ signal in the image signal conversion section 110) can be generated.

Moreover, the resolution of an image formed from the SD signal generated in the 2-dimensional thinning filter 152 can be changed according to a resolution selection signal. Therefore, the coefficient data of each class on a plurality of resolutions can be generated by in turn changing the resolutions of an image formed from the SD signal and determining the coefficient data of each class.

Figure 17:
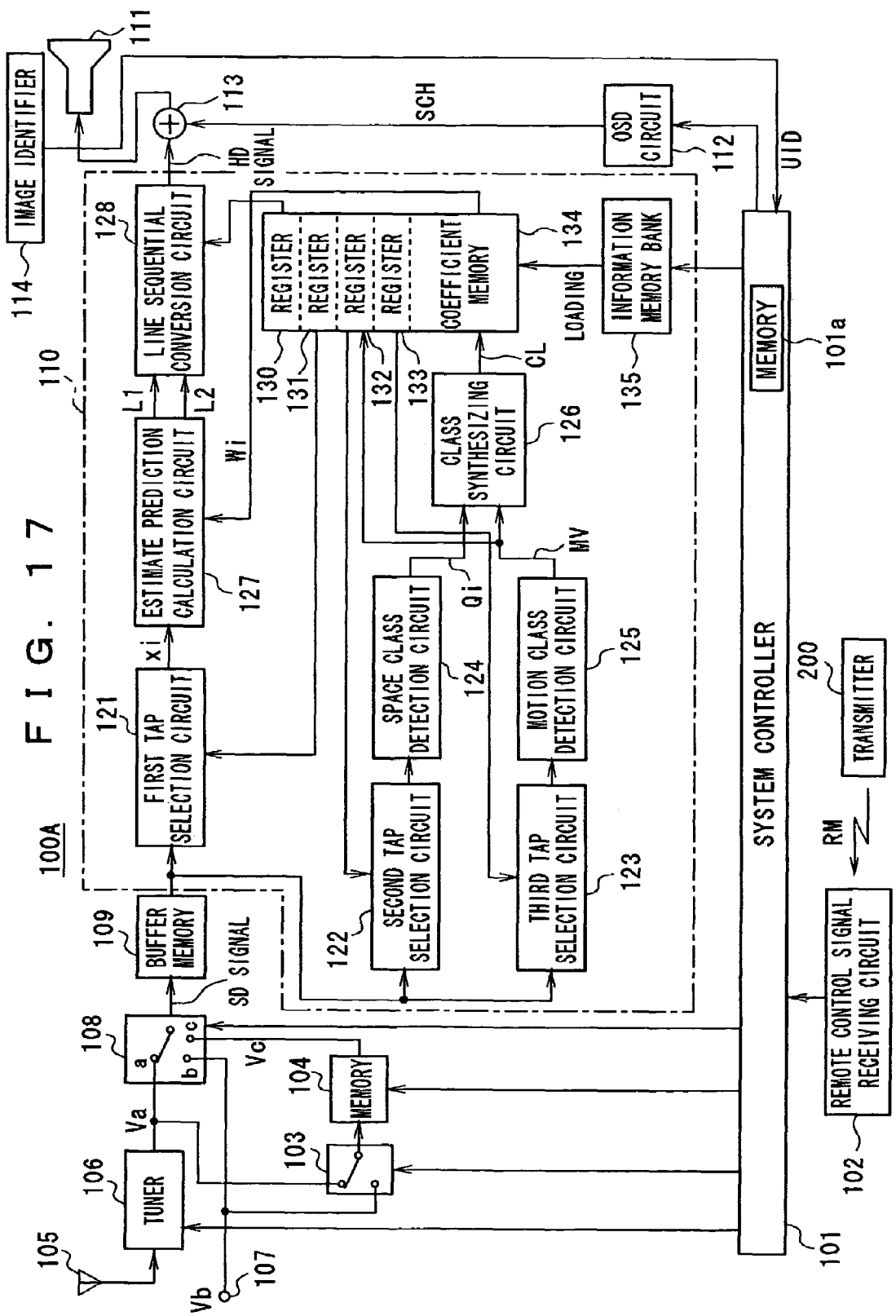
FIG. 17 is a block diagram showing a configuration of a television receiver as another preferred embodiment of the present invention.

FIG. 17 shows a configuration of a television receiver 100A as another preferred embodiment of the invention. In FIG. 17, the same numerals and signals are attached to the portions corresponding to those of FIG. 1, and the description in detail thereof is omitted.

The television receiver 100A also obtains an SD signal of 525$i$ signal from the broadcasting signal, converts the 525$i$ signal into a HD signal of 525$p$ signal or 1050$i$ signal, and displays an image formed from 525$p$ signal or 1050$i$ signal.

The television receiver 100A comprises a system controller 101 with a microcomputer for controlling operations of the entire system and a remote control signal receiving circuit 102 for receiving remote control signal. The remote control signal receiving circuit 102 is connected to the system controller 101, receives remote control signal RM from a remote control transmitter 200 according to operations of a user, and supplies operation signal corresponding to the signal RM to the system controller 101.

Moreover, the television receiver 100A comprises a receiving antenna 105, a tuner 106 for receiving a broadcasting signal (RF modulating signal) captured by this receiving antenna 105 and obtaining the above-described SD signal Va (525$i$ signal) by performing tuning processing, intermediate frequency amplifying processing, detection processing or the like to it, and an external input terminal 107 for inputting an SD signal Vb (525$i$ signal) from the external.

Moreover, the television receiver 100A comprises a memory 104 for memorizing the SD signal on a plurality of kinds of images (motion picture, static picture and the like), which is used at the time of test mode described later. The memory 104 can memorize either of the SD signals Va or Vb selected by a change-over switch 103. As the memory 104, a read only memory in which the SD signal on a plurality of kinds of images has been previously memorized may be used.

Moreover, the television receiver 100A comprises a change-over switch 108 for selectively outputting any one of the SD signals Va, Vb and SD signal Vc read from the memory 104, and a buffer memory 109 for temporarily storing the SD signal received from the change-over switch 108.

The SD signal Va output from the tuner 106 is supplied to a fixed terminal of "a" side of the change-over switch 108 while the SD signal Vb inputted through the external input terminal 107 is supplied to the fixed terminal on "b" side of the change-over switch 108. Furthermore, the SD signal Vc read out of the memory 104 is supplied to the fixed terminal on "c" side of the change-over switch 108. The change-over 108 is controlled by the system controller 101. The change-over switch is switched to the "a" side or "b" side at the time of normal mode, and to the "c" side at the time of test mode. The user may change the mode from the normal mode to the test mode by operating the remote control transmitter 200.

Moreover, the television receiver 100A comprises an image signal conversion section 110 for converting the SD signal (525$i$ signal) temporarily stored in the buffer memory 109 to the HD signal (525$p$ signal or 1050$i$ signal), a display section 111 for displaying an image formed from the HD signal output from the image signal conversion section 110, an OSD (On Screen Display) circuit 112 for generating a display signal SCH for displaying character, pattern and the like on the screen of the display section 111, and a superimposing device 113 for superimposing its display signal SCH on the HD signal received from the above-described image signal conversion section 110 and supplying it to the display section 111.

The display section 111 includes a CRT display or a flat panel display such as LCD. Moreover, the generation operation of the display signal SCH in the OSD circuit 112 is controlled by the system controller 101.

Moreover, the television receiver 100A comprises an image identifier 114 equipped with a CDD solid imaging element. The image identifier 114 is illustratively integrated into the display section 111, and it images a facial image of the user, for example, on the front side of the display section 111 by the imaging element, obtains user identifier information UID by processing the facial image thus imaged, and supplies the user identification information UID to the system controller 101. Such operations of the image identifier 114 are performed at the time of electric source input of the television receiver 100, at the time of changing from the normal mode to the test mode or the like.

An operation in the normal mode of the television receiver 100A shown in FIG. 17 will be described below.

When an image display corresponding to the SD signal Va received from the tuner 106 is indicated according to the operation of the remote control transmitter 200 by the user, the change-over switch 108 is connected to the "a" side by the control of the system controller 101, and the SD signal Va is output from the change-over switch 108. On the other hand, when an image display corresponding to the SD signal Vb inputted through the external input terminal 107 is indicated according to the operation of the remote control transmitter 200 by the user, the change-over switch 108 is connected to the "b" side by the control of the system controller 101, and the SD signal Vb is output from the change-over switch 108.

The SD signal (525$i$ signal) output from the change-over switch 108 is memorized and temporarily stored in the buffer memory 109. Then, the SD signal thus temporarily stored in the buffer memory 109 is supplied to the image signal conversion section 110 wherein it is converted to the HD signal (525$p$ signal or 1050$i$ signal). Specifically, in the image signal conversion section 110, pixel data constituting the HD signal (hereinafter, referred to as "HD pixel data") is obtained from pixel data constituting the SD signal (hereinafter, referred to as "SD pixel data"). The HD signal output from the image signal conversion section 110 is supplied to the display section 111 via the superimposing device 113, and an image formed from the HD signal is displayed on the screen of the display section 111. Moreover, the selection of 525$p$ signal or 1050$i$ signal is performed by the operation of the remote control transmitter 200 by the user.

As described above, in the image signal conversion section 110, when the HD pixel data is obtained from the SD pixel data, the HD pixel data is calculated by an estimating equation, as described later. Moreover, in a nonvolatile memory 101$a$ within the system controller 101, the corresponding-relationship between the user identification information UID and the image quality information is registered at the time of the test mode, also as described later.

When the user identification information UID supplied from the image identifier 114 to the system controller 101 corresponds to any one of the corresponding-relationships registered in the memory 101$a$, the coefficient data of the above-described estimating equation corresponding to the image quality information memorized as a pair with the user identification information UID in the memory 101$a$ is used. Owing to this, the image quality of an image of the HD signal output from the image signal conversion section 110 becomes automatically preferred one for the user, so that it is not necessary for the user to adjust the contrast, sharpness or the like in the display section 111.

It should be noted that when the user identification information UID supplied to the system controller 101 from the image identifier 114 does not correspond to any one of the registered ones registered in the built-in memory 101$a$, the previously set coefficient data of the above-described estimating equation is used.

Next, an operation in the test mode of the television receiver 100A shown in FIG. 17 will be described below.

Figure 18:
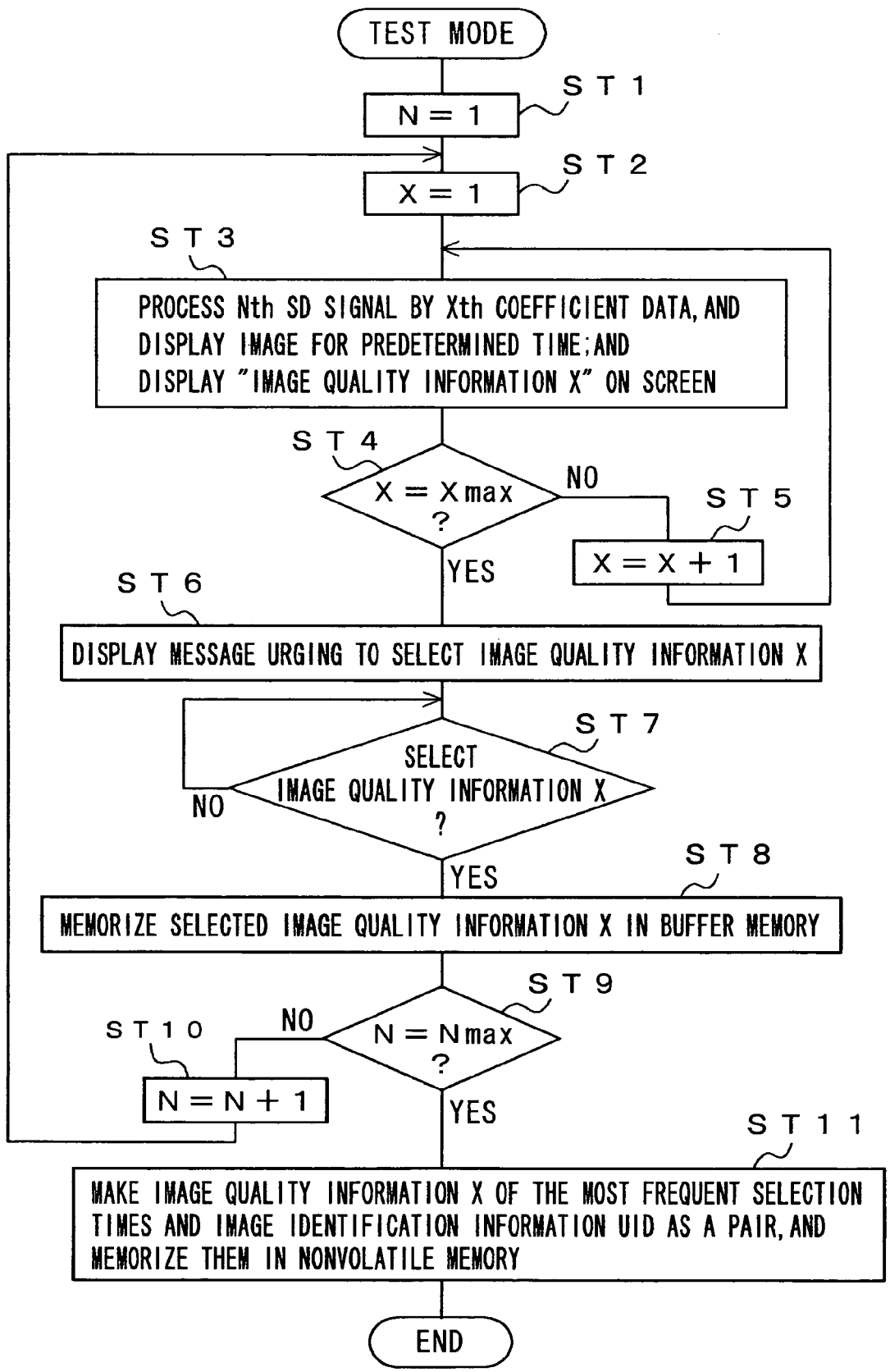
FIG. 18 is a flowchart showing one example of control operation in test mode.

FIG. 18 shows an example of control operation of the system controller 101 in the test mode. At the time of test mode, the change-over switch 108 is switched to the "c" side as described above.

First, in the step ST1, value N indicating the kinds of images of the SD signal outputting from the memory 104 is set as 1, in the step ST2, the value X indicating image quality information specifying the coefficient data used for calculating the HD pixel data in the image signal conversion section 110 is set as 1, and the operation subsequently proceeds to the step ST3.

In the step ST3, when the Nth SD signal is read out of the memory 104 and the HD signal is obtained from the SD signal in the image signal conversion section 110, the HD pixel data is calculated using the Xth coefficient data. Then, with this condition, the HD signal HD (N, X) output from the image signal conversion section 110 is supplied for the predetermined time period, for example, for only one minute, to the display section 111, and an image formed from the HD signal (N, X) is displayed on the screen of the display section 111.

At this time, on the screen of the display section 111, the image quality information X is also displayed accompanied with the image. The user selects the image quality information X described later with reference to the display. When the image quality information X is displayed in this way on the screen, the system controller 101 supplies the display data to the OSD circuit 112. The OSD circuit 112 generates a display signal SCH on the basis of the display data, and supplies the display signal SCH to the display section 111 via the superimposing device 113.

Next, in the step ST4, whether or not X has been the maximum value $X_{max}$ is determined, where $X_{max}$ is the number of kinds of coefficient data selectively usable in the image signal conversion section 110. When $X=X_{max}$ does not hold, in the step ST5, X is incremented by only 1, and returning to the step ST3, the coefficient data used in the image signal conversion section 110 is changed to the next coefficient data, so that the HD signal obtained by the above-described procedure is supplied to the display section 111 only for the predetermined time period, and an image formed from the HD signal is displayed on the screen. When $X=X_{max}$ holds, the operation proceeds to the step ST6.

In the step ST 6, on the screen of the display section 111, a message urging the user to select image quality information X is displayed. In this case, the system controller 101 supplies the display data to the OSD circuit 112, the OSD circuit 112 generates the display signal SCH on the basis of the display data, and the display signal SCH is supplied to the display section 111 via the superimposing device 113. The user selects image quality information X (X is any of 1~$X_{max}$) displayed on the screen when the image quality of the image displayed on the screen of the display section 111 becomes preferred one for the user. The selection can be carried out by operating the remote control transmitter 200.

Next, in the step ST7, whether or not the image quality information X is selected is determined. When the image quality information X is selected, the operation proceeds to the step ST8 wherein the selected image quality information X is memorized in the buffer memory (not shown) within the system controller 101, and then the operation proceeds to the step ST9. If the image quality information X is not selected for certain time period, the control operation of the test mode may be finished.

In the step ST9, whether or not N becomes the maximum value N max of the SD signal readable out of the memory 104 is determined. $N_{max}$ is, for example, made as 10. When $N=N_{max}$ does not hold, in the step ST10, N is incremented only by 1, and returning to the step ST2, the next SD signal is read out of the memory 104 and the similar control operation is carried out as the above-described one. When $N=N_{max}$ holds, the operation proceeds to the step ST11.

In the step ST11, out of the image quality information X memorized in the buffer memory, the image quality information X whose the number of times selected with reference to the images of SD signal of $N_{max}$ kinds is the largest is made in a pair with the user identification information UID supplied from the image identifier 114, they are memorized in the nonvolatile memory 101$a$, and subsequently the control operation of the test mode is finished.

Owing to this, in the nonvolatile memory 101$a$, the user identification information UID for specifying the user and the image quality information X for specifying coefficient data for obtaining the preferred image quality for the user are memorized as a pair thereof.

Figure 19:
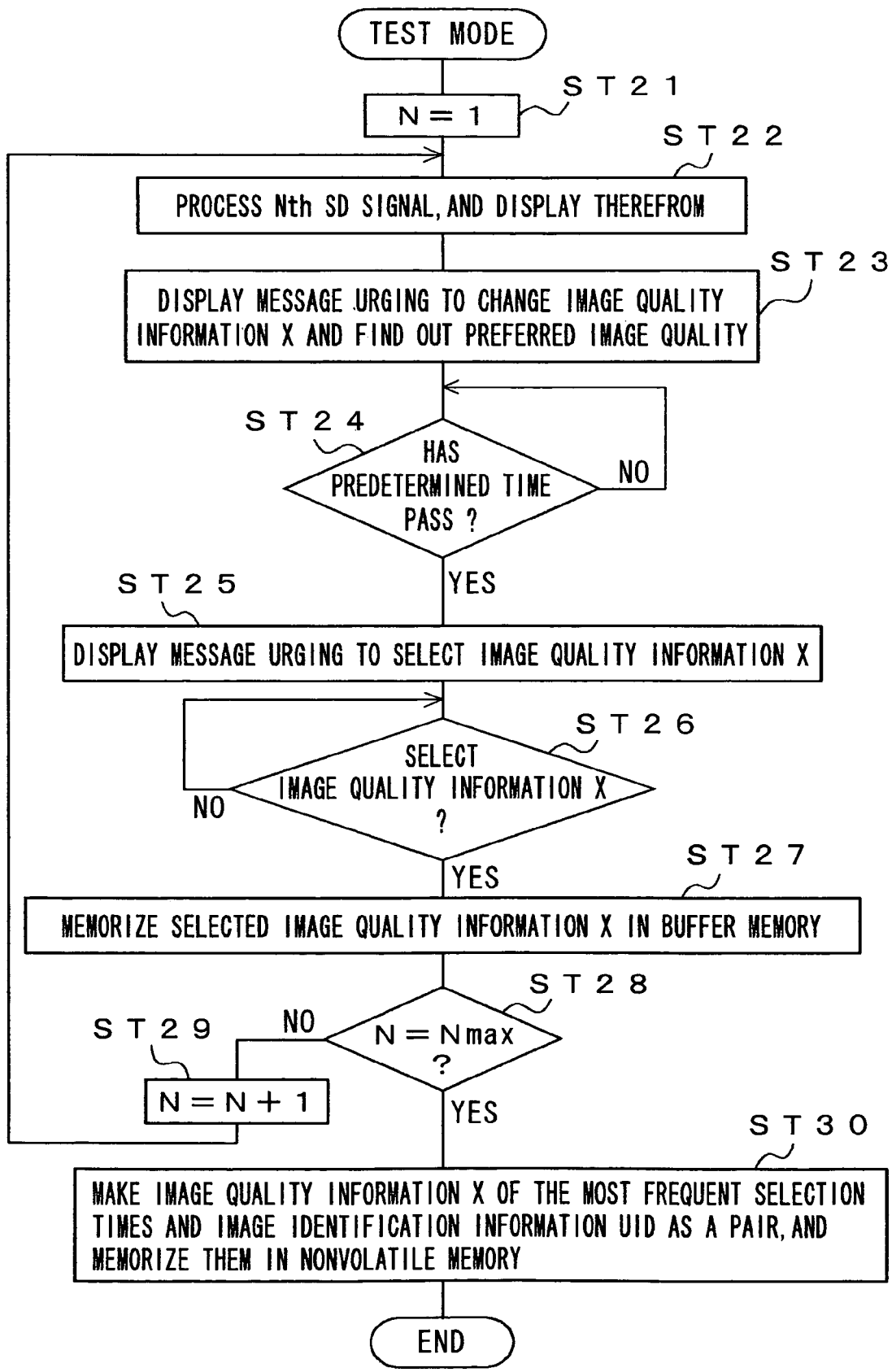
FIG. 19 is a flowchart showing another example of control operation in test mode.

FIG. 19 shows another example of control operation of the system controller 101 in the test mode. At the time of test mode, the change-over switch 108 is switched to the c side, as described above.

First, in the step ST21, the value N indicating the kinds of images of the SD signal output out of the memory 104 is set as 1, and the operation subsequently proceeds to the step ST22. In the step ST22, the Nth SD signal is read out of the memory 104, and the HD signal obtained from this SD signal in the image signal conversion section 110 is supplied to the display section 111 so that the image formed from the HD signal is displayed on the screen.

Then, in the step ST23, on the screen of the display section 111, a message for urging the user to find out the preferred image quality by changing the image quality information X is displayed. The user can input the image quality information X (X is any of 1~$X_{max}$, $X_{max}$ is the number of kinds of coefficient data selectively usable in the image signal conversion section 110) by the remote control transmitter 200. In the image signal conversion section 110, the HD pixel data is calculated using coefficient data corresponding to the image quality information X inputted by the user.

Then, in the step ST24, whether or not the predetermined time period, for example, three minutes has passed is determined. When the predetermined time period has passed, the operation proceeds to the step ST25. Therefore, it is necessary for the user to find out the preferred image quality by changing the image quality information X within the predetermined time period.

In the step ST25, on the screen of the display section 111, a message for urging the user to select the image quality information X is displayed. The user selects the image quality information X (X is any of 1~$X_{max}$) inputted when the image quality of the image displayed on the screen of the display section 111 is the user's preferred image quality. This selection can be carried out by operating the remote control transmitter 200.

Next, in the step ST26, whether or not the image quality information X is selected is determined. When the image quality information X is selected, the operation proceeds to the step ST27 wherein the selected image quality information X is memorized in the buffer memory (not shown) within the system controller 101, and then, the operation proceeds to the step ST28. If the image quality information X is not selected for a predetermined time period, the control operation of the test mode may be finished.

In the step ST28, whether or not N becomes the maximum value $N_{max}$ of the SD signal readable from the memory 104 is determined. N is, for example, made as 10. When N=$N_{max}$ does not hold, N is increased only by 1 in the step ST29, and returning to the step ST22, the next SD signal is read out of the memory 104 and the similar control operation is carried out as the above-described one. When N=$N_{max}$ holds, the operation proceeds to the step ST30.

In the step ST30, out of the image quality information X memorized in the buffer memory, the image quality information X whose the number of times selected with reference to the images of the SD signal of $N_{max}$ kinds is the largest is made as a pair with the user identification information UID supplied from the image identifier 114 and they are memorized in the nonvolatile memory 110a, and subsequently the control operation of the test mode is finished.

Owing to this, in the nonvolatile memory 101a, a pair of the user identification information UID for specifying the user and the image quality information X for specifying coefficient data for obtaining the preferred image quality for the user are memorized.

Next, the image signal conversion section 110 will be described in detail below. The image signal conversion section 110 comprises first through third tap selection circuits 121-123 each for selectively fetching a plurality of SD pixel data adjacent to a subject pixel of the HD signal (1050i signal or 525p signal) from the SD signal (525i signal) memorized in the buffer memory 109 and outputting it.

Moreover, the image signal conversion section 110 comprises a space class detection circuit 124 for detecting the level distribution pattern of the space class tap data (SD pixel data) selectively fetched by the second tap selection circuit 122, detecting the space class on the basis of the level distribution pattern, and outputting the class information, and a motion class detection circuit 125 for detecting the motion class mainly indicating the degree of the motion on the basis of the motion class tap data (SD pixel data) selectively fetched by the third tap selection circuit 123, and outputting its class information.

Moreover, the image signal conversion section 110 comprises a class synthesizing circuit 126 for obtaining a class code CL indicating a class of a pixel (subject pixel) to be prepared of HD signal (535p signal or 1050i signal) on the basis of re-quantizing code Qi as the class information of the space class received from the space class detection circuit 124 and class information MV of the motion class received from the motion class detection circuit 125.

Moreover, the image signal conversion section 110 comprises registers 130-133 and a coefficient memory 134. The line sequential conversion circuit 128 described later switches the signal output sequence depending upon the case where 525p signal is output, or the case where 1050i signal is output. The register 130 stores operation designation information for designating an operation of the line sequential conversion circuit 128. The line sequential conversion circuit 128 operates according to the operation designation information supplied from the register 130.

The register 131 stores the tap position information of a prediction tap selected by the first tap selection circuit 121. The first tap selection circuit 121 selects the prediction tap according to the tap position information supplied by the register 131. The register 132 stores tap position information of a space class tap selected by the second tap selection circuit 122. The second tap selection circuit 122 selects the space class tap according to the tap position information supplied by the register 132. The register 133 stores the tap position information of a motion class tap selected by the third tap selection circuit 123. The third tap selection circuit 123 selects the motion class tap according to the tap position information supplied by the register 133.

Furthermore, the coefficient memory 134 stores coefficient data of each class of an estimating equation used in an estimate prediction calculation circuit 127 described later. The coefficient data is information to be used when 525i signal as the SD signal is converted to 525p signal or 1050i signal as the HD signal. To the coefficient memory 134, class code CL output from the above-described class synthesizing circuit 126 is supplied as read address information while coefficient data corresponding to the class code CL is read out of the coefficient memory 134 and it is supplied to the estimate prediction calculation circuit 127.

Moreover, the image signal conversion section 110 comprises an information memory bank 135. In the information memory bank 135, the operation designation information for storage in the register 130, the tap position information for storage in the registers 131-133 and the coefficient data for storage in the coefficient memory 134 have been previously stored.

In the information memory bank 135, as coefficient data for storage in the coefficient memory 134, coefficient data of each class according to a plurality of image quality information X ($1$~$X_{max}$) corresponding to the respective first and second conversion methods has been previously stored. The generation method of the coefficient data corresponding to a plurality of the image quality information X will be described later.

In the normal mode described above, the image quality information X corresponding to the user identification information UID from the image identifier 114 is supplied to the information memory bank 135 from the system controller 101 whereas, in the above-described test mode, the image quality information X that the system controller 101 automatically generates or which is inputted by means of the remote control transmitter 200 by the user is supplied to the information memory bank 135. The coefficient data corresponding to the image quality information X and the above-described selected conversion method is loaded from the information memory bank 135 into the coefficient memory 134.

Moreover, the image signal conversion section 110 comprises the estimate prediction calculation circuit 127 for calculating pixel data (HD pixel data) of a pixel (subject pixel) to be prepared of the HD signal based on the prediction tap data (SD pixel data) xi selectively fetched by the first tap selection circuit 121 and the coefficient data wi fetched from the coefficient memory 134, and the line sequential conversion circuit 128 for performing the line double rate processing whose horizontal period is made double, and for line-sequencing the line data L1 and L2 (L1' and L2') output from the estimate prediction calculation circuit 127.

Next, an operation of the image signal conversion section 110 will be described bellow.

The space class tap data (SD pixel data) is selectively fetched by the second tap selection circuit 122 from the SD signal (525i signal) memorized in the buffer memory 109. In this case, in the second tap selection circuit 122, the tap is selected on the basis of the tap position information corresponding to the conversion method selected by the user and the motion class detected by the motion class detection circuit 125, which are supplied from the register 132.

The space class tap data (SD pixel data) selectively fetched by the second tap selection circuit 122 is supplied to the space class detection circuit 124. In the space class detection circuit 124, re-quantizing code Qi as class information of the space class (mainly class classification for waveform expression within the space) is obtained by performing ADRC processing to each SD pixel data as the space class tap data (see the equation (1)).

Moreover, the motion class tap data (SD pixel data) is selectively fetched by the third tap selection circuit 123 from the SD signal (525i signal) memorized in the buffer memory 109. In the third tap selection circuit 123, the tap is selected on the basis of the tap position information corresponding to the conversion method selected by the user, which is supplied from the register 133.

The motion class tap data (SD pixel data) selectively fetched by the third tap selection circuit 123 is supplied to the motion class detection circuit 125. In the motion class detection circuit 125, the class information MV of the motion class (mainly class classification for expressing the degree of the motion) is obtained from each SD pixel data as the motion class tap data.

The motion information MV and the above-described re-quantizing code Qi are supplied to the class synthesizing circuit 126. In the class synthesizing circuit 126, the class code CL indicating a class of the pixel (subject pixel) to be prepared of the HD signal (525p signal or 1050i signal) is obtained from the motion information MV and the re-quantizing code Qi (see the equation (3)). Then, the class code CL is supplied to the coefficient memory 134 as read address information.

Onto the coefficient memory 134, coefficient data of each class on the predetermined image quality information X and conversion method is loaded from the information memory bank 135 and stored therein. As described above, the class code CL is supplied as read address information, thereby reading the coefficient data wi corresponding to the class code CL from the coefficient memory 134 and supplying the coefficient data wi to the estimate prediction calculation circuit 127.

Moreover, in the first tap selection circuit 121, the prediction tap data (SD pixel data) is selectively fetched from the SD signal memorized in the buffer memory 109. In this case, in the first tap selection circuit 121, the tap position information corresponding to the conversion method selected by the user is supplied to the register 131. Then, in the first tap selection circuit 121, the prediction tap is selected. The prediction tap data (SD pixel data) xi selectively fetched by the first tap selection circuit 121 is supplied to the estimate prediction calculation circuit 127.

In the estimate prediction calculation circuit 127, data (HD pixel data) y of a pixel (subject pixel) to be prepared of the HD signal is calculated from the prediction tap data (SD pixel data) xi and the coefficient data wi read from the coefficient memory 134 (see the equation (4)). In the case, the data of four pixels constituting the HD signal are generated.

Owing to this, when the first conversion method for outputting 525p signal is selected, in the odd number field (o) and the even number field (e), the line data L1 being at the same position with the line of 525i signal and the line data L2 being at the intermediate position of the upper and lower lines of 525i signal are generated (see FIG. 2). Moreover, when the second conversion method for outputting 1050i signal is selected, in the odd number field (o) and the even number field (e), the line data L1 and L1' being at the position adjacent to the line of 525i signal and the line data L2 and L2' being at the position away from the line of 525i signal are generated (see FIG. 3).

The line data L1 and L2 (L1' and L2') thus generated in the estimate prediction calculation circuit 127 is supplied to the line sequential conversion circuit 128. Then in the line sequential conversion circuit 128, the line data L1 and L2 (L1' and L2') are line-sequenced and the HD signal is generated. The line sequential conversion circuit 128 operates according to the operation designation information corresponding to the conversion method selected by the user, which is supplied from the register 130. Therefore, when the first conversion method (525p) is selected by the user, 525p signal is output from the line sequential conversion circuit 128. Moreover, when the second conversion method (1050i) is selected by the user, 1050i signal is output from the line sequential conversion circuit 128.

As described above, in the normal mode, the image quality information X corresponding to the user identification information UID from the image identifier 114 is supplied to the information memory bank 135 from the system controller 101, and then, the coefficient data of each class corresponding to the image quality information X is loaded from the information memory bank 135 into the coefficient memory 134.

Owing to this, the image quality of the image of the HD signal output from the image signal conversion section 110 becomes automatically preferred one for the user, so that it is not necessary for the user to adjust the contrast, sharpness or the like in the display section 111.

Figure 20:
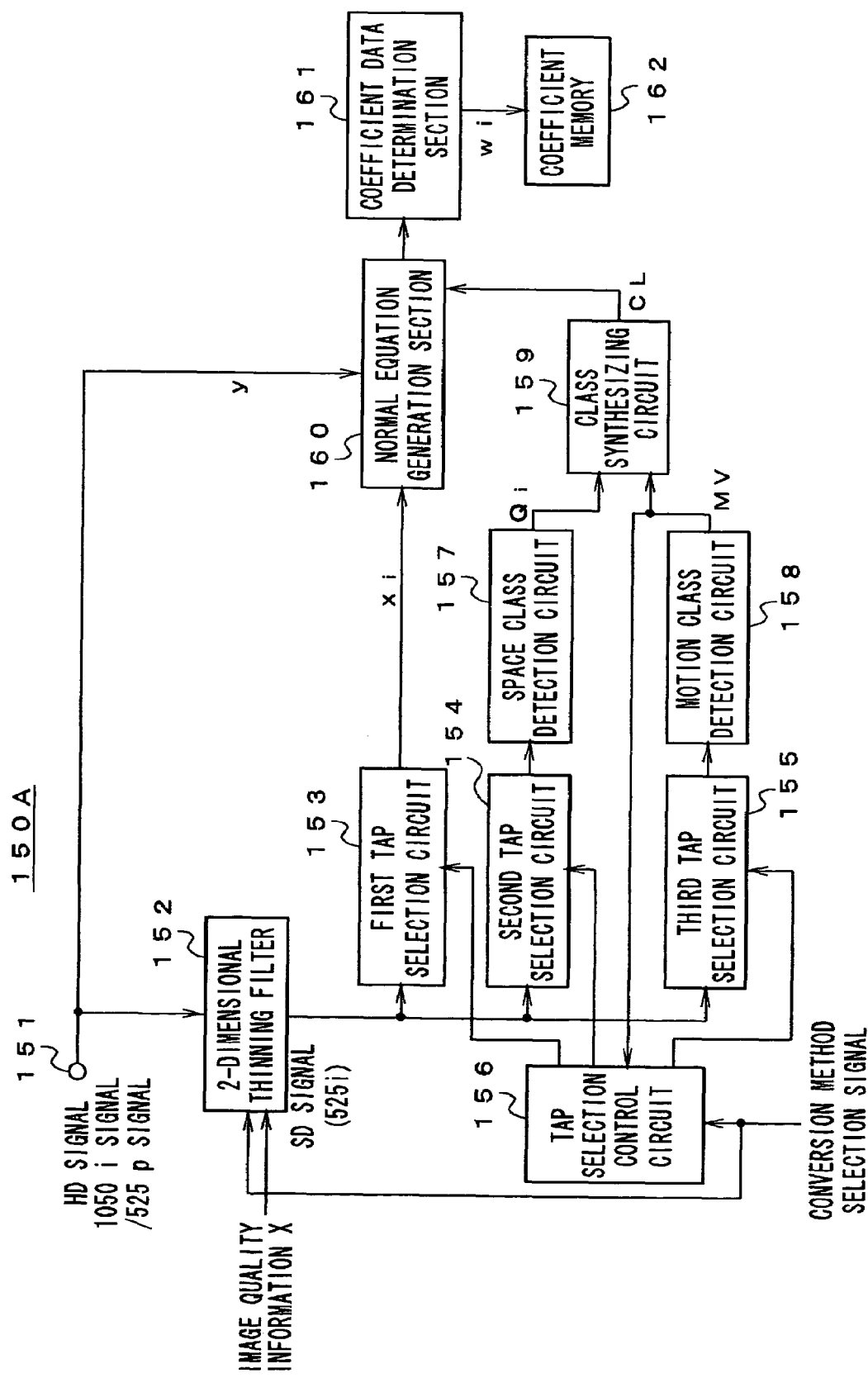
FIG. 20 is a block diagram showing an example of configuration of a coefficient data generation apparatus.

Next, a coefficient data generation apparatus 150A for previously generating coefficient data wi of each class on a plurality of image quality information X memorized in the information memory bank 135 within the image signal conversion section 110 of the television receiver 100A shown in FIG. 17 will be described in detail below. FIG. 20 shows a configuration example of the coefficient data generation apparatus 150A. In FIG. 20, the same numerals and symbols are attached to the portions corresponding to those of FIG. 16, and the description in detail thereof is omitted.

The coefficient data generation apparatus 150A comprises an input terminal 151 for inputting a HD signal (525$p$ signal/ 1050$i$ signal) as an instructive signal, and a 2-dimensional thinning filter 152 for obtaining an SD signal as an input signal by performing horizontal and vertical thinning filter processing to the HID signal.

To the 2-dimensional thinning filter 152, a conversion method selection signal is supplied as a control signal. When the first conversion method (525$p$ signal is obtained from 525$i$ signal in the image signal conversion section 110 of FIG. 17) is selected, the 2-dimensional thinning filer 152 generates the SD signal by performing the thinning processing to the 525$p$ signal (see FIG. 2). On the other hand, when the second conversion method (1050$i$ signal is obtained from 525$i$ signal in the image signal conversion section 110 of FIG. 17) is selected, the 2-dimensional thinning filer 152 generates the SD signal by performing the thinning processing to the 1050$i$ signal (see FIG. 3).

Moreover, to the 2-dimensional thinning filter 152, the image quality information X is supplied as a control signal. The image quality information X has the same meaning with image quality information X that the system controller 101 automatically generates in the television receiver 100A shown in FIG. 17, or that the user inputs by the remote control transmitter 200 in the test mode. In the 2-dimensional thinning filter 152, the processing contents may be changed corresponding to the value of the image quality information X, thereby changing the image quality of the SD signal to be generated.

For example, the 2-dimensional thinning filter 152 comprises a Gaussian filter. In this case, the vertical direction pixel data constituting the HD signal is performed with the thinning processing by 1-dimensional Gaussian filter expressed by the equation (12) described above, and similarly, the horizontal direction pixel data constituting the HD signal is also performed with the thinning processing by the 1-dimensional Gaussian filter, thereby generating the SD signal. When the 2-dimensional thinning filter 152 comprises the Gaussian filter, the value of the standard deviation σ is modified according to the value of image quality information X.

Moreover, the coefficient data generation apparatus 150A comprises first through third tap selection circuits 153-155 each for selectively fetching the data of a plurality of the SD pixels adjacent to a subject pixel of the HD signal (1050$i$ signal or 525$p$ signal) from the SD signal (525$i$ signal) received from the 2-dimensional thinning filter 152 and outputting the data.

These first through third tap selection circuits 153-155 are configured similarly to the first through third tap selection circuits 121-123 of the above-described image signal conversion section 110. The taps selected by these first through third tap selection circuits 153-155 are designated by the tap position information from the tap selection control section 156.

Moreover, a space class detection circuit 157 in the coefficient data generation apparatus 150A detects level distribution pattern of the space class tap data (SD pixel data) selectively fetched by the second tap selection circuit 154, detects the space class based on the level distribution pattern, and outputs the class information. The space class detection circuit 157 is configured similarly to the space class detection circuit 124 of the above-described image signal conversion section 110. From the space class detection circuit 157, re-quantizing code Qi of each SD pixel data as data of a space class tap is output as class information indicating a space class.

Moreover, the motion class detection circuit 158 in the coefficient data generation apparatus 150A detects the motion class for mainly expressing the degree of the motion from the motion class tap data (SD pixel data) selectively fetched by the third tap selection circuit 155, and outputs its class information MV. The motion class detection circuit 158 is configured similarly to the motion class detection circuit 125 of the image signal conversion section 110 described above. In the motion class detection circuit 158, a finite difference between the frames is calculated from the motion class tap data (SD pixel data) selectively fetched by the third tap selection circuit 155, and further, the motion class, which is the index of the motion, is detected by performing threshold value processing to the average value of the absolute value of its finite difference.

Moreover, the class synthesizing circuit 159 in the coefficient data generation apparatus 150A obtains class code CL indicating a class of the subject pixel of the HD signal (525$p$ signal or 1050$i$ signal), based on the re-quantizing code Qi as the class information of the space class received from the space class detection circuit 157 and the class information MV of the motion class received from the motion class detection circuit 158. The class synthesizing circuit 159 is also configured similarly to the class synthesizing circuit 126 of the above-described image signal conversion section 110.

Moreover, in the coefficient data generation apparatus 150A, a normal equation generation section 160 generates the normal equation (see the equation (11)) for obtaining coefficient data wi of n pieces of each class based on each HD pixel data y as the subject pixel data obtained from the HD signal supplied through the input terminal 151, the prediction tap data (SD pixel data) xi selectively fetched by the first tap selection circuit 153 corresponding to each HD pixel data y, respectively, and the class code CL received from the class synthesizing circuit 159 corresponding to each HD pixel data y, respectively.

In the normal equation generation section 160, the above-described learning-data is generated by the combination of one piece of the HD pixel data y and n piece of the prediction tap pixel data corresponding to it. Therefore, the normal equation generation section 160 generates the normal equation on which a large number of the learning-data are registered. Although it is not shown in figures, by disposing a delay circuit for adjusting timing at the preceding stage of the first tap selection circuit 153, the timing of SD pixel data xi supplied from the first tap selection circuit 153 to the normal equation generation section 160 is adjusted.

Moreover, the coefficient data determination section 161 in the coefficient data generation apparatus 150A receives the data of the normal equation generated according to each class from the normal equation generation section 160, solves the normal equation generated according to each class, and determines coefficient data wi of each class, and then, the coefficient memory 162 memorizes coefficient data wi thus determined. In the coefficient data determination section 161, the normal equation is solved, for example, by the sweep out method or the like, and the coefficient data wi is determined.

An operation of the coefficient data generation apparatus 150A shown in FIG. 20 will be described below. To the input terminal 151, the HD signal as the instructive signal (525$p$ signal or 1050$i$ signal) is supplied, and then, the SD signal as the input signal (525$i$ signal) is generated by performing thinning processing to the HD signal in the horizontal and vertical directions in the 2-dimensional thinning filter 152.

When the first conversion method (525$p$ signal is obtained from 525$i$ signal in the image signal conversion section 110 of FIG. 17) is selected, the SD signal is generated by performing the thinning process to 525$p$ signal in the 2-dimensional thinning filter 152. On the other hand, when the second conversion method (1050$i$ signal is obtained from 525$i$ signal in the image signal conversion section 110 of FIG. 17) is selected, the SD signal is generated by performing the thinning processing to 1050$i$ signal in the 2-dimensional thinning filter 152.

The image quality of an image formed from the generated SD signal corresponds to the image quality information X. For example, the lower the resolution of an image formed from the SD signal is, the coefficient data more enhancing the resolution of an image formed from the HD signal generated in the image signal conversion section 110 of FIG. 17 is obtained.

The space class tap data (SD pixel data) adjacent to the subject pixel of the HD signal (525$p$ signal or 1050$i$ signal) is selectively fetched by the second tap selection circuit 154 from the SD signal (525$i$ signal). In the second tap selection circuit 154, the tap is selected on the basis of the tap position information corresponding to the selected conversion method supplied from the tap selection control circuit 156 and the motion class detected in the motion class detection circuit 158.

The space class tap data (SD pixel data) selectively fetched by the second tap selection circuit 154 is supplied to the space class detection circuit 157. In the space class detection circuit 157, the re-quantizing code Qi as class information of the space class (mainly class classification for waveform expression within the space) is obtained by performing ADRC processing to each SD pixel data as the space class tap data (see the equation (1)).

Moreover, the motion class tap data (SD pixel data) adjacent to the subject pixel of the HD signal is selectively fetched by the third tap selection circuit 155 from the SD signal generated in the 2-dimensional thinning filter 152. In this case, in the third tap selection circuit 155, the tap is selected on the basis of the tap position information corresponding to the selected conversion method supplied from the tap selection control circuit 156.

The motion class tap data (SD pixel data) selectively fetched by the third tap selection circuit 155 is supplied to the motion class detection circuit 158. In the motion class detection circuit 158, the class information MV of the motion class (mainly class classification for expressing the degree of the motion) is obtained from each SD pixel data as the motion class tap data.

The motion information MV and the above-described re-quantizing code Qi are supplied to the class synthesizing circuit 159. In the class synthesizing circuit 159, the class code CL indicating a class of the subject pixel of the HD signal (525$p$ signal or 1050$i$ signal) is obtained from the motion information MV and the re-quantizing code Qi (see the equation (3)).

Moreover, in the first tap selection circuit 153, the prediction tap data (SD pixel data) adjacent to a subject pixel of the HD signal is selectively fetched from the SD signal generated by the 2-dimensional thinning filter 152. In this case, in the first tap selection circuit 153, the tap is selected on the basis of the tap position information corresponding to the selected conversion method supplied from the tap selection control circuit 156.

Then, in the normal equation generation section 160, the normal equation for generating n pieces of coefficient data wi of each class is generated on the basis of each HD pixel data y as the subject pixel data obtained from the HD signal supplied through the input terminal 151, the prediction tap data (SD pixel data) xi selectively fetched by the first tap selection circuit 121 corresponding to each HD pixel data y, respectively, and the class code CL received from the class synthesizing circuit 159 corresponding to each HD pixel data y, respectively.

Then, the normal equation is solved in the coefficient data determination section 161, the coefficient data wi of each class is determined, and the coefficient data wi is memorized in the coefficient memory 162 whose addresses are divided into separate classes.

In this way, in the coefficient data generation apparatus 150A shown in FIG. 20, the coefficient data wi of each class memorized in the information memory bank 135 of the image signal conversion section 110 of FIG. 17 can be generated.

In this case, in the 2-dimensional thinning filter 152, the SD signal (525$i$ signal) is generated using 525$p$ signal or 1050$i$ signal by the selected conversion method, and thus, the coefficient data corresponding to the first conversion method (525$p$ signal is obtained from 525$i$ signal in the image signal conversion section 110) and the second conversion method (1050$i$ signal is obtained from 525$i$ signal in the image signal conversion section 110) can be generated.

Moreover, the resolution of an image formed from the SD signal generated in the 2-dimensional thinning filter 152 can be changed according to the image quality information X. Therefore, the coefficient data of each class on a plurality of image quality information X can be generated by in turn changing the image quality of an image formed from the SD signal and determining the coefficient data of each class.

Although in the above-described preferred embodiment, the user identification means comprises the image identifier 114, the user identification means may identify the user from its fingerprint, iris, voice or the like, or may identify the user from the inputted ID number or the like.

Figure 21:
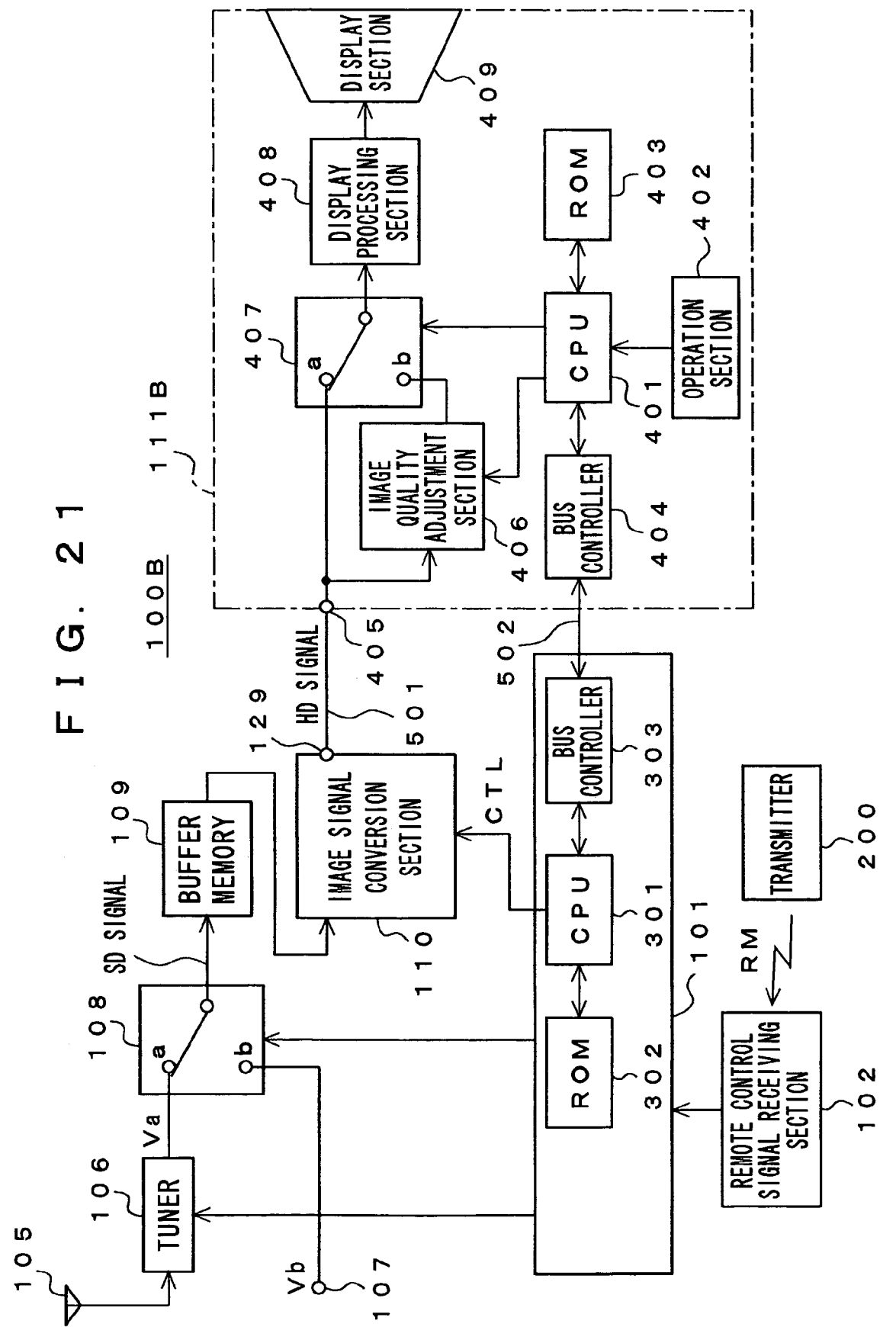
FIG. 21 is a block diagram showing a configuration of a television receiver as still another preferred embodiment of the present invention.

FIG. 21 shows a configuration of a television receiver 100B as still another preferred embodiment of the invention. In FIG. 21, the same numerals and symbols are attached to the portions corresponding to those of FIG. 1, and the description in detail thereof is omitted.

The television receiver 100B also obtains a SD signal of 525$i$ signal from the broadcasting signal, converts the 525$i$ signal into a HD signal of 525$p$ signal or 1050$i$ signal, and displays an image formed from the 525$p$ signal or the 1050$i$ signal.

The television receiver 100B comprises a system controller 101 with a microcomputer for controlling operations of the entire system and a remote control signal receiving circuit 102 for receiving remote control signal. The remote control signal receiving circuit 102 is connected to the system controller 101, receives remote control signal RM from the remote control transmitter 200 according to the operations of a user, and supplies operation signal corresponding to the signals RM to the system controller 101.

The system controller 101 comprises a CPU (Central Processing Unit) 301, an ROM (Read Only Memory) 302 in which the corresponding-relationship between the first identification information indicating a kind of the image display device and the image quality information X is memorized, and a bus controller 303 for communicating with an image display device 111B. The ROM 302 and the bus controller 303 are connected to the CPU 301.

Moreover, the television receiver 100 comprises a receiving antenna 105, a tuner 106 for receiving the broadcasting signal (RF modulating signal) captured by this receiving antenna 105 and obtaining the above-described SD signal Va (525*i* signal) by performing tuning processing, intermediate frequency amplifying processing, detection processing or the like to it, and an external input terminal 107 for inputting an SD signal Vb (525*i* signal) from the external.

Moreover, the television receiver 100B comprises the change-over switch 108 for selectively outputting either of SD signal Va or Vb, and the buffer memory 109 for temporarily storing the SD signal received from the change-over switch 108. The SD signal Va output from the tuner 106 is supplied to the fixed terminal of the "a" side of the change-over switch 108 while the SD signal Vb inputted through the external input terminal 107 is supplied to the fixed terminal on the "b" side of the change-over switch 108. The change-over 108 is controlled by the system controller 101.

Moreover, the television receiver 100B comprises an image signal conversion section 110 for converting the SD signal (525*i* signal) temporarily stored in the buffer memory 109 into the HD signal (525*p* signal or 1050*i* signal), and an image display device 111B for displaying an image formed from the HD signal received from the image signal conversion section 110.

As the image display device 111B, a CRT display, a liquid crystal display, a plasma display, a projector or the like is used. The image display device 111B includes a CPU 401 for controlling operations of the entire device, an operation section 402 for performing the image adjustment operation or the like by the user, an ROM 403 in which display device information including the first identification information indicating a kind of the image display device 111B, the second identification information indicating the existence of image adjustment function, and the third identification indicating whether the HD signal to be inputted in the image display device 111B is 525*p* signal or 1050*i* signal is previously memorized, and a bus controller 404 for communicating with the image signal conversion section 110. The operation section 402, the ROM 403 and the bus controller 404 are connected to the CPU 401.

Moreover, the image display device 111B comprises a video signal input terminal 405, an image adjustment section 406 for performing the image quality adjustment processing for contrast, sharpness or the like to the video signal inputted through the input terminal 405, a change-over switch 407 for selectively outputting the video signal inputted through the input terminal 405 or the video signal on which the image quality adjustment processing is performed in the image quality adjustment section 406, and the display processing section 408 for processing the video signal received from the change-over switch 407 and displaying the image on the display section 409. The video signal inputted through the input terminal 405 is supplied to the fixed terminal on the "a" side of the change-over switch 407 and the image quality adjustment section 406. The video signal on which the image quality adjustment processing is performed in the image quality adjustment section 406 is supplied to the fixed terminal on the "b" side of the change-over switch 407. The change-over switch 407 is controlled by the CPU 401.

The input terminal 405 of the image display device 111B is connected to an output terminal 129 of the image signal conversion section 110 via a signal conductor 501, thereby connecting the image display device 111B to the image signal conversion section 110. At the same time, the bus controller 404 of the image display device 111B is connected to the bus controller 303 of the system controller 101 via a bus signal conductor 502 such as IEEE 1394 bus.

An operation of the television receiver 100B shown in FIG. 21 will be described below.

Figure 22:
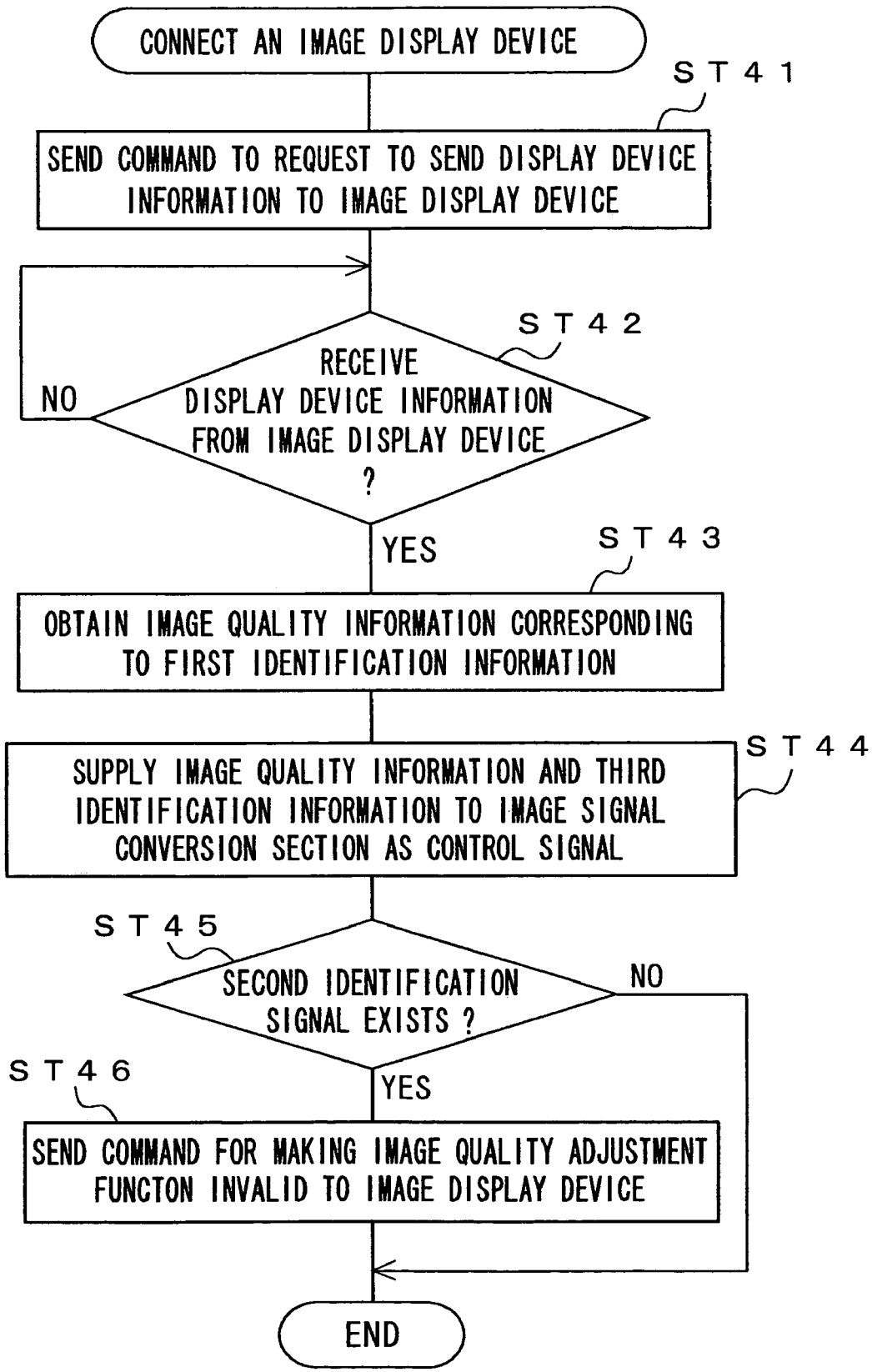
FIG. 22 is a flowchart showing a control operation when an image display device is connected.

When the bus controller 404 of the image display device 111B is connected to the bus controller 303 of the system controller 101 and the image display device 111B is connected to the image signal conversion section 110, the CPU 301 of the system controller 101 recognizes the connection and performs the control operations indicated in the flowchart of FIG. 22.

First, in the step ST41, a command to request the image display device 111B to send the display device information is sent to the image display device 111B. In this case, the CPU 301 generates a command to request the image display device 111B to send the display device information and supplies it to the bus controller 303. The bus controller 303 sends the command to the bus controller 404 of the image display device 111B via the bus signal conductor 502.

When the bus controller 404 of the image display device 111B has received the command, the bus controller supplies it to the CPU 401. Then, the CPU 401 reads the display device information out of the ROM 403 and supplies it to the bus controller 404. The bus controller 404 sends the display device information to the bus controller 303 of the system controller 101 via the bus signal conductor 502. When the bus controller 303 has received the display device information, the bus controller supplies it to the CPU 301.

Next, returning to FIG. 22, in the step ST42, whether or not the CPU 301 has received the display device information from the image display device 111B is determined. When the CPU 301 has received the display device information, the image quality information X memorized as a pair with the first identification information (identification information indicating a kind of the image display device 111B) included in the display device information is read out of the ROM 302 and obtained in the step ST 43.

Then, in the step ST44, the third identification information (identification information indicating whether the HD signal to be inputted into the image display device 111B is 525*p* signal or 1050*i* signal) included in the display device information and the image quality information X obtained as described above are supplied to the image signal conversion section 110 as a control signal CTL.

Next, in the step ST45, whether or not the second identification information (identification information indicating that the image quality adjustment function exists) exists in the display device information is determined. When the second identification information does not exist, the processing is immediately finished. When the second identification information exists, in the step ST46, the CPU 301 send a command for making the image-quality-adjustment-function invalid to the image display device 111. In this case, the CPU 301 generates a command for making the image-quality-adjustment-function invalid and supplies it to the bus controller 303. The bus controller 303 send the command for making the image-quality-adjustment-function invalid to the bus controller 404 of the image display device 111B via the bus signal conductor 502.

When the bus controller 404 of the image display device 111B has received the command for making the image-quality-adjustment-function invalid, the bus controller supplies it to the CPU 401. Then, the CPU 401 controls the change-over switch 407 and switches it to the "a" side. Owing to this, the video signal output from the change-over switch 407 is made identical with the signal inputted through the input terminal 405, and the image quality adjustment in the image quality adjustment section 406 is substantially made invalid.

The change-over switch 407 has been switched on the "b" side before the CPU 401 receives the command for making the image-quality-adjustment-function invalid. Moreover, when the change-over switch 407 is switched to the "a" side and the connection of the image display device 111B to the image signal conversion section 110 is released, the change-over switch is switched to the "b" side again.

When an image display corresponding to the SD signal Va output from the tuner 106 is indicated on the basis of the operation of the remote control transmitter 200 by the user, the change-over switch 108 is connected to the "a" side by the control of the system controller 101, and the SD signal Va is output from the change-over switch 108. Moreover, when an image display corresponding to the SD signal Vb inputted through the external input terminal 107 is indicted on the basis of the operation the remote control transmitter 200 by the user, the change-over switch 108 is connected to the "b" side by the control of the system controller 101, and the SD signal Vb is output from the change-over switch 108.

The SD signal (525$i$ signal) output from the change-over switch 108 is memorized and temporarily stored in the buffer memory 109. Then, the SD signal temporarily stored in the buffer memory 109 is supplied to the image signal conversion section 110 wherein it is converted to the HD signal (525$p$ signal or 1050$i$ signal). Specifically, in the image signal conversion section 110, pixel data constituting the HD signal (hereinafter, referred to as "HD pixel data") is obtained from pixel data constituting the SD signal (hereinafter, referred to as "SD pixel data").

The HD signal output from the output terminal 129 of the image signal conversion section 110 is inputted into the input terminal 405 of the image display device 111B via the signal conductor 501. Moreover, the selection of 525$p$ signal or 1050$i$ signal is performed on the basis of the third identification information supplied as a control signal CTL described above from the CPU 301 of the system controller 101.

In the image display device 111B, the HD signal thus inputted into the input terminal 405 is supplied to the display processing section 408 via the "a" side of the change-over switch 407, and processed for an image display. Owing to this, in the display section 409, an image formed from the HD signal inputted into the input terminal 405 is displayed.

As described above, in the image signal conversion section 110, when the HD pixel data is obtained from the SD pixel data, as described later, the HD pixel data is calculated by an estimating equation. As coefficient data of this estimating equation, the data corresponding to the image quality information supplied as a control signal CTL and the third identification information is selectively used. Owing to this, the image quality of an image formed from the HD signal output from the image signal conversion section 110 is automatically corresponded to the image display device 111B, so that it is not necessary for the user to adjust the contrast, sharpness or the like separately in the image display device 111B.

Moreover, in this case, in the image display device 111B, the change-over switch 407 is connected to the "a" side, and the HD signal input through the input terminal 405 is supplied to the display processing section 408 as it is and used. Owing to this, the deterioration of the image quality of the image formed from the HD signal can be prevented by the image quality adjustment of the HD signal, and the performance of the image signal conversion section 110 is capable of exerting to the maximum.

Next, the image signal conversion section 110 will be described in detail below with reference to FIG. 23. In FIG. 23, the same numerals and symbols are attached to the portions corresponding to those of FIG. 1, and the description in detail is omitted.

The image signal conversion section 110 comprises first through third tap selection circuits 121-123 each for selectively fetching a plurality of the SD pixel data adjacent to the subject pixel of the HD signal (1050$i$ signal or 525$p$ signal) from the SD signal (525$i$ signal) memorized in the buffer memory 109 (see FIG. 21) and outputting them.

Moreover, the image signal conversion section 110 comprises a space class detection circuit 124 for detecting level distribution pattern of the space class tap data (SD pixel data) selectively fetched by the second tap selection circuit 122, detecting the space class on the basis of the level distribution pattern, and outputting the class information, and the motion class detection circuit 125 for detecting the motion class mainly expressing the degree of the motion on the basis of the motion class tap data (SD pixel data) selectively fetched by the third tap selection circuit 123, and outputting its class information.

Moreover, the image signal conversion section 110 comprises a class synthesizing circuit 126 for obtaining a class code CL indicating a class of the pixel (subject pixel) to be prepared of the HD signal (525$p$ signal or 1050$i$ signal) on the basis of the re-quantizing code Qi as class information of space class received from the space class detection circuit 124 and the class information MV of the motion class received from the motion class detection circuit 125.

Moreover, the image signal conversion section 110 comprises registers 130-133 and the coefficient memory 134. The line sequential conversion circuit 128 described later switches the signal output sequence depending upon the case where 525$p$ signal is output, or the case where 1050$i$ signal is output. The resistor 130 stores operation designation information for designating an operation of the line sequential conversion circuit 128. The line sequential conversion circuit 128 operates according to the operation designation information supplied from the register 130.

The register 131 stores tap position information of prediction taps selected by the first tap selection circuit 121. The first tap selection circuit 121 selects the prediction tap according to the tap position information supplied by the register 131. The register 132 stores tap position information of the space class tap selected by the second tap selection circuit 122. The second tap selection circuit 122 selects the space class tap according to the tap position information supplied by the register 132. The register 133 stores tap position information of the motion class tap selected by the third tap selection circuit 123. The third tap selection circuit 123 selects the motion class tap according to the tap position information supplied from the register 133.

Furthermore, the coefficient memory 134 stores coefficient data of each class of an estimating equation used in the estimate prediction calculation circuit 127 described later. The coefficient data is information to be used when 525$i$ signal as the SD signal is converted to 525$p$ signal or 1050$i$ signal as the HD signal. To the coefficient memory 134, class code CL output from the above-described class synthesizing circuit 126 is supplied as read address information while the coefficient data corresponding to the class code CL is read out of the coefficient memory 134 and supplied to the estimate prediction calculation circuit 127.

Moreover, the image signal conversion section 110 comprises an information memory bank 135. In the information memory bank 135, the operation designation information for storage in the register 130, the tap position information for storage in the registers 131-133 and the coefficient data for storage in the coefficient memory 134 have been previously stored.

In the information memory bank 135, as coefficient data for storage in the coefficient memory 134, coefficient data of each class on a plurality of image quality information X corresponding to the respective first and second conversion methods has been previously stored.

In the information memory bank 135, the third identification information and the image information X read out of ROM 302 corresponding to the first identification information are supplied from the CPU 301 of the system controller 101 (see FIG. 21) as the control signal CTR. The coefficient data corresponding to the image quality information X and the third identification information are loaded into the coefficient memory 134 from the information memory bank 135.

Moreover, the image signal conversion section 110 comprises the estimate prediction calculation circuit 127 for calculating data (HD pixel data) of a pixel (subject pixel) to be prepared of the HD signal from data (SD pixel data) xi of the prediction tap selectively fetched by the first tap selection circuit 121 and a coefficient data wi read out of the coefficient memory 134, and a line sequential conversion circuit 128 for performing the line double rate processing whose horizontal periodical is made double and line-sequencing the line data L1 and L2 (L1' and L2') received from the estimate prediction calculation circuit 127, and the output terminal 129 for outputting the HD signal received from the line sequential conversion circuit 128.

Next, an operation of the image signal conversion section 110 will be described below.

The space class tap data (SD pixel data) is selectively fetched by the second tap selection circuit 122 from the SD signal (525i signal) memorized in the buffer memory 109 (see FIG. 21). In this case, in the second tap selection circuit 122, the tap is selected on the basis of the tap position information corresponding to the conversion method selected by the user and the motion class detected in the motion class detection circuit 125, which are supplied from the register 132.

The space class tap data (SD pixel data) selectively fetched by the second tap selection circuit 122 is supplied to the space class tap detection circuit 124. In the space class detection circuit 124, the re-quantizing code Qi as class information of the space class (mainly class classification for waveform expression within the space) is obtained by performing ADRC processing to each SD pixel data as the space class tap data (see the equation (1)).

Moreover, the motion class tap data (SD pixel data) is selectively fetched by the third tap selection circuit 123 from the SD signal (525i signal) memorized in the buffer memory 109. In the third tap selection circuit 123, the tap is selected on the basis of the tap position information corresponding to the conversion method selected by the user, which is supplied from the register 133.

The motion class tap data (SD pixel data) selectively fetched by the third tap selection circuit 123 is supplied to the motion class detection circuit 125. In the motion class detection circuit 125, the motion information MV of the motion class (mainly class classification for expressing the degree of the motion) is obtained from each SD pixel data as the motion class tap data.

The motion information MV and the above-described re-quantizing code Qi are supplied to the class synthesizing circuit 126. In the class synthesizing circuit 126, the class code CL indicating a class of the pixel (subject pixel) to be prepared of a HD signal (525p signal or 1050i signal) is obtained from the motion information MV and the re-quantizing code Qi (see the equation (3)). Then, the class code CL is supplied to the coefficient memory 134 as read address information.

In the coefficient memory 134, the coefficient data of each class on the predetermined image quality information X and conversion method is loaded and stored from the information memory bank 135. As described above, the class code CL is supplied as read address information, thereby reading the coefficient data wi corresponding to the class code CL from the coefficient memory 134 and supplying it to the estimate prediction calculation circuit 127.

Moreover, in the first tap selection circuit 121, the prediction tap data (SD pixel data) is selectively fetched from the SD signal (525i signal) memorized in the buffer memory 109. In this case, in the first tap selection circuit 121, the tap position information corresponding to the conversion method selected by the user is supplied from the register 131. Then, in the first tap selection circuit 121, the prediction tap is selected. The prediction tap data (SD pixel data) xi selectively fetched by the first tap selection circuit 121 is supplied to the estimate prediction calculation circuit 127.

In the estimate prediction calculation circuit 127, the data (HD pixel data) y of a pixel (subject pixel) to be prepared of the HD signal is calculated from the prediction tap data (SD pixel data) xi and the coefficient data wi read out of the coefficient memory 134 (see the equation (4)). In the case, the data of four pixels constituting a HD signal are generated.

Owing to this, when the first conversion method for outputting the 525p signal is selected, in the odd number field (o) and the even number field (e), the line data L1 being at the same position with the line of 525i signal and the line data L2 being at the intermediate position of the upper and lower lines of 525i signal are generated (see FIG. 2). Moreover, when the second conversion method for outputting the 1050i signal is selected, in the odd number field (o) and the even number field (e), the line data L1 and L1' adjacent to the line of 525i signal and the line data L2 and L2' being away from the line of 525i signal are generated (see FIG. 3).

The line data L1 and L2 (L1' and L2') thus generated in the estimate prediction calculation circuit 127 is supplied to the line sequential conversion circuit 128. Then, in the line sequential conversion circuit 128, the line data L1 and L2 (L1' and L2') are line-sequenced and the HD signal is generated. Then, the HD signal is output to the output terminal 129. The line sequential conversion circuit 128 operates according to the operation designation information according to the third identification information, which is supplied from the register 130. Therefore, when the HD signal to be input into the image display device 111B is the 525p signal, the 525p signal is output from the line sequential conversion circuit 128. Moreover, when the HD signal to be input into the image display device 111B is the 1050i signal, the 1050i signal is output from the line sequential conversion circuit 128.

As described above, the image quality information X corresponding to the first identification information indicating a kind of the image display device 111B is supplied to the information memory bank 135 from the system controller 101, and the coefficient data of each class according to the image quality information X is loaded from the information memory bank 135 into the coefficient memory 134. Owing to this, the image quality of an image formed from the HD signal output from the image signal conversion section 110 automatically corresponds to the image display device 111B, so that it is not necessary for the user to adjust the contrast, sharpness or the like separately in the image display device 111B.

As described above, in the information memory bank 135, the coefficient data of each class according to a plurality of image quality information X are memorized. The coefficient data is also generated by the coefficient generation apparatus 150A as shown in FIG. 20 described above.

Now, to the 2-dimensional thinning filter 152, the conversion method selection signal is supplied as a control signal. When the first conversion method (525p signal is obtained from 525i signal in the image signal conversion section 110 of FIG. 23) is selected, the 2-dimensional thinning filer 152 generates the SD signal by performing the thinning processing to the 525p signal (see FIG. 2). Moreover, when the second conversion method (1050i signal is obtained from 525i signal in the image signal conversion section 110 of FIG. 23) is selected, the 2-dimensional thinning filer 152 generates the SD signal by performing the thinning processing to the 1050i signal (see FIG. 3).

Moreover, to the 2-dimensional thinning filter 152, the image quality information X is supplied as a control signal. This image quality information X has the same meaning with image quality information X memorized in the ROM 302 of the system controller 101 in the television receiver 100B as shown in FIG. 21. In the 2-dimensional thinning filter 152, the processing contents may be changed corresponding to the value of the image quality information X, and the image quality of the SD signal to be generated may be changed.

The 2-dimensional thinning filter 152 comprises a Gaussian filter. In this case, the vertical direction pixel data constituting the HD signal is performed with the thinning processing by 1-dimensional Gaussian filter expressed by the equation (12), and similarly, the horizontal direction pixel data constituting the HD signal is performed with the thinning processing by the 1-dimensional Gaussian filter, thereby generating the SD signal. When the 2-dimensional thinning filter 152 comprises the Gaussian filter, the value of the standard deviation $\sigma$ is modified according to the image quality information X.

For example, in the image quality information 1, it is defined as $\sigma=0.5$; in the image quality information 2, it is defined as $\sigma=1.2$; in the image quality information 3, it is defined as $\sigma=1.6$; in the image quality information 4, it is defined as $\sigma=2.0$; in the image quality information 5, it is defined as $\sigma=2.4$; in the image quality information 6, it is defined as $\sigma=2.8$; and in the image quality information 7, it is defined as $\sigma=3.0$. In these cases, the larger the value of $\sigma$ is, the coefficient data more enhancing the resolution of the image formed from the HD signal generated by the image signal conversion section 110 of FIG. 23 are obtained.

In the television receiver 100B of FIG. 21 described above, when the first identification information indicating a kind of the image display device 111B sent from it to the system controller 101 indicates for example, a CRT display, a liquid crystal display, a plasma display, a projector or the like, the CPU 301 obtains the image quality information 4, the image quality information 3, the image quality information 5 and the image quality information 6, respectively, from the ROM 302 and thus, the coefficient data generated corresponding to the respective image quality information X in the image signal conversion section 110 is loaded from the information memory bank 135 into the coefficient memory 134 and used.

As for the relationship between the first identification information and the third identification information, for example, when the first identification information indicates the CRT display, the third identification information is made so as to indicate that the HD signal to be input is 525p signal or 1050i signal; when the first identification information indicates the liquid crystal display, the third identification information is made so as to indicate that the HD signal to be input is 1050i signal; when the first identification information indicates the plasma display, the third identification information is made so as to indicate that the HD signal to be input is 525p signal; and when the first identification signal indicates the projector, the third identification information is made so as to indicate that it is 525p signal.

FIG. 24 shows examples of relationships connected with kinds of image display devices described above, tendency of coefficient data, and standard deviation $\sigma$ and kinds of HD signals.

In the coefficient data generation apparatus 150A of FIG. 20, as described above, the conversion method selection signal and the image quality information X are supplied to the 2-dimensional thinning filter 152 as a control signal, and the coefficient data wi of each class according to a plurality of image quality information X can be generated corresponding to the respective first and second conversion methods which are memorized in the information memory bank 135 of the image signal conversion section 110 of FIG. 23 by properly changing the conversion method selection signal and the image quality information X.

Although, in the above-described embodiments, a CRT display, a liquid crystal display, a plasma display, and a projector are listed as examples for the image display device 111B, however, the present invention can be also similarly applied to other image display devices.

Although, in the above embodiments of the present invention, although the linear equation has been used as an estimating equation when the HD signal is generated, the equation of higher degree may be used as an estimating equation in the invention.

Moreover, although, in the above-described embodiments of the present invention, an example in which a SD signal (525i signal) is converted into a HD signal (525p signal or 1050i signal) has been shown, the present invention is not limited to that and needless to say, the present invention can be also similarly applied to other examples in which the first image signal is converted into the second image signal using an estimating equation.

INDUSTRIAL APPLIABILITY

Up to this point, as described above, the image signal conversion apparatus and the like according to the present invention is preferably applied, for example, when video signal using the NTSC system is converted into the video signal of the HDTV and the image formed from the video signal of the HDTV is displayed.

What is claimed is:
1. An image signal conversion apparatus for converting a first image signal including a plurality of pixel data into a second image signal including a plurality of pixel data, said image signal conversion apparatus comprising:
first data selection means for selecting, from said first image signal, a plurality of first pixel data adjacent to a subject pixel of said second image signal;

class detection means for detecting a class of said subject pixel based on a plurality of said first pixel data selected by said first data selection means,
    wherein said class detection means detects a level distribution pattern of a plurality of said first pixel data and detects said class of said subject pixel based on said level distribution pattern;
resolution selection means for selecting a resolution of an image formed from said second image signal,
    wherein the resolution selected by a particular user corresponds to the particular user's identification information; and
pixel data generation means for generating pixel data of said subject pixel corresponding to said class detected by said class detection means and said resolution selected by said resolution selection means.

2. The image signal conversion apparatus according to claim 1, wherein said pixel data generation means comprises:
    coefficient data generation means for generating coefficient data corresponding to said class detected by said class detection means and said resolution selected by said resolution selection means,
        wherein said coefficient data generation means includes a memory for memorizing said coefficient data of an estimating equation,
        said coefficient data being previously generated according to every combination of said class detected by said class detection means and said resolution selected by said resolution selection means;
    second data selection means for selecting, from said first image signal, a plurality of second pixel data adjacent to a subject pixel of said second image signal; and
    calculation means for calculating pixel data of said subject pixel using said estimating equation based on said coefficient data generated by said coefficient data generation means and a plurality of said second pixel data selected by said second data selection means.

3. The image signal conversion apparatus according to claim 2, wherein said coefficient data generation means comprises:
    first memory section for memorizing coefficient data of said estimating equation, wherein said coefficient data is previously generated according to every combination of said class detected by said class detection means and said resolution selected by said resolution selection means;
    first data-reading means for reading coefficient data of each class from said first memory section, said coefficient data of each class corresponding to said resolution selected by said resolution selection means;
    second memory section for memorizing coefficient data of each class read by said first data-reading means; and
    second data-reading means for reading coefficient data from said second memory section, said coefficient data corresponding to said class detected by said class detection means.

4. The image signal conversion apparatus according to claim 1, wherein the image signal conversion apparatus further comprises a display means for displaying said resolution selected by said resolution selection means.

5. The image conversion apparatus according to claim 1, wherein said resolution selection means is comprised so as to select said resolution based on user's input.

6. The image signal conversion apparatus according to claim 1, further comprising conversion method selection means for selecting a conversion method from said first image signal to said second image signal.

7. The image signal conversion apparatus according to claim 6, wherein said conversion method selection means is comprised so as to select said conversion method based on user's input.

8. An image signal conversion method for converting a first image signal including a plurality of pixel data into a second image signal including a plurality of pixel data, said image signal conversion method comprising:
    a first step of selecting, from said first image signal, a plurality of first pixel data adjacent to a subject pixel of said second image signal;
    a second step of detecting a class of said subject pixel based on a plurality of said first pixel data selected in said first step,
        wherein the step of detecting detects a level distribution pattern of a plurality of said first pixel data and detects said class of said subject pixel based on said level distribution pattern;
    a third step of selecting a resolution of an image formed from said second image signal;
        wherein the resolution selected by a particular user corresponds to the particular user's identification information; and
    a fourth step of generating pixel data of said subject pixel corresponding to said class detected in said second step and said resolution selected in said third step.

9. An image display apparatus comprising:
image signal input section for inputting a first image signal including a plurality of pixel data;
image signal conversion means for;
    receiving said first image signal from said image signal input section,
    converting said first image signal into a second image signal including a plurality of pixel data and outputting said second image signal;
image display means for receiving said second image signal from said image signal conversion means and displaying an image formed from said second image signal; and
resolution selection means for selecting a resolution of said image displayed in said image display means,
wherein said image signal conversion means includes:
    first data selection means for selecting, from said first image signal,
    a plurality of first pixel data adjacent to a subject pixel of said second image signal,
    class detection means for detecting a class of said subject pixel based on a plurality of said first pixel data selected by said first data selection means,
        wherein said class detection means detects a level distribution pattern of a plurality of said first pixel data and detects said class of said subject pixel based on said level distribution pattern, and
    pixel data generation means for generating pixel data of said subject pixel corresponding to said class detected by said class detection means and said resolution selected by said resolution selection means, and
wherein the resolution selected by a particular user corresponds to the particular user's identification information.

10. The image display apparatus according to claim 9, wherein said pixel data generation means comprises:
    coefficient data generation means for generating coefficient data corresponding to said class detected by said class detection means and said resolution selected by said resolution selection means,
        wherein said coefficient data generation means includes:

a memory for memorizing said coefficient data of an estimating equation, said coefficient data being previously generated according to every combination of said class detected by said class detection means and said resolution selected by said resolution selection means;

second data selection means for selecting, from said first image signal, a plurality of second pixel data adjacent to a subject pixel of said second image signal; and calculation means for calculating pixel data of said subject pixel using said estimating equation based on said coefficient data generated by said coefficient data generation means and a plurality of said second pixel data selected by said second data selection means.

11. The image display apparatus according to claim 9, wherein said image display apparatus further comprises display control means for displaying said resolution selected by said resolution selection means on a screen of said image display means.

12. The image display apparatus according to claim 9, wherein said image display apparatus further comprises receiving means for receiving a broadcasting signal and obtaining said first image signal from said broadcasting signal.

13. A coefficient data generation apparatus for generating coefficient data of an estimating equation used when a first image signal including a plurality of pixel data is converted into a second image signal including a plurality of pixel data, said coefficient data generation apparatus comprising:

signal processing means for processing an instructive signal corresponding to said second image signal and obtaining an input signal corresponding to said first image signal;

resolution selection means for selecting a resolution of an image formed from said input signal obtained in said signal processing means,
wherein the resolution selected by a particular user corresponds to the particular user's identification information;

first data selection means for selecting, from said input signal, a plurality of first pixel data adjacent to a subject pixel of said instructive signal;

class detection means for detecting a class of said subject pixel based on a plurality of said first pixel data selected by said first data selection means,
wherein said class detection means detects a level distribution pattern of a plurality of said first pixel data and detects said class of said subject pixel based on said level distribution pattern;

second data selection means for selecting from said input signal a plurality of second pixel data adjacent to a subject pixel of said instructive signal;

normal equation generation means for generating a normal equation for obtaining said coefficient data of each class, on the basis of said class detected by said class detection means, a plurality of said second pixel data selected by said second data selection means and said data of said subject pixel of said instructive signal; and coefficient data calculation means for obtaining coefficient data of said each class by solving said normal equation.

14. The coefficient data generation apparatus according to claim 13,
wherein said signal processing means includes a Gaussian filter for obtaining said input signal corresponding to said first image signal by processing of vertical thinning and horizontal thinning said instructive signal; and wherein said resolution selection means selects said resolution of said image formed from said input signal by selecting standard deviation of said Gaussian filter.

15. A coefficient data generation method for generating coefficient data of an estimating equation used when a first image signal including a plurality of pixel data is converted into a second image signal including a plurality of pixel data, said coefficient data generation method comprising:

a first step of processing an instructive signal corresponding to said second image signal and obtaining an input signal corresponding to said first image signal;

a second step of selecting a resolution of an image formed from said input signal obtained in said first step,
wherein the resolution selected by a particular user corresponds to the particular user's identification information;

a third step of selecting from said input signal a plurality of first pixel data adjacent to a subject pixel of said instructive signal;

a fourth step of detecting a class of said subject pixel based on a plurality of said first pixel data selected in said third step,
wherein the step of detecting detects a level distribution pattern of a plurality of said first pixel data and detects said class of said subject pixel based on said level distribution pattern;

a fifth step of selecting, from said input signal, a plurality of second pixel data adjacent to said subject pixel of said instructive signal;

a sixth step of generating a normal equation for obtaining said coefficient data of each class on the basis of said class detected in said fourth step, a plurality of said second pixel data selected in said fifth step and said data of said subject pixel of said instructive signal; and a seventh step of obtaining coefficient data of said each class by solving said normal equation generated in said sixth step.

16. An image signal conversion apparatus for converting a first image signal including a plurality of pixel data into a second image signal including a plurality of pixel data, said image signal conversion apparatus comprising:

first data selection means for selecting, from said first image signal, a plurality of first pixel data adjacent to a subject pixel of said second image signal;

class detection means for detecting a class of said subject pixel based on a plurality of said first pixel data selected by said first data selection means,
wherein said class detection means detects a level distribution pattern of a plurality of said first pixel data and detects said class of said subject pixel based on said level distribution pattern;

information input section for inputting display-device-information including first identification information showing at least a kind of image display device;

image quality information obtaining means for obtaining image quality information corresponding to said first identification information included in said display-device-information received from said information input section,
wherein the image quality information is selected by a particular user and corresponds to the particular user's identification information; and pixel data generation means for generating pixel data of said subject pixel corresponding to said class detected by said class detection means and said image quality information obtained from said image quality information obtaining means.

17. The image signal conversion apparatus according to claim 16, further comprising:
memory means for previously memorizing a corresponding-relationship between said first identification information and said image quality information,
wherein said image quality information obtaining means obtains said image quality information with reference to said corresponding-relationship memorized in said memory means.

18. The image signal conversion apparatus according to claim 16, wherein said pixel data generation means comprises:
coefficient data generation means for generating coefficient data corresponding to said class detected by said class detection means and said image quality information obtained from said image quality information obtaining means,
wherein said coefficient data generation means includes:
a memory for memorizing said coefficient data of an estimating equation, said coefficient data being previously generated according to every combination of said class detected by said class detection means and said image quality information obtained from said image quality information obtaining means;
second data selection means for selecting, from said first image signal, a plurality of second pixel data adjacent to a subject pixel of said second image signal; and
calculation means for calculating pixel data of said subject pixel using said estimating equation based on said coefficient data generated by said coefficient data generation means and a plurality of said second pixel data selected by said second data selection means.

19. The image signal conversion apparatus according to claim 18, wherein said coefficient data generation means comprises:
first memory section for memorizing coefficient data of said estimating equation previously generated according to every combination of said class detected by said class detection means and said image quality information obtained from said image quality information obtaining means;
first data-reading means for reading from said first memory section the coefficient data of each class corresponding to the image quality information obtained from said image quality information obtaining means;
second memory section for memorizing the coefficient data of each class read by said first data reading means; and
second data-reading means for reading from said second memory section the coefficient data corresponding to said class detected by said class detection means.

20. The image signal conversion apparatus according to claim 16, wherein said image signal conversion apparatus further comprises:
display device control means for outputting a command for allowing an image-quality-adjustment-function to be invalid, said image-quality-adjustment-function becoming invalid when said display-device-information input into said information input section includes second identification information showing that said image-quality-adjustment-function exists.

21. The image signal conversion apparatus according to claim 16, wherein said image signal conversion apparatus further comprises:
connection detection means for detecting a connection of an image display device for supplying said second image signal; and
display device control means for sending a command to said image display device when a connection of said image display device is detected by said connection detection means, said command requesting said image display device to send display-device-information.

22. An image signal conversion method for converting a first image signal including a plurality of pixel data into a second image signal including a plurality of pixel data, said image signal conversion method comprising the steps of:
selecting, from said first image signal, a plurality of first pixel data adjacent to a subject pixel of said second image signal;
detecting a class of said subject pixel based on a plurality of said selected first pixel data;
wherein the step of detecting detects a distribution pattern of a plurality of said first pixel data and detects said class of said subject pixel based on said level distribution pattern;
inputting display-device-information including first identification information showing at least a kind of image display device;
obtaining image quality information corresponding to said first identification information included in said input display-device-information,
wherein the image quality information is selected by a particular user and corresponds to the particular user's identification information; and
generating pixel data of said subject pixel corresponding to said detected class and said obtained image quality information.

23. An image display apparatus comprising:
an image signal input section for inputting a first image signal including a plurality of pixel data;
image signal conversion means for receiving said first image signal from said image signal input section, converting said first image signal into a second image signal including a plurality of pixel data, and outputting said second image signal; and
an image display device for receiving said second image signal from said image signal conversion means and displaying an image formed from said second image signal,
wherein said image display device includes:
memory means for memorizing display-device-information including a first identification information showing a kind of image display device at least, and
information sending means for sending said display-device-information memorized in said memory means to said image signal conversion section, and
wherein said image signal conversion means includes;
first data selection means for selecting, from said first image signal, a plurality of first pixel data adjacent to a subject pixel of said second image signal,
class detection means for detecting a class of said subject pixel based on a plurality of said first pixel data selected by said first data selection means,
wherein said class detection means detects a level distribution pattern of a plurality of said first pixel data and detects said class of said subject pixel based on said level distribution pattern,
information receiving means for receiving said display-device-information sent from said image display device,
image quality information obtaining means for obtaining image quality information corresponding to said first identification information included in said display-device-information received by said information receiving means, and pixel data generation means for generating pixel data of said subject pixel corresponding to said class detected by said class detection means and said image quality information obtained from said image quality information obtaining means, wherein the image quality information is selected by a particular user and corresponds to the particular user's identification information.

24. The image display apparatus according to claim 23, wherein said image signal conversion section further comprises memory means for previously memorizing a corresponding-relationship between said first identification information and said image quality information, and wherein said image quality information obtaining means obtains said image quality information with reference to said corresponding-relationship memorized in said memory, means.

25. The image display apparatus according to claim 23, wherein said pixel data generation means comprises:

coefficient data generation means for generating coefficient data corresponding to said class detected by said class detection means and said image quality information obtained from said image quality information obtaining means, wherein said coefficient data generation means includes:
a memory for memorizing coefficient data of an estimating equation, said coefficient data being previously generated according to every combination of said class detected by said class detection means and said image quality information obtained from said image quality information obtaining means;

second data selection means for selecting, from said first image signal, a plurality of second pixel data adjacent to a subject pixel of said second image signal; and calculation means for calculating pixel data of said subject pixel using said estimating equation based on said coefficient data generated by said coefficient data generation means and a plurality of said second pixel data selected by said second data selection means.

26. The image display apparatus according to claim 23, wherein said image signal conversion section further comprises:

command sending means for sending a command to said image display device when said image display device is connected, said command requesting said image display device to send back said display-device-information, and wherein said image display device further comprises:
command receiving means for receiving said command sent from said image signal conversion section, and
control means for controlling said information sending means so as to send said display-device-information to said image signal conversion section based on said command received by the relevant command receiving means.

27. The image display apparatus according to claim 23, wherein said image signal conversion section further comprises:

command sending means for sending a command for allowing an image-quality-adjustment-function to be invalid, said image-quality-adjustment-function becoming invalid when said display-device-information received in said information receiving means includes second identification information showing that said image-quality-adjustment-function exist, and wherein said image display device further comprises:
command receiving means for receiving a command for allowing said image-quality-adjustment-function sent from said image signal conversion section to be invalid, and
control means for allowing image-quality-adjustment-function to be invalid based on said command received by the relevant command receiving means.

* * * * *